US008213040B2

(12) United States Patent
Kobayashi et al.

(10) Patent No.: US 8,213,040 B2
(45) Date of Patent: Jul. 3, 2012

(54) IMAGE FORMING APPARATUS, PROGRAM ADDING METHOD, AND A RECORDING MEDIUM

(75) Inventors: Ayako Kobayashi, Tokyo (JP); Hisanori Kawaura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 581 days.

(21) Appl. No.: 11/836,188

(22) Filed: Aug. 9, 2007

(65) Prior Publication Data

US 2007/0285719 A1    Dec. 13, 2007

Related U.S. Application Data

(62) Division of application No. 10/429,865, filed on May 6, 2003, now abandoned.

(30) Foreign Application Priority Data

| May 8, 2002 | (JP) | 2002-133063 |
| May 20, 2002 | (JP) | 2002-144984 |
| May 2, 2003 | (JP) | 2003-127171 |
| May 2, 2003 | (JP) | 2003-127172 |
| May 2, 2003 | (JP) | 2003-127173 |
| May 2, 2003 | (JP) | 2003-127174 |
| May 2, 2003 | (JP) | 2003-127175 |

(51) Int. Cl.
*G06K 15/00* (2006.01)
*G06F 12/00* (2006.01)

(52) U.S. Cl. ........ 358/1.16; 358/1.1; 707/822; 707/823; 707/824; 707/828; 707/830; 710/8; 710/16; 710/301; 710/302; 717/168; 717/172; 717/173

(58) Field of Classification Search .................. 358/1.16
See application file for complete search history.

(56) References Cited

U.S. PATENT DOCUMENTS

| 5,032,979 | A | * | 7/1991 | Hecht et al. ..................... 726/25 |
| 5,721,948 | A | * | 2/1998 | Duncan ............................. 710/5 |
| 6,473,569 | B1 | * | 10/2002 | Shidate et al. ................ 396/280 |
| 6,542,186 | B2 | * | 4/2003 | Uryu .......................... 348/231.7 |
| 6,867,881 | B1 | | 3/2005 | Umezato ....................... 358/1.2 |
| 7,293,033 | B1 | * | 11/2007 | Tormasov et al. ............ 707/608 |

(Continued)

FOREIGN PATENT DOCUMENTS

JP          5-62028          3/1993

(Continued)

OTHER PUBLICATIONS

'Optimistic Lookup of Whole NFS Paths in a Single Operation' by Duchamp, Proceedings of the USENIX Summer 1994 Technical Conference on USENIX Summer 1994 Technical Conference.*

(Continued)

*Primary Examiner* — Steven Snyder
(74) *Attorney, Agent, or Firm* — Oblon, Spivak, McClelland, Maier & Neustadt, L.L.P.

(57) ABSTRACT

An image forming apparatus include a program for performing a process concerning image formation by using a hardware resource, and a slot which a recording medium is inserted into and removed from. A status monitoring part monitors whether or not a recording medium is inserted or removed; a recording medium starting part starts the recording medium inserted into said slot into a state in which said recording medium is assessable; and a program starting part reads a program from said recording medium started into the accessible state, and starting said program.

20 Claims, 58 Drawing Sheets

U.S. PATENT DOCUMENTS

| | | | |
|---|---|---|---|
| 7,325,017 B2 * | 1/2008 | Tormasov et al. | 707/822 |
| 7,359,094 B1 * | 4/2008 | Sayuda | 358/3.28 |
| 7,877,426 B2 * | 1/2011 | Grubbs et al. | 707/830 |
| 8,032,570 B2 * | 10/2011 | Kurichiyath et al. | 707/823 |
| 2001/0043340 A1 | 11/2001 | Murata | 358/1.9 |
| 2002/0140978 A1 * | 10/2002 | Urabe et al. | 358/1.16 |
| 2004/0186820 A1 * | 9/2004 | Izume et al. | 707/1 |
| 2004/0239975 A1 * | 12/2004 | Kawaura et al. | 358/1.14 |
| 2004/0260853 A1 * | 12/2004 | Cho | 710/300 |
| 2005/0015354 A1 * | 1/2005 | Grubbs et al. | 707/1 |
| 2007/0198795 A1 * | 8/2007 | Harada | 711/164 |
| 2009/0234979 A1 * | 9/2009 | Hamasaki | 710/16 |

FOREIGN PATENT DOCUMENTS

| | | |
|---|---|---|
| JP | 6-238958 | 8/1994 |
| JP | 9-6709 | 1/1997 |
| JP | 9-200461 | 7/1997 |
| JP | P2000-148456 | 5/2000 |
| JP | 2001-143053 | 5/2001 |
| WO | WO 99/44360 | 9/1999 |

OTHER PUBLICATIONS

'NFS: Network File System Version 3 Protocol Specification' by Sun Microsystems, Feb. 16, 1994.*

U.S. Appl. No. 11/836,198, filed Aug. 9, 2007, Kobayashi, et al.

Okayama Kiyohiko, "Network Management for Sudden Trouble (6)", UNIX Magazine, Japan, ASCII Inc., Nov. 1, 1993, vol. 8, No. 11, 2 cover pages and pp. 20-23 (with partial English translation).

* cited by examiner

FIG.4

```
/+netbsd
|
+sbin/  +init
|       +sdcheck        (1)
|
+etc/   +init.conf ⇐
|
+usr/   +lib    +libc.so.XX.YY
|       |
|       +local/   +lib   +libPTL.so.1.2
|                        +libipc_socket.so.1.1
+proc/
|
+arch/  +basesrv/
        +copy/
        +fax/
        +font
        +network
        +printer
        +scanner
|
+md.img
|
+mnt/   +md/
|       +sd0/
|       +sd1/
|       +sd2/
|       +sd3/
```

FIG.5

```
mount msdosfs /dev/sd0 /mnt/sd0  ⎫
mount msdosfs /dev/sd1 /mnt/sd1  ⎬ (2)
mount msdosfs /dev/sd2 /mnt/sd2  ⎪
mount msdosfs /dev/sd3 /mnt/sd3  ⎭
mount gzromfs 0xXXXXXXXX /arch/basesrv
mount gzromfs 0xXXXXXXXX /arch/copy
mount md /md.img /mnt/md
     (6)
```

FIG.6

```
mount gzromfs font.mod /arch/font
mount gzromfs printer.mod /arch/printer
  (3)    (6)
```

FIG.7

```
   +init.d     +fax.cnf
(4)|           +network.cnf
   |           +printer.cnf
   |           +scanner.cnf
   |                        (5)
   +fax.mod
   +font.mod
   +network.mod
   +printer.mod
   +scanner.mod
```

```
mount. gzromfs module/printer.mod /mnt/printer
exec /mnt/printer/printer
```

FIG.18

```
mount  msdosfs  /dev/sd1  /mnt/sd1
mount  msdosfs  /dev/sd2  /mnt/sd2
              .
              .
              .
              .
              .
```
(21) points to /dev/sd1
(22) points to /mnt/sd1

FIG.19

```
mount  gzromfs  font1.gz  /prt/font1
```
(23) points to gzromfs
(24) points to font1.gz
(25) points to /prt/font1

mount gzromfs printer.mod /arch/printer
exec /arch/printer/printer (72)

mount gzromfs scanner.mod /arch/scanner
exec /arch/scanner/scanner

mount gzromfs factory.mod /arch/factory
exec /arch/factory/factory

FIG.43 init.d/
printer.cnf
printer.lic module/
printer.mod
printer.mac

FIG.53 print 0003.jpg
print 0007.jpg

FIG.54

0001.jpg
0002.jpg
0003.jpg
⋮
0012.jpg

- printer.mod (91)
- printer.cnf (92)
- 1.prin, 2.prin (93)
- 0001.jpg, 0002.jpg, 0003.jpg ... 0012.jpg (94)

```
mount. gzromfs printer.mod /arch/printer
exec /arch/printer/printer
```

FIG.62 paper A4 h     #A4 LATERAL PAPER
color on h     # COLOR HIGH RESOLUTION
print 0003.jpg 2
print 0007.jpg 1, 0005.jpg 5
print 0003.jpg 0004.jpg 7
print 0001.jpg 0002.jpg 2, 0003.jpg 3
paper B4 v     #B4 LONGITUDINAL PAPER
print 0011.jpg
print all

FIG.63

| | TARGET | COMMAND | ARGUMENT |
|---|---|---|---|
| SETTING | PAPER | paper | -SIZE: A3/A4/B3/B4<br>-DIRECTION: v(VERTICAL)/h(HORIZONTAL)<br>※DEFAULT: A4 VERTICAL |
| | COLOR | color | -OUTPUT COLOR: on(COLOR)/off(MONOCHROME)<br>-RESOLUTION: h(HIGH)/m(MEDIUM)/l(LOW)<br>※DEFAULT: COLOR & MEDIUM RESOLUTION |
| OPERATION | PRINT | print | -FILE NAME: *jpg.(SINGLE OR PLURAL)/all<br>-COPY: (DEFAULT: SINGLE)<br>※PLURAL SETS OF PRINTING OPERATION MAY BE SPECIFIED WITH",." |

FIG.66 color on l     #COLOR LOW RESOLUTION
scan 0003.jpg
scan all
scan 0005.jpg 0006.jpg color off h     #MONOCHROME HIGH RESOLUTION
scan 0001.jpg 0002.jpg 0003.jpg

FIG.67

| | TARGET | COMMAND | ARGUMENT |
|---|---|---|---|
| SETTING | COLOR | color | -OUTPUT COLOR: on(COLOR)/off(MONOCHROME)<br>-RESOLUTION: h(HIGH)/m(MEDIUM)/l(LOW)<br>※DEFAULT: COLOR & MEDIUM RESOLUTION |
| OPERATION | SCAN &<br>IMAGE<br>STORAGE | scan | -FILE NAME: *jpg.(SINGLE OR PLURAL)/all |

FIG.68

```
sendto  03-123-4567
paper A4 h
fax 0007.jpg 3
fax 0012.jpg 1 045-321-7654
fax 0007.jpg 2, 0010.jpg 4 sendto  03-111-2233
color off l
fax all 3
```

FIG.69

| | TARGET | COMMAND | ARGUMENT |
|---|---|---|---|
| SETTING | PAPER | paper | -SIZE: A3/A4/B3/B4<br>-DIRECTION: v(VERTICAL)/h(HORIZONTAL)<br>※DEFAULT: A4 VERTICAL |
| | COLOR | color | -OUTPUT COLOR: on(COLOR)/off(MONOCHROME)<br>-RESOLUTION: h(HIGH)/m(MEDIUM)/l(LOW)<br>※DEFAULT: COLOR & MEDIUM RESOLUTION |
| | DESTINATION | sendto | -DESTINATION FAX NO.<br>※SETTING IS MAINTAINED UNTIL NEW SETTING (fax COMMAND HAS PRIORITY) |
| OPERATION | FAX SEND | fax | -FILE NAME: *jpg.(SINGLE OR PLURAL)/all<br>-COPY: (DEFAULT: SINGLE) …HOW MANY COPIES<br>-DESTINATION FAX NO. (DEFAULT: sendto)<br>※PLURAL SETS OF FAX OPERATION MAY BE SPECIFIED WITH ",". |

FIG.71

| | TARGET | COMMAND | ARGUMENT |
|---|---|---|---|
| SETTING | COLOR | color | -OUTPUT COLOR: on(COLOR)/off(MONOCHROME)<br>-RESOLUTION: h(HIGH)/m(MEDIUM)/l(LOW)<br>※DEFAULT: COLOR & MEDIUM RESOLUTION |
| SETTING | DESTINATION | sendto | -DESTINATION FAX NO.<br>※SETTING IS MAINTAINED UNTIL NEW SETTING (mail COMMAND HAS PRIORITY) |
| OPERATION | MAIL SEND | mail | -FILE NAME: *.jpg.(SINGLE OR PLURAL)/all<br>-COPY: (DEFAULT: SINGLE) …HOW MANY COPIES<br>-DESTINATION MAIL NO. (DEFAULT: sendto)<br>※PLURAL SETS OF MAIL OPERATION MAY BE SPECIFIED WITH",". |

IMAGE FORMING APPARATUS, PROGRAM ADDING METHOD, AND A RECORDING MEDIUM

CROSS-REFERENCE TO RELATED APPLICATIONS

This application is a Divisional of and claims the benefit of priority under 35 U.S.C. §120 from U.S. Ser. No. 10/429,865, filed May 6, 2003, and claims the benefit of priority under 35 U.S.C. §119 from prior Japanese Patent Applications No. 2002-133063, filed May 8, 2002; 2002-144984, filed May 20, 2002; 2003-127171, filed May 2, 2003; 2003-127172, filed May 2, 2003; 2003-127173, filed May 2, 2003; 2003-127174, filed May 2, 2003; and 2003-127175, filed May 2, 2003, the entire contents of each of which are incorporated herein by reference.

BACKGROUND OF THE INVENTION

1. Field of the Invention

The present invention relates to an image forming apparatus, a program adding method, and a recording medium, and, especially, to an image forming apparatus which adds a program read out from a removable recording medium, the method for adding a program, and a removable recording medium from which a program is read out and then is added to the image forming apparatus.

2. The Description of the Related Art

In recent years, an image forming apparatus which includes respective functions of a printer, a copier, a facsimile machine, a scanner and so forth within a sole housing (referred to as a composite machine, hereinafter) has come to be known. This composite machine has four types of software programs for functioning as a printer, a copier, a facsimile machine, and a scanner, respectively, and thus, is operable as a printer, a copier, a facsimile machine, and a scanner by selectively applying one of these types of software programs, while it includes a display part, a printing part, an image pick-up part, etc. in the housing for this purpose. Japanese laid-open patent application No. 2002-84383, for example, discloses an example of such a composite machine.

Software programs, i.e., so-called BIOS (Basic Input/Output System) and boot loader start such a composite machine after a power supply thereto is started. The boot loader develops a kernel and a route file system on a RAM (Random Access Memory), and starts the kernel in the machine. And the kernel mounts the route file system. The term 'to mount' means, to start a file system or a peripheral device, and makes it enter a state in which it can be accessed by a body system.

After the kernel is started, an application/service starting program which starts various applications/services is started. The application/service starting program corresponds to a process which is first started in the composite machine. This program mounts a file system according to a program written in a predetermined setting file, and starts processes in a service layer and applications required for operation of the composite machine according to a program written in the predetermined setting file.

In such a composite machine, a program of an application to be started should be previously recorded in a hard disk drive, a ROM, or so provided in the machine itself. Japanese laid-open patent application No. 2001-76125, for example, discloses an example of an image processing apparatus in which an application to be started is additionally stored into a hard disk drive, a ROM, or so.

However, in these composite machines in the related arts, not only a program of an application to be started but also a setting file corresponding to the application to be started should have been stored in the hard disk drive, ROM, or so in the machine itself. By such a reason, adding a new application for the purpose of adding a new function or so to the machine may not be achieved easily for a user.

Consequently, there is a problem that a version upgrade may not be easily achieved in such a type of composite machine in the related art. Furthermore, in such a type of composite machine in the related art, adding a new application may not be achieved during a state in which a power supply to the machine is maintained or the machine is running.

SUMMARY OF THE INVENTION

The present invention has been made for the purpose of providing an image forming apparatus for which adding of a program can be achieved dynamically and easily for a user, and a method therefor, and a removable recording medium for the same purpose.

According to the present invention, an image forming apparatus which includes a program for performing a process concerning image forming operation by using a hardware resource, and a slot which a removable recording medium is inserted into and removed from, includes: a status monitoring part monitoring whether or not a recording medium is inserted or removed; a recording medium starting part starting the recording medium inserted into the slot into a state in which the recording medium is assessable; and a program starting part reading a program from the recording medium thus started into the accessible state, and starting the program.

According to another aspect of the present invention, a program adding method for an image forming apparatus which comprises a program for performing a process concerning image forming operation by using a hardware resource, and a slot which a removable recording medium is inserted into and removed from, includes: an insertion detection step detecting an insertion of a recording medium into the slot; a recording medium starting step starting the recording medium of which the insertion is detected into an accessible state; and a program starting step reading a program from the recording medium thus started into the accessible state, and starting the program.

According to another aspect of the present invention, a recording medium which is inserted into a slot of an image forming apparatus which comprises a program for performing an image formation process using a hardware resource, and the slot which the recording medium is inserted into and removed from, and, the recording medium has at least one program and setting information recorded therein, is started into an accessible state upon being inserted into the slot of the apparatus, and the program thereof is read out according to the setting information and is thus started by the image forming apparatus.

According to the present invention described above, it is monitored whether or not a recording medium is inserted or removed, the recording medium inserted into the slot is started into a state in which the recording medium is assessable and a program is read out from the recording medium thus started into the accessible state, and is thus started. Accordingly, the program recorded in the recording medium can be easily added to the image forming apparatus. Thus, functional extension, program upgrade or so in the image forming apparatus can be easily achieved by using the program recorded in the recording medium. Furthermore, in a condition in which a hot plugging is allowed of the recording medium, the addition of the program can be achieved even during running of the image forming apparatus.

According to another aspect of the present invention, an image forming apparatus including a program for performing a process concerning image formation by using a hardware resource, and a slot which a recording medium is inserted into and removed from, includes: a recording medium starting part mounting the recording medium inserted into the slot onto a first mount point, and a program starting part reading setting information from the thus-mounted recording medium, acquiring an absolute path according to a relative path written in the setting information and the above-mentioned first mount point, and also, mounting the absolute path onto a second mount point specified in the setting information.

According to another aspect of the present invention, an image forming apparatus including a program for performing a process concerning image formation by using a hardware resource, and a slot which a recording medium is inserted into and removed from, includes: a recording medium starting part mounting the recording medium inserted into the slot onto a first mount point; and a program starting part reading setting information from the thus-mounted recording medium, acquiring an absolute mount point according to a directory and a relative mount point written in the setting information, and also, mounting a absolute path specified in the setting file onto the above-mentioned absolute mount point.

According to another aspect of the present invention, a path direction method taken in an image forming apparatus which comprises a program for performing a process concerning image formation by using a hardware resource, and a slot which a recording medium is inserted into and removed from, includes: a first mounting step of mounting the recording medium inserted into the slot onto a first mount point; a mount point holding step of holding information of the first mount point; an absolute path acquiring step of reading setting information from the thus-mounted recording medium, and acquiring an absolute path according to a relative path specified in the setting information and the held information of the first mount point; and a second mounting step of mounting the absolute path onto a second mount point specified in the setting information.

According to another aspect of the present invention, a path direction method taken in an image forming apparatus which comprises a program for performing a process concerning image formation by using a hardware resource, and a slot which a recording medium is inserted into and removed from, includes: a first mount step of mounting the recording medium inserted into the slot onto a first mount point; and an absolute mount point acquiring step of reading setting information from the thus-mounted recording medium, and acquiring an absolute mount point according to a directory and a relative mount point specified in the setting information; and a second mount step mounting an absolute path specified in the setting file onto the thus-acquired absolute mount point.

Accordingly, information of the first mount point at which the recording medium inserted into the slot is held, and the absolute path direction can be obtained from the relative path specified by the setting file and the above-mentioned first mount point. Accordingly, path direction for a mount target module can be specified by using a relative path. Thereby, flexibility in machine operation/usage is improved.

Further, according to the present invention, the absolute mount point can be obtained from the directory and relative mount point specified by the setting file. Accordingly, path direction for a mount point can be specified by using a relative path. Thereby, flexibility in machine operation/usage is improved.

Further, the setting file is read out from the recording medium inserted in the slot, the directory specified in the setting file is produced in the image forming apparatus, and the absolute mount point can be acquired from the thus-produced directory and the relative mount point read out from the setting file. Accordingly, a path direction of mount point can be specified from the newly produced directory and the above-mentioned relative mount point.

Accordingly, according to the present invention, it is not necessary to previously determine the slot to be inserted for a relevant recording medium, and, also, a mount point does not need to depend from a directory which the image forming apparatus itself originally has.

According to another aspect of the present invention, an image forming apparatus including a program for performing a process concerning image formation by using a hardware resource, and a slot which a recording medium is inserted into and removed from, includes: a status monitoring part monitoring insertion/removal of a recording medium; a recording medium starting part making the recording medium inserted into the slot into an accessible state; and a program starting part reading a program from the recording medium thus made into the accessible state, and thus starting the program, while stopping the program once read out from the recording medium and started upon being notified a removal of the recording medium from the slot by the status monitoring part.

According to another aspect of the present invention, an image forming apparatus including a program for performing a process concerning image formation by using a hardware resource, and a slot which a recording medium is inserted into and removed from, includes: a status monitoring part monitoring insertion/removal of a recording medium; a recording medium starting part making the recording medium inserted into the slot into an accessible state; a program read out from the recording medium and started which, upon being notified of a removal of the recording medium from the slot, terminates inter-process communications with another process, and then, stops itself; and a program starting part reading the program from the recording medium made into the accessible state, and then starting the program, while, upon being notified of a removal of the recording medium from the slot, starting the recording medium starting part and then canceling the once-made accessible state of the recording medium.

According to another aspect of the present invention, a program stopping method taken in an image forming apparatus which comprises a program for performing a process concerning image formation by using a hardware resource, and a slot which a recording medium is inserted into and removed from, includes: a status monitoring step of monitoring insertion/removal of a recording medium; a recording medium stopping step of canceling a once-made accessible state of the recording medium removed from the slot; and a program stopping step of stopping a program once read out from the recording medium and then started, upon being notified of a removal of the recording medium from the slot.

According to another aspect of the present invention, a program stopping method taken in an image forming apparatus which comprises a program for performing a process concerning image formation by using a hardware resource, and a slot which a recording medium is inserted into and removed from, include: a status monitoring step of monitoring insertion/removal of a recording medium into/from the slot; a recording medium stopping step of, upon being notified of a removal of the recording medium from the slot, terminating inter-process communications with another process, stopping a program once read out from the recording medium and started; and a recording medium stopping step of canceling a once-made accessible state of the recording medium removed from the slot.

Thus, the program read out from the recording medium and started once is stropped positively upon a removal of the recording medium from the slot, and, thus, it becomes possible to create a system which prevents the recording medium which can be inserted/removed from being illegally shared by a plurality of image forming apparatuses.

According to another aspect of the present invention, an image forming apparatus including a program for performing a process concerning image formation by using a hardware resource, and a slot which a recording medium is inserted into and removed from, includes: a status monitoring part monitoring insertion/removal of a recording medium; a recording medium starting part making the recording medium inserted into the slot into an accessible state; and an application part reading a setting file and data from the recording medium thus made into the accessible state, and processing the data according to the description of the setting file.

According to another aspect of the present invention, an image forming apparatus including a program for performing a process concerning image formation by using a hardware resource, and a slot which a recording medium is inserted into and removed from, includes: a status monitoring part monitoring insertion/removal of a recording medium; a recording medium starting part making the recording medium inserted into the slot into an accessible state; and an application part reading at least a unit of data from the recording medium thus made into the accessible state, produces a list of the thus-read data, displaying the data list on an operation panel for an operator to select some data therefrom, and processing the data thus selected by the operator.

According to another aspect of the present invention, a data processing method taken in an image forming apparatus which comprises a program for performing a process concerning image formation by using a hardware resource, and a slot which a recording medium is inserted into and removed from, includes: a status monitoring step of monitoring insertion/removal of a recording medium; a recording medium starting step of making the recording medium inserted into the slot into an accessible state; and a data processing step of reading a setting file and data from the recording medium made into the accessible state, and processing the data according to the description of the setting file.

According to another aspect of the present invention, a data processing method taken in an image forming apparatus which comprises a program for performing a process concerning image formation by using a hardware resource, and a slot which a recording medium is inserted into and removed from, includes: a status monitoring step of monitoring insertion/removal of a recording medium; a recording medium starting step of making the recording medium inserted into the slot into an accessible state; a data list display step of reading at least a unit of data from the recording medium made into the accessible state, produces a list of the thus-read data, and displaying the data list on an operation panel for an operator to select data therefrom; and a data processing step of processing the data thus selected by the operator.

Accordingly, insertion/removal of the recording medium into/from the slot is monitored, the recording medium is started into an accessible state upon being inserted into the slot, and data is read out from the accessible recording medium and is processed.

According to another aspect of the present invention, an image forming apparatus including a program for performing a process concerning image formation by using a hardware resource, and a slot which a recording medium is inserted into and removed from, includes: a status monitoring part monitoring insertion/removal of a recording medium; a recording medium starting part starting the recording medium inserted into the slot into an accessible state; a program starting part reading a program-starting setting file and a program from the recording medium made into the accessible state, and starting the program according to a description of the program-starting setting file; and an application part reading an application-setting file and data from the recording medium started, and processing the data according to a description of the application setting file.

According to another aspect of the present invention, a data processing method taken in an image forming apparatus which comprises a program for performing a process concerning image formation by using a hardware resource, and a slot which a recording medium is inserted into and removed from, includes: an insertion detecting step detecting an insertion of a recording medium into the slot; a recording medium starting step starting the recording medium inserted into the slot into an accessible state; a program starting step of reading a program-starting setting file and a program from the recording medium made into the accessible state, and starting the program according to a description of the program-starting setting file; and a data processing step of reading an application-setting file and data from the recording medium started, and processing the data according to a description of the application-setting file.

Accordingly, insertion/removal of the recording medium into/from the slot is monitored, the recording medium is started into an accessible state upon being inserted into the slot, data and setting file are read out from the accessible recording medium, and the data is processed according to the description of the setting file. Thus, the new application program is added and is functioning.

BRIEF DESCRIPTION OF THE DRAWINGS

Other objects and further features of the present invention will become more apparent from the following detailed description when read in conjunction with the accompanying drawings:

FIG. 4 shows one example of a file tree in the image forming apparatus shown in FIG. 1;

FIG. 5 shows one example of a master setting file of the image forming apparatus shown in FIG. 1;

FIG. 6 shows one example of a setting file recorded in a recording medium to be loaded into the image forming apparatus shown in FIG. 1;

FIG. 7 shows one example of a file tree in the recording medium to be loaded into the image forming apparatus shown in FIG. 1;

FIG. 18 shows another example of master setting file of the image forming apparatus shown in FIG. 1;

FIG. 19 shows a description in another example of setting file of the image forming apparatus shown in FIG. 1;

FIG. 32 illustrates another example of a setting file recorded in the SD card to be mounted for application starting;

FIG. 33 illustrates another example of a setting file recorded in the SD card to be mounted for process inspection;

FIG. 43 illustrates another example of files to be mounted from the SD card;

FIG. 53 illustrates an example of printer-application setting file recorded in the SD card to be mounted;

FIG. 54 illustrates an example of image data files recorded in the SD card to be processed;

FIG. 61 illustrates an example of SD card slot number setting file recorded in the SD card;

FIG. 62 illustrates an example of a printer-application setting file recorded in the SD card;

FIG. 63 illustrates a list of commands used in the printer-application setting file;

FIG. 66 illustrates an example of a scanner-application setting file recorded in the SD card;

FIG. 67 illustrates a list of commands used in the scanner-application setting file;

FIG. 68 illustrates an example of a fax-application setting file recorded in the SD card;

FIG. 69 illustrates a list of commands used in the fax-application setting file;

FIG. 71 illustrates a list of commands used in the mail-application setting file.

DESCRIPTION OF THE PREFERRED EMBODIMENTS

Figure 1:
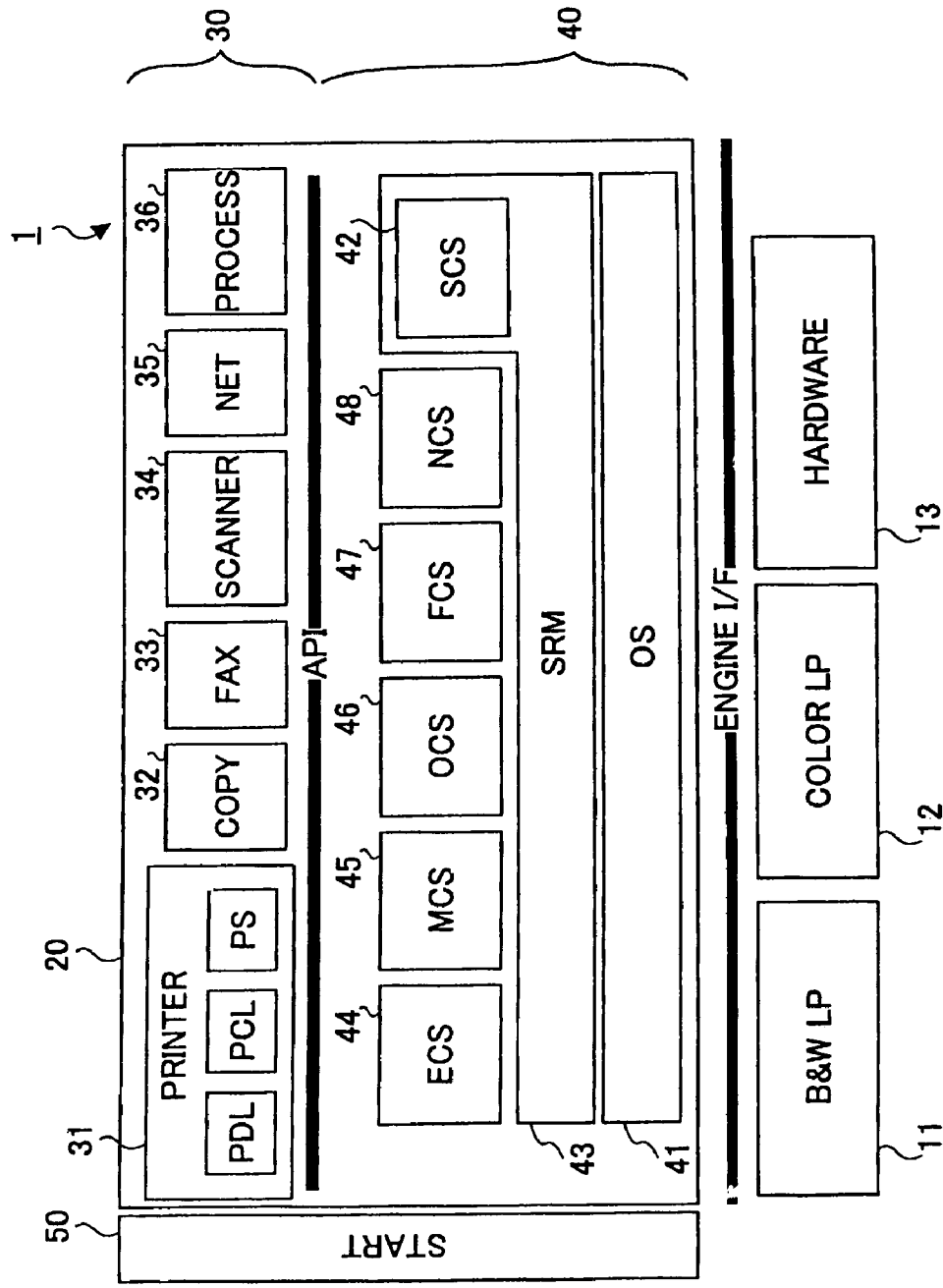
FIG. 1 shows a block diagram of an image forming apparatus according to respective embodiments of the present invention.

Embodiments of the present invention will now be described with reference to figures. FIG. 1 shows a configuration of a composite machine in a first embodiment of the present invention. The composite machine 1 has, as parts thereof, a monochrome laser printer (B & W LP) 11, a color laser printer (Color LP) 12, hardware resources 13 such as a scanner, a facsimile device, and so forth, a software group 20, and a composite machine starting part 50. The software group 20 has applications 30 and a platform 40. The applications 30 perform processing corresponding to respective ones of various user services concerning image formation processing as a printer service, a copy service, a facsimile service, a scanner service, etc.

The applications 30 include a printer application 31 for providing the printer service having a page description language (PDL, PCL) and a PostScript (PS); a copy application 32 for providing the copy service; a facsimile application 33 for providing the facsimile service; a scanner application 34 for providing the scanner service; a net file application 35 for handing a predetermined network file; and a process inspection application 36 for performing process inspection, in the composite machine 1. Thereby, the composite machine 1 can perform various functions such as functions providing the printer service, copy service, facsimile service, scanner service and so forth, by the sole machine.

The platform 40 includes, as software programs, a control service which interprets a processing request sent from an application, and creates a request for acquiring a hardware resource accordingly; a system resource manager (referred to as an SRM, hereinafter) 43 which performs management on at least one hardware resource, and performs arbitration on the acquiring request sent from the control service, and an operating system (referred to as an OS, hereinafter) 41.

The above-mentioned control service is configured to have at least one service module such as a system control service (referred to as an SCS) 42; an engine control service (referred to as an ECS) 44; a memory control service (referred to as an MCS) 45; an operation panel control service (referred to as an OCS) 46; a facsimile control service (referred to as an FCS) 47; a network control service (referred to as a NCS) 48, and so forth.

The platform 40 has an application program interface (referred to as an API) through which a processing request coming from an application 30 can be properly received thanks to a previously defined function. The OS 41 is of a well-known UNIX® or so, and carries out parallel execution of respective ones of the software programs included in the platform 40 and applications 30 regarding as respective processes.

A process of the SRM 43 is of performing a control of the system and a management of the hardware resources together with the SCS 42. For example, the SRM 43 performs arbitration and execution control according to requests coming from higher layers utilizing the hardware resources such as engines, memories, HDD files, and host I/Os (Centronics I/F, network I/F, IEEE1394 I/F, RS232C I/F, etc.).

Specifically, the SRM 43 determines whether or not a requested hardware resource is available or whether or not this resource is already used by another request, and, when it is available, it notifies that the requested hardware resource is available to an upper layer. Furthermore, the SRM 43 receives requests from upper layers, performs scheduling thereon for efficiently utilizing the hardware resources, and also directly performs requested tasks (for example, paper feeding and image formation via the printer engine, memory acquisition, file creation, and so forth).

A process of the SCS 42 is of an application management, an operation unit control, a system screen display, an LED display, a hardware resource management, an interruption application control, etc. A process of the ECS 44 is of controlling engines, such as the monochrome laser printer 11, the color laser printer 12, the hardware resource 13, and so forth.

A process of the MCS 45 is of a memory control such as acquisition/release of an image memory, a use of an HDD, compression/decompression of image data, etc. A process of the OCS 46 is of a control of an operation panel which is used as a man-machine interface between an operator and the machine control in the composite machine itself.

A process of the FCS 47 provides an API for performing a facsimile transmission/reception utilizing PSTN or ISDN from each application of a system controller, registration/reference of various types of facsimile data managed in a memory for a backup purpose, facsimile reading operation, facsimile reception and printing operation, combined transmission/reception, and so forth.

A process of the NCS 48 provides a service utilizable by an application which needs a network I/O in common, and acts as an agency of performing distribution of data received from the network in each protocol and performing transmission of data coming from each application via the network.

For example, the NCS 48 controls data communications with a network apparatus connected through the network by HTTP (HyperText Transfer Protocol) by httpd (HyperText Transfer Protocol Daemon).

The composite machine 1 can manage, in centralization manner, operations required in common by respective applications in the platform 40. A hardware configuration of the composite machine 1 will now be described.

Figure 2:
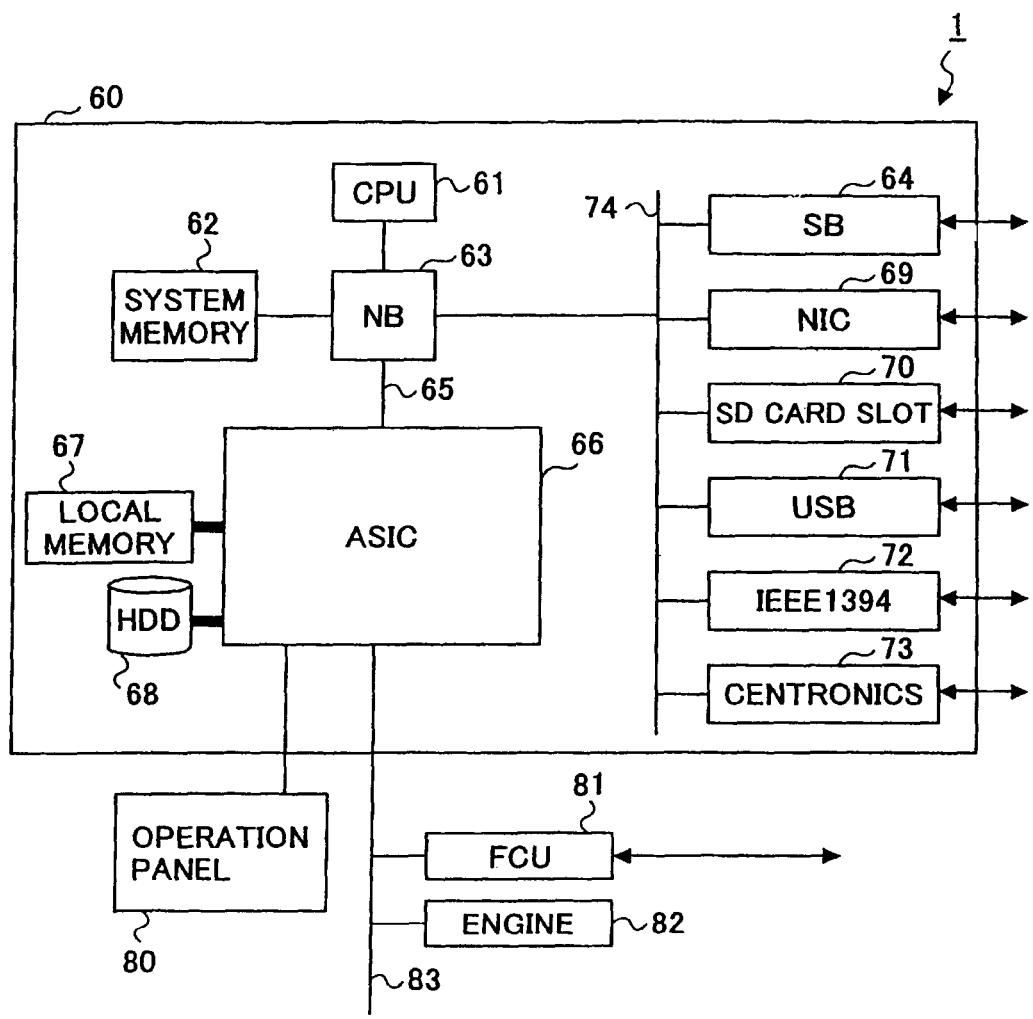
FIG. 2 shows a hardware configuration of the image forming apparatus shown in FIG. 1.

FIG. 2 shows a hardware configuration of the above-described composite machine according to the first embodiment of the present invention. The composite machine 1 includes a controller 60, an operation panel 80, an FCU 81, and an engine part 82. The controller 60 includes a CPU 61, a system memory 62, a north bridge (NB) 63, a south bridge (SB) 64, an ASIC 66, a local memory 67, a HDD 68, a network interface card (NIC) 69, an SD card slot 70, a USB device 71, an IEEE1394 device 72, and a centronics device 73.

The operation panel 80 is connected to the ASIC 66 of the controller 60. The FCU 81 and the engine part 82 are connected to the ASIC 66 of the controller 60 by a PCI bus 83. In the controller 60, the local memory 67, HDD 68, etc. are connected to the ASIC 66, and the CPU 61 and the ASIC 66 are connected together via the NB 63 of the CPU chip set. In the controller 60, by connecting the CPU 61 and the ASIC 66 via the NB 63, the controller 60 deals with a case when the interface of the CPU 61 is not opened to the public. In addition, the ASIC 66 and the NB 63 are connected together via an AGP (Accelerated Graphics Port) 65.

Thus, in the execution control of one or a plurality of processes provided by the applications 30 and the platform 40 of FIG. 1, a degradation in performance can be avoided by connecting the ASIC 66 and the NB 63 together not via a low-speed PCI bus but via the AGP 65.

The CPU 61 performs a control of the entire composite machine 1. The CPU 61 starts and executes the SCS 42, SRM 43, ECS 44, MCS 45, OCS 46, FCS 47, and NCS 48 as processes, respectively, on the OS 41, and, also, starts and executes the printer application 31, copy application 32, facsimile application 33, scanner application 34, network application 35 and process inspection application 35 included in the applications 30.

The NB 63 is a bridge connecting the CPU 61, system memory 62, SB 64, ASIC 66, NIC 69, SD card slot 70, USB device 71, IEEE1394 device 72, and centronics device 73 together.

The SB 64, NIC 69, SD card slot 70, USB device 71, IEEE1394 device 72, and centronics device 73 are connected to the NB 63 via the PCI bus 74. The SB 64 is a bridge connecting a ROM, a peripheral device, etc. with the PCI bus 74.

The system memory 62 is a memory used for image drawing or so performed in the composite machine 1. The local memory 67 is a memory used as an image buffer used for a copying operation, and also, as a code buffer.

The ASIC 66 is an IC for a use of image processing purpose, and has hardware devices used for image processing. The HDD 68 acts as a storage device (secondary storage unit) storing image data, document data, programs, font data, data of various forms and so forth.

The NIC 69 is an interface device which connects the composite machine 1 to the network. The SD card slot 7 has a configuration such that an SD card (Secure Digital memory card) can be inserted thereinto and removed therefrom, and performs an interrupt to an SD card status monitor driver which will be described later in response to the operation of insertion/removal of the SD card. The USB device 71, IEEE1394 device 72, and centronics device 73 are interfaces operable according to respective standards.

The operation panel 80 is an operation part which performs a display to an operator, while receives an input operation from the operator. The FCU 81 has a memory which is utilized for, for example, temporarily storing facsimile data received when a power supply of the composite machine 1 is turned off.

Figure 3:
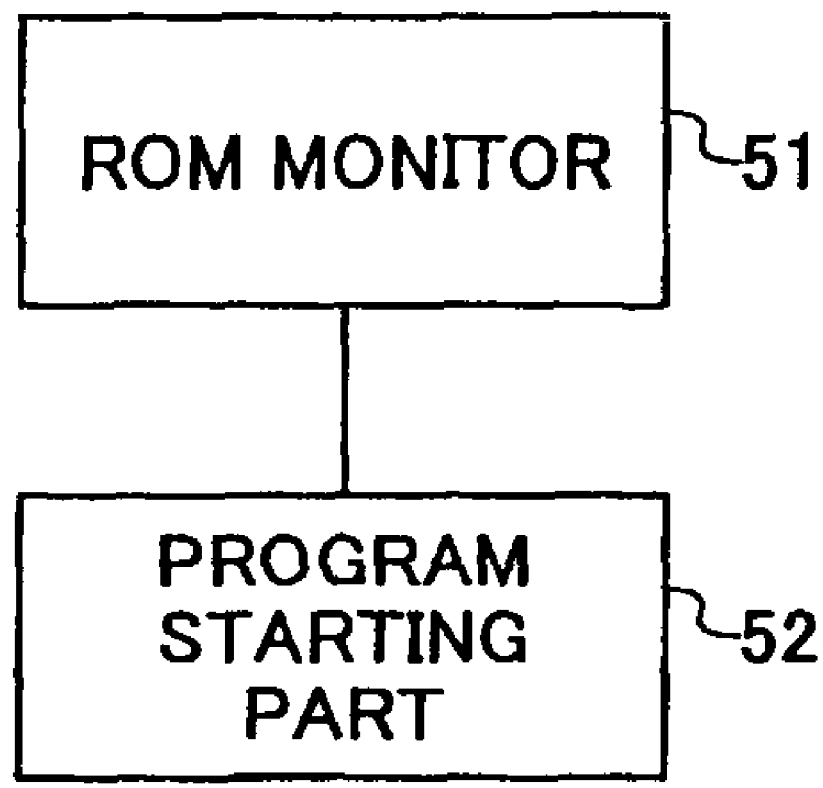
FIG. 3 shows a partial configuration of the image forming apparatus shown in FIG. 1.

The composite machine starting part 50 of FIG. 1, which includes programs, is first executed at a time of a power supply start in the composite machine 1, and starts up the platform 40 and applications 30. FIG. 3 shows a configuration of one example of the composite machine starting part 50. The composite machine starting part 50 has a ROM monitor 51 and a program starting part 52.

The ROM monitor 51 acting as a BIOS and a boot loader is executed at a time of a power supply start occasion, and performs an initialization of the hardware, a diagnosis of the controller 60, an initialization of the software, etc. The ROM monitor 51 develops a kernel and a route file system on the system memory 62, and starts the kernel. Then, the kernel mounts the route file system.

The program starting part 52 acting as an application/service starting program is called by the kernel, and acquires memory areas on the system memory 62 and the local memory 67. The program starting part 52 is a process first started in the composite machine 1, and mounts the file system according to instructions written in a predetermined setting file.

The program starting part 52 reads programs of the applications 30 and platform 40 needed for operation of the composite machine 1 from the ROM according to a procedure written in the predetermined setting file, develops the thus-read respective programs in the memory areas acquired in the system memory 62 and local memory 67, and starts the processes of the applications 30 and platform 40.

Operation performed by the program starting part 52 will now be described in detail. The program starting part 52 reads a predetermined master setting file at a time of starting, and performs mounting of a file system and starting of a process according to the thus-read master setting file provided in the machine 1 itself. For example, in a case of processing a file tree shown in FIG. 4 provided in the machine 1 itself, the program starting part 52 reads a file "/etc/init.conf" as the master setting file at a time of starting according to the description (1) shown in the figure. FIG. 4 shows a configuration of an example of the file tree which is provided in the machine starting part 50 and performed by the program starting part 52 also provided in the machine starting part 50.

The program starting part 52 performs a mounting operation according to a description of mounting, when the description of mounting exists in the thus-read master setting file. For example, in a case where the master setting file has contents as shown in FIG. 5, the program starting part 52 performs a mounting operation on respective file systems written in SD cards 0 through 3 according to the description (2) shown in the figure. FIG. 5 shows a configuration of an example of the above-mentioned master setting file.

In a case where a predetermined setting file is written along a route of the file system which the program starting part 52 has thus mounted from the SD card, or a predetermined directory which includes a file with a predetermined extension along a route of the file system which the program starting part 52 has thus mounted from the SD card, the program starting part 52 first reads the predetermined file or the above-mentioned file with the predetermined extension, and continues the mounting of the file system.

For example, when a setting file "init.conf" or "init.cnf" having the contents shown in FIG. 6 exists along a route of an SD card file system which is thus mounted from the SD card, the program starting part 52 continues the mounting processing according to the description of mounting (3) which exists in this setting file. FIG. 6 shows a configuration of an example of the above-mentioned setting file.

When a directory "init.d" (4) exists along a route of the SD card file system thus mounted, and this directory includes a file name with an extension "conf" or "cnf" (5), the program starting part 52 performs mounting processing according to a description which exists in this file. FIG. 7 shows a configuration of an example of the file tree of files previously written in the SD card.

A file system which the program starting part 52 can mount is one of "gzromfs" or so (see FIGS. 5 and 6, (6)) which means a file system according to which a compressed file in a form of ROMFS is developed onto a RAM, and, mounting thereof is performed. After a file written in the SD card is thus read out and mounted in the composite machine 1 as mentioned above, the file becomes accessible by the body part of the composite machine 1 accordingly.

Hereafter, an example of adding a new application to the composite machine 1 from an SD card in which the new application is previously recorded during the power supply to the composite machine 1 being maintained or the machine being running will now be described.

Figure 8:
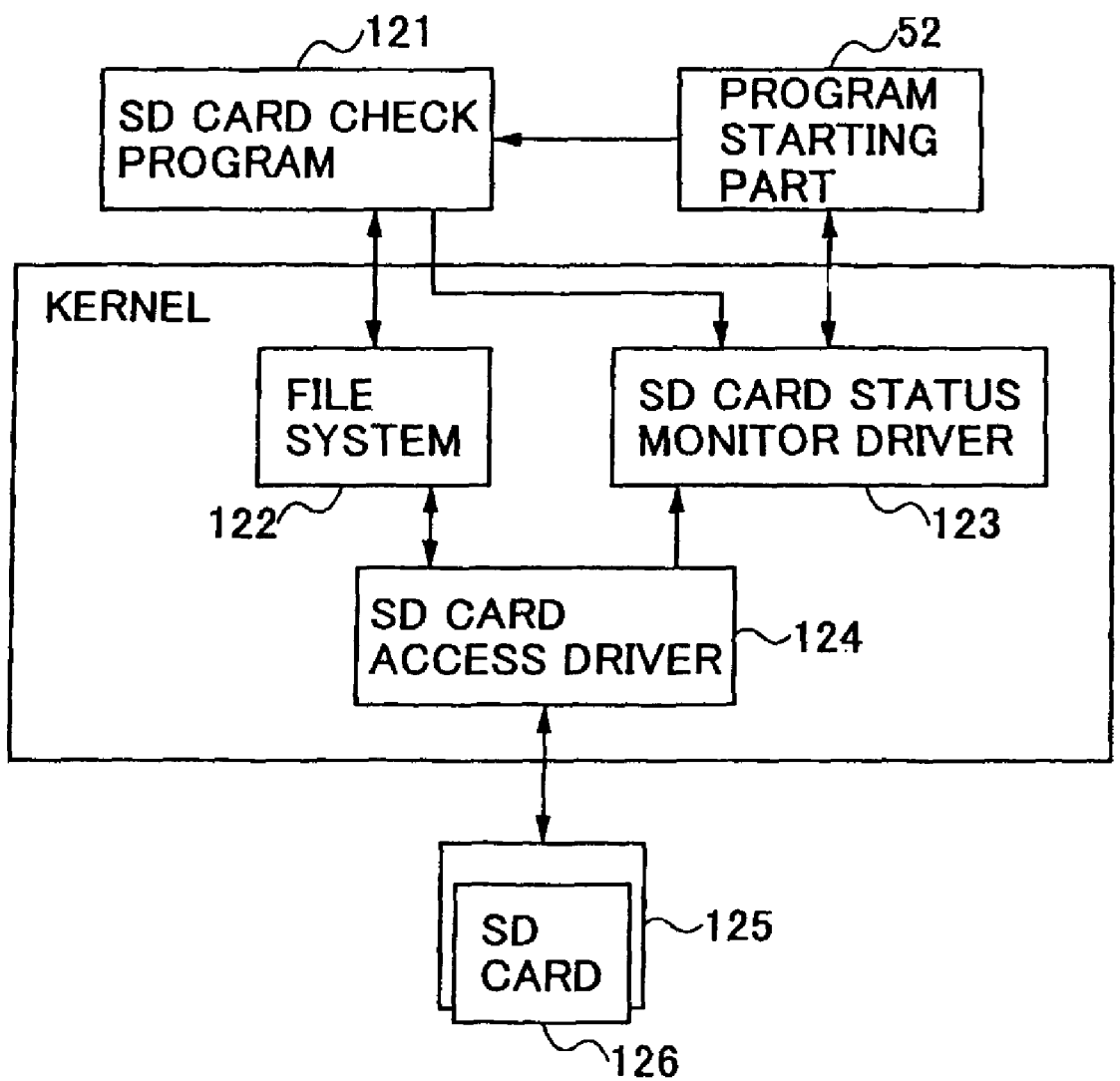
FIG. 8 illustrates an information processing system to operate in the image forming apparatus shown in FIG. 1.

FIG. 8 shows a block diagram of the first embodiment according to the present invention of a method of adding a new program. In FIG. 8, a configuration particularly required for this description purpose is shown while the other is omitted therefrom for the purpose of simplification.

In the SD card 126 as a removable recording medium, a route file system, a service layer, an application, font data, etc. are previously recorded in a form of binary file system including a header storing module information and data in an ROMFS (ROM file system) format.

The composite machine 1 is configured so that the SD card 126 can be inserted thereinto or removed therefrom in a state in which the power supply to the composite machine is maintained, in other words, insertion or removal of the SD card can be performed in a so-called hot plugging manner. A SD card slot 125 can have the SD card 126 inserted thereinto or removed therefrom, and, then provides an interrupt to an SD card access driver 124 in response to the insertion/removal of the SD card 126.

An SD card access driver 124 performs an access control on the SD card 126, and notifies an SD card status monitor driver 123 of insertion/removal of the SD card 126 according to the interrupt performed by the SD card slot 125.

The SD card status monitor driver 123 manages status information concerning the SD card 126 such as that of insertion, removal, mounting, unmounting and so forth of the SD card 126, and the SD card status monitor driver 123 notifies the program starting part 52 of this status information on the SD card 126.

The program starting part 52 starts an SD card check program 121 in response to insertion/removal of the SD card 126. Further, the program starting part 52 starts a program written in the SD card 126 according to the status information of the SD card 126 provided from the SD card status monitor driver 123.

The SD card check program 121 determines as to the SD card 126 whether or not a partition is properly set therein, whether or not a status in the file system does not have any problem, and so forth, for the purpose of causing the file system 121 originally written in the SD card 126 to enter a state in which the file system can be properly utilized for the machine 1. The SD card check program 121 has, for example, a function of verifying the SD card 126, a function of mounting the file system of the SD card, a function of unmounting the same, a function of notifying necessary statues information, etc.

Figure 9:
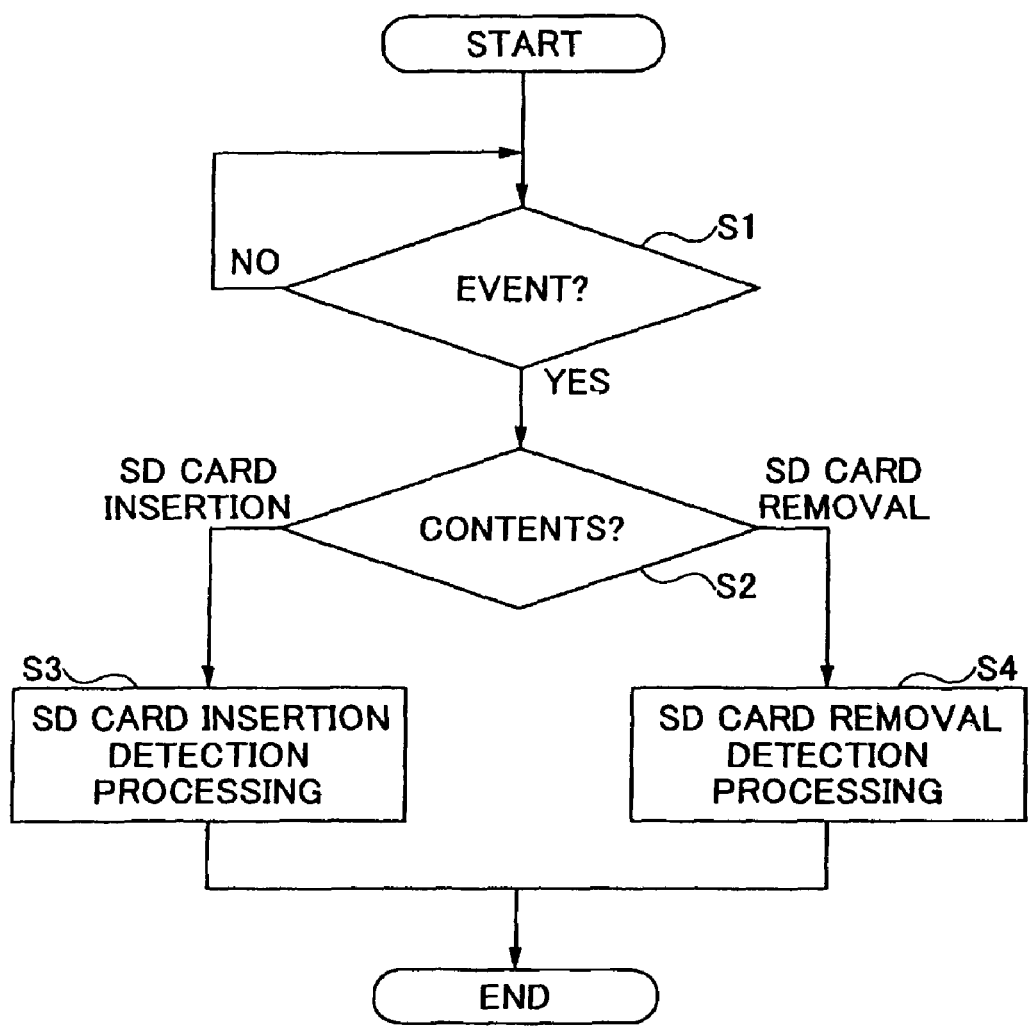
FIG. 9 shows an operation flow chart illustrating an event waiting operation performed in the image forming apparatus shown in FIG. 1.

With reference to figures, an operation procedure of the method of adding a new program in the first embodiment according to the present invention will now be described. The program starting part 52 enters a state of waiting for an event, after starting the application 30 of the composite machine 1 and the process of the platform 40 upon a power supply start in the composite machine 1. FIG. 9 shows a flow chart of an example of a waiting processing for an event according to the first embodiment of the present invention.

In Step S1 of FIG. 9, the program starting part 52 determines whether or not any event has occurred. When it determines that no event has occurred (NO in Step S1), the program starting part 52 repeats the processing of Step S1. When it determines that an event has occurred (Yes in the step S1), the program starting part 52 performs Step S2.

For example, when the SD card 126 is inserted in the SD card slot 125, the SD card access driver 124 notifies of the insertion of the SD card 126 to the SD card status monitor driver 123 according to an interrupt performed by the SD card slot 125 accordingly. Then, the SD card status monitor driver 123 notifies of the insertion of the SD card 126 to the program starting part 52. The program starting part 52 thus determines that an event has occurred when the insertion of the SD card 126 is notified of by the SD card status monitor driver 123.

Moreover, when the SD card 126 is removed from the SD card slot 125, in response to an interrupt made by the SD card slot 125 accordingly, the SD card access driver 124 notifies of the removal of the SD cart to the SD card status monitor driver 123. Then, the SD card status monitor driver 123 notifies of the removal of the SD card 126 to the program starting part 52. The program starting part 52 thus determines that an event occurs, when the SD card status monitor driver 123 thus notifies of the removal of the SD card 126 to the program starting part 52.

In Step S2, the program starting part 52 determines the contents of the event which has thus occurred. When the contents of the event correspond to an insertion detection of the SD card 126, the program starting part 52 performs Step S3. In Step S3, an SD card insertion detection processing which will be described later is performed thereby. On the other hand, when the contents of the event correspond to a removal detection of the SD card 126, the program starting part 52 performs Step S4. In Step S4, an SD card removal detection processing described later is performed thereby.

Figure 10:
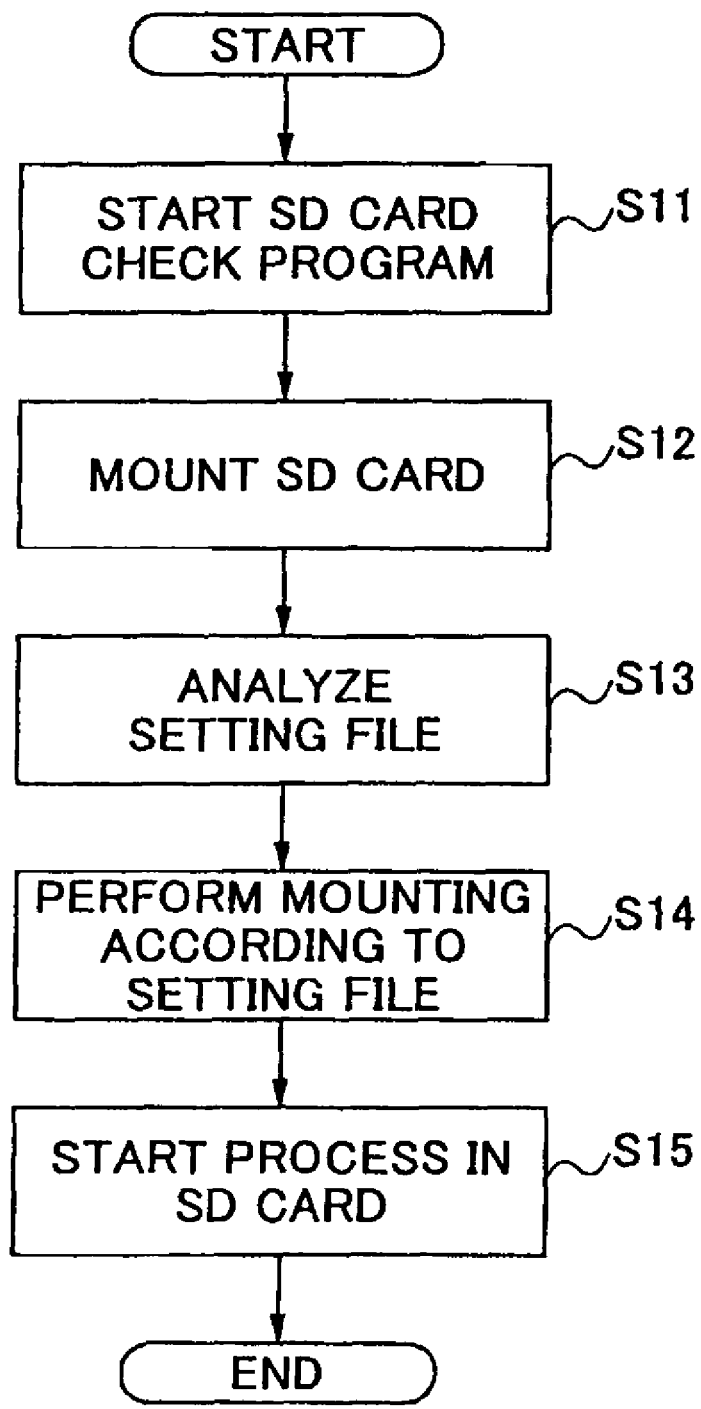
FIG. 10 shows an operation flow chart illustrating an SD card insertion detecting operation performed in the image forming apparatus shown in FIG. 1.

FIG. 10 shows an operation flow chart of an example of the above-mentioned SD card insertion detection processing. In Step S11, the program starting part 52 starts the SD card check program 121. In Step S12 following Step S11, the SD card check program 121 performs mounting of the SD card 126, or makes a file system written in the SD card 126 accessible, and notifies the SD card status monitor driver 123 of the matter that the mounting has been thus performed.

Then, in Step S13 following Step S12, after the matter that the mounting of the SD card 126 has been performed is thus notified of via the SD card status monitor driver 123, the program starting part 52 reads a setting file such as that shown in FIG. 6 or a file such as that shown in FIG. 7 from the thus-mounted SD card 126, and analyzes the same.

In Step S14 following Step S13, the program starting part 52 performs a further mounting processing according to a description for mounting which exists in the setting file such as that shown in FIG. 6 or the file such as that shown in FIG. 7. Then, in Step S15 following Step S14, the program starting part 52 starts a processing of a program recorded in the SD card 126.

Therefore, in the composite machine 1, the process of the application recorded in the SD card 126 is automatically executed although the SD card 126 is inserted into the machine 1 in a state in which the power supply is maintained or in a hot plugging manner. For example, in the composite machine 1 of FIG. 1, a new application in the SD card 126 is added as one of the applications 30.

In the SD card insertion detection processing shown in FIG. 10, the setting file such as that shown in FIG. 6, the file such as that shown in FIG. 7, or a program to be added to the applications 30 or to the platform 40 recorded in the SD card is read out therefrom, and is mounted automatically. However, for a purpose of preventing an illegal copy of the SD card 126, an electronic authentication check system may be applied as will now be described.

Figure 11:
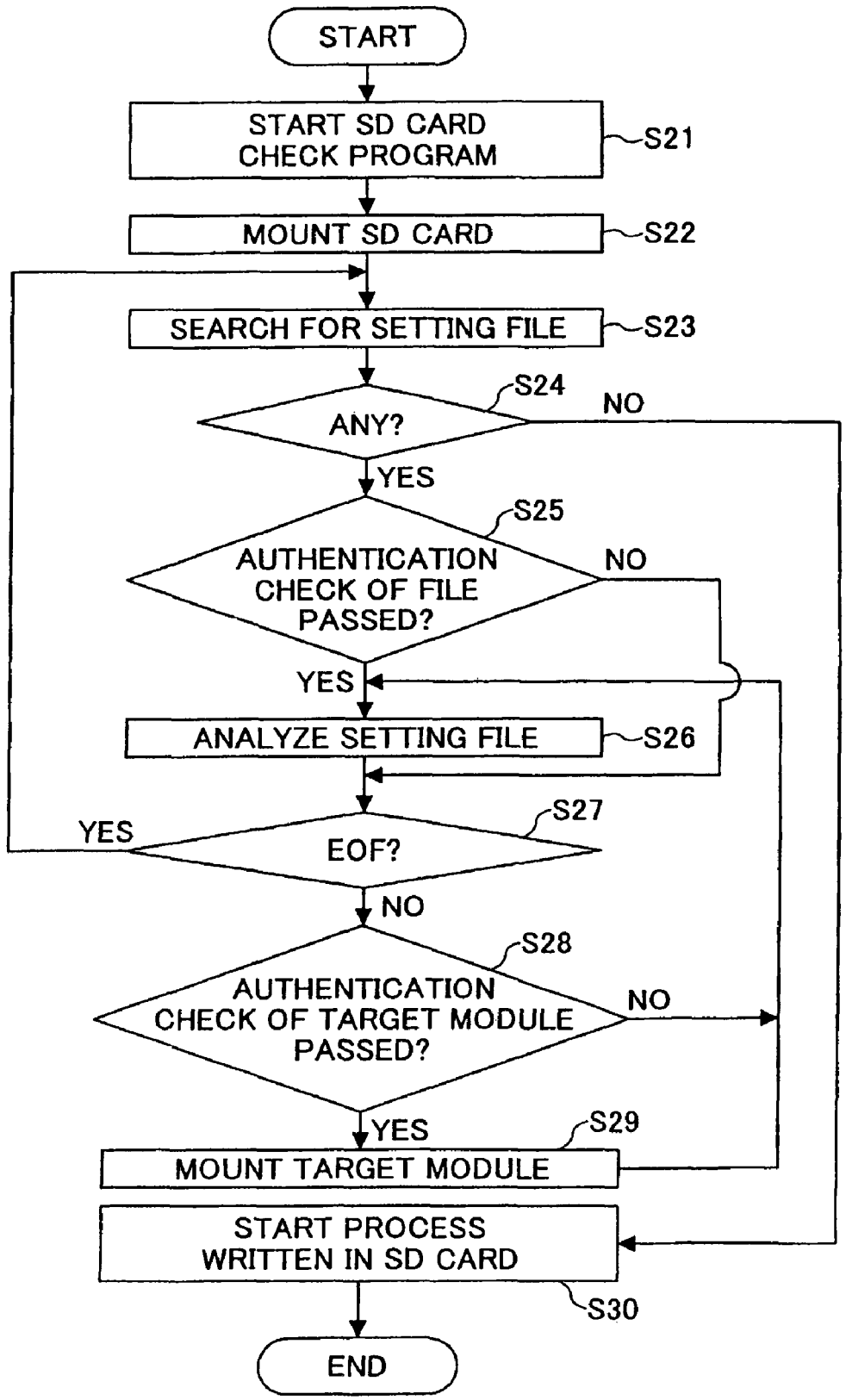
FIGS. 11 and 12 show operation flow charts illustrating electronic authentication operation performed in the image forming apparatus shown in FIG. 1.

FIG. 11 shows an operation flow chart of an example of an SD card insertion detection processing according to another embodiment of the present invention. This processing is different from the same described above with reference to FIG. 10 in that the above-mentioned electronic authentication check function is performed additionally. Steps S21 and S22 are the same as Steps S11 and S11 in the flow chart of FIG. 10, and the description thereof is omitted.

When the matter that the SD card 126 is mounted is notified of from the SD card status monitor driver 123, the program starting part 52 searches for a setting file in the thus-mounted SD card 126 in Step S23. Then, when a setting file is thus found out in Step S24 (Yes), the program starting part 52 performs Step S25. Otherwise, when no setting file is found out (No in Step S24), the program starting part 52 performs Step S30.

Figure 12:
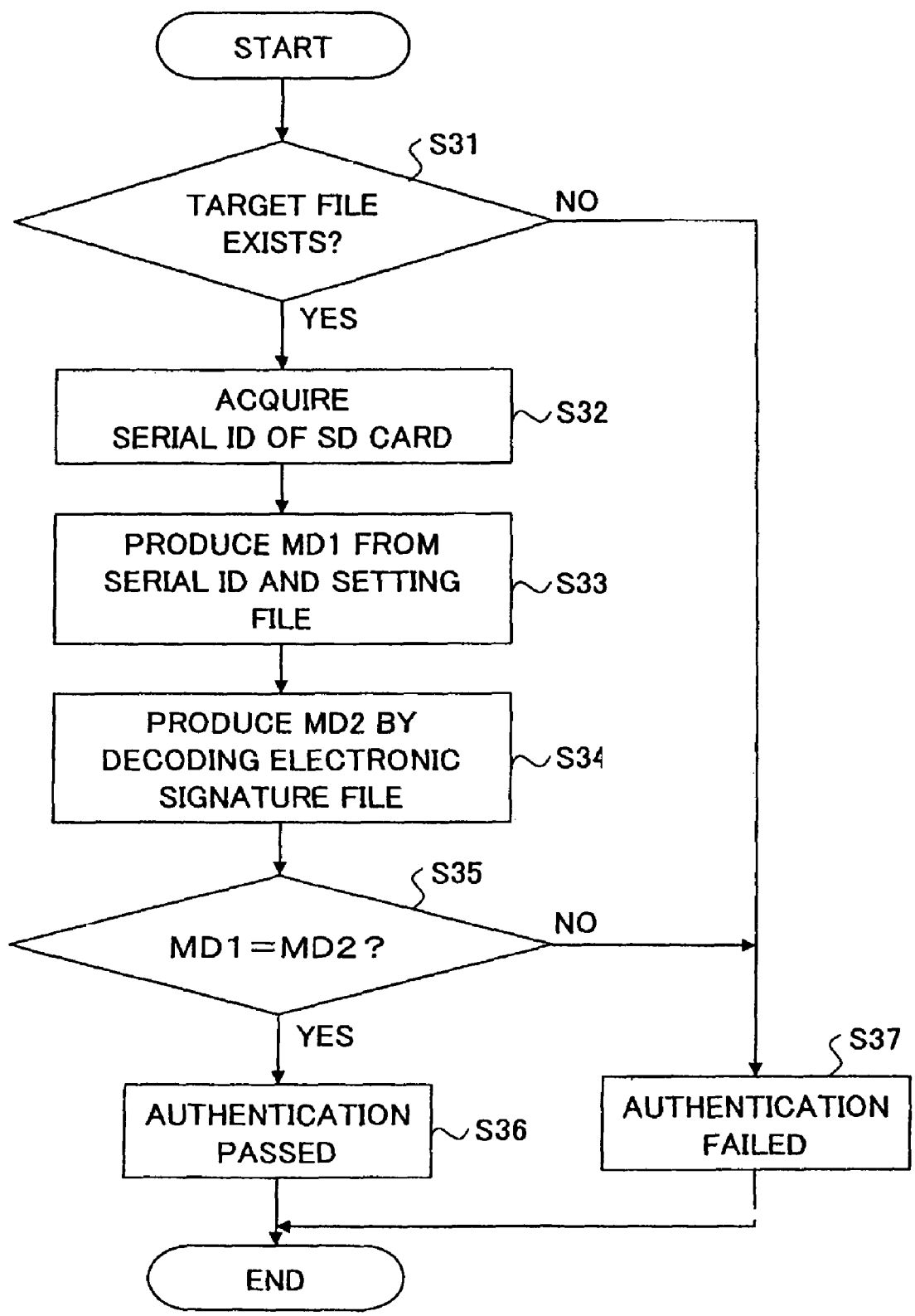

In Step S25, the program starting part 52 performs a predetermined authentication check on the thus-found setting file using a previously provided library for electronic authentication check. For example, the authentication check on the setting file is performed as shown in a flow chart of FIG. 12. FIG. 12 shows an operation flow chart of an example of processing of the authentication check performed on a setting file.

In Step S31, the program starting part 52 determines whether or not a predetermined target file to be utilized for an authentication check on the setting file exists in the SD card 126. The predetermined target file utilized for an authentication check of the setting file includes, for example, an electronic signature file produced from the setting file and a message digest (simply referred to as an MD) of the setting file and a serial ID of the SD card.

Figures 13, 14:
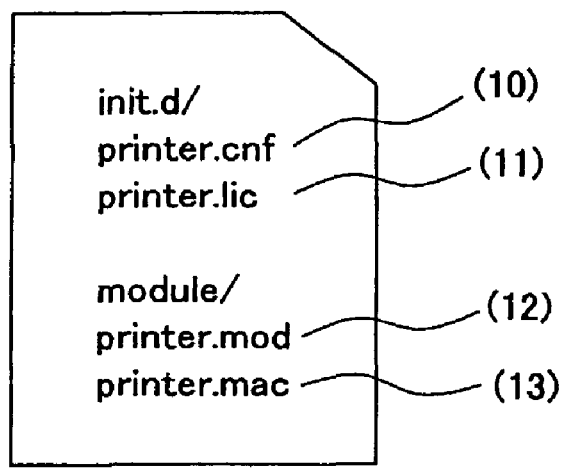
FIG. 13 illustrates one example of files recorded in an SD card to be mounted in the image forming apparatus shown in FIG. 1.
FIG. 14 illustrates one example of a setting file recorded in an SD card used for a mounting operation in the image forming apparatus shown in FIG. 1.

FIG. 13 shows an image diagram of an example of the above-mentioned target file recorded in the SD card. In FIG. 13, a description (10) "printer.cnf" indicates the setting file, a description (11) "printer.lic" indicates the above-mentioned electronic signature file used for the authentication check of the setting file, and a description (12) "printer.mod" indicates a module file to be mounted, and a description (13) "printer.mac" indicates an electronic signature file used for the authentication check of the module to be mounted.

When the program starting part 52 determines that the target file to be used for the authentication check of the setting file exists (Yes in Step S31), the electronic signature file used for the authentication check of the setting file and the setting file are acquired from the SD card 126, and the program starting part 52 performs Step S32.

In Step S32, the program starting part 52 acquires the serial ID of the SD card 126 from the SD card 126. Then, in Step S33, the program starting part 52 produces an MD1 from the setting file acquired in Step S31 and the serial ID of the SD card 126 acquired in Step S32. Then, in Step S34 following Step S33, the program starting part 52 decodes the electronic signature file acquired in step S31 with a previously provided predetermined public key, and thus obtains an MD2.

Then, in Step S35, the program starting part 52 determines whether or not the MD1 produced in Step S33 and the MD2 obtained in Step S34 are equal to each other. When it is determined that the MD1 and MD2 are equal to each other (Yes in Step S35), the program starting part 52 performs Step S36, and makes a decision that the authentication check of the setting file is passed properly for the setting file.

On the other hand, when it is determined that the MD1 and MD2 are not equal (No in Step S35), the program starting part 52 performs Step S37, and makes a decision that the authentication check of the setting file is failed. In case the MD1 and MD2 are not equal, it means there is a possibility that the file recorded in the SD card 126 has been recorded illegally.

When it is determined that no target file to be used for the authentication check of the setting file exists (No in Step S31), the program starting part 52 performs Step S37, and determines that the authentication check of the setting file is failed.

Returning to FIG. 11, when the authentication check of the setting file is passed (Yes in Step S25), the program starting part 52 performs Step S26, and analyzes the setting file such as that shown in FIG. 14. The program starting part 52 on the other hand performs Step S27, when the authentication check of the setting file is failed (No in Step S25).

FIG. 14 shows an image diagram of an example of the above-mentioned setting file. This setting file includes instructions for an operation of mounting a gzip-compressed file "module/printer.mod" in a ROMFS form onto a mount point "/mnt/printer", and an operation of executing the thus-mounted module file.

In Step S27 following Step S26, the program starting part 52 determines whether an EOF (End Of File) recorded in the setting file is found. When it is determined that an EOF has been found (Yes in Step S27), the program starting part 52 returns to Step S23. On the other hand, when it is determined that no EOF is found (No in Step S27) yet, the program starting part 52 performs Step S28.

In Step S28, when there occurs an instruction for mounting in the setting file, an authentication check of a module to be mounted according to this instruction is performed using a predetermined library used for an electronic authentication check, by the program starting part 52.

Figure 15:
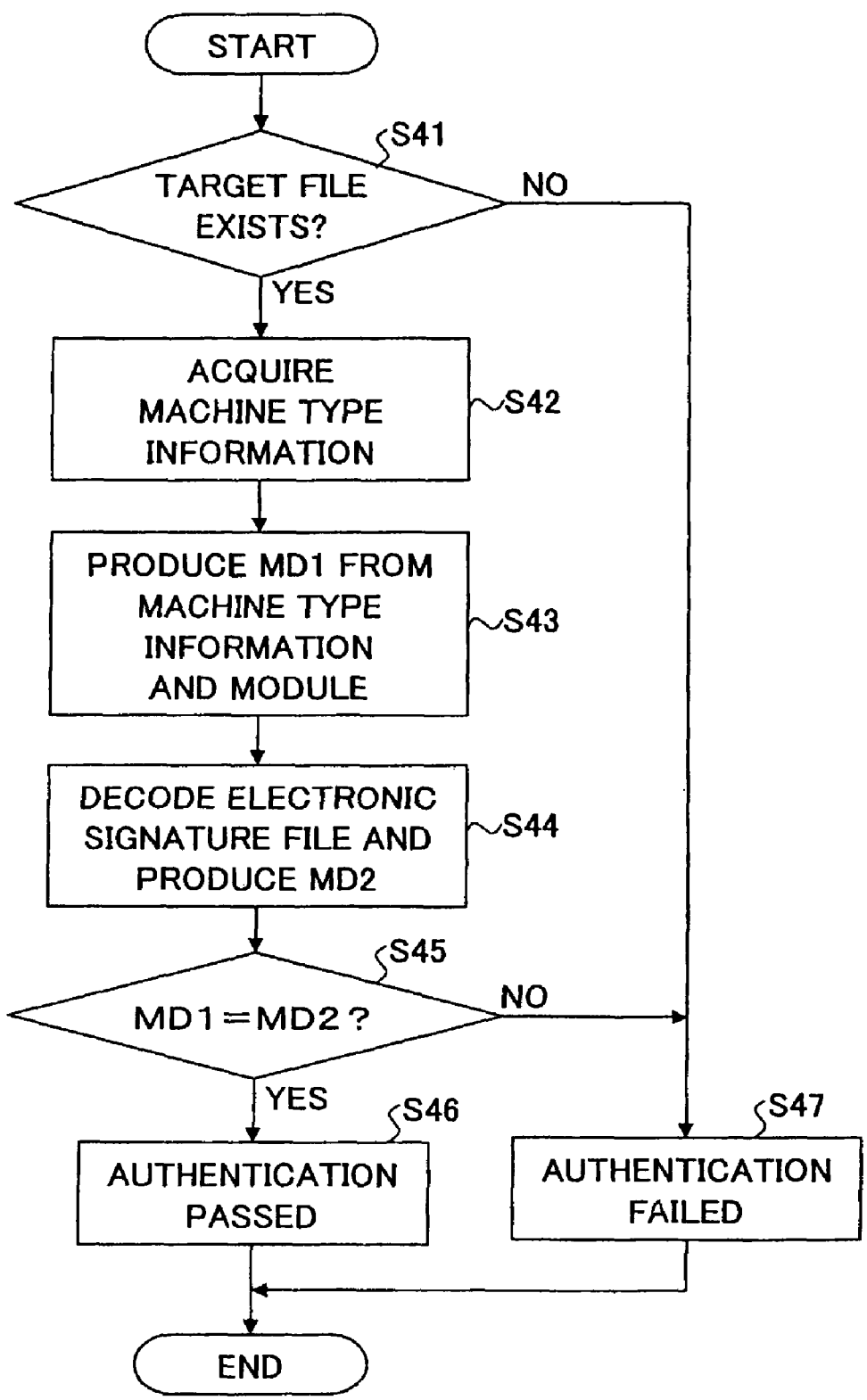
FIG. 15 shows an operation flow chart illustrating another electronic authentication operation performed in the image forming apparatus shown in FIG. 1.

For example, the authentication check of the module to be mounted is performed as shown in an operation flow chart shown in FIG. 15. In a step S41, the program starting part 52 determines whether or not a predetermined target file to be used for the authentication check of the module to be mounted exists in the SD card 126. The predetermined target file to be used for the authentication check of the mount target module to be mounted includes, for example, an electronic signature file produced from a module file of the module to be mounted and an MD of the module file and machine type information of the composite machine.

When the program starting part 52 determines that the target file to be used for the authentication check of the target module exists (Yes in Step S41), the electronic signature file used for the authentication check of the module file of the mount target module and the module file of this mount target module itself are acquired from the SD card 126, and the program starting part 52 performs Step S42.

In Step S42, the program starting part 52 acquires the machine type information from the above-mentioned target file of the SD card. Then, in Step S43, the program starting part 52 produces an MD1 from the module file acquired in Step S41 and the machine type information of the composite machine 1 acquired in Step S42. Then, in Step S44 following Step S43, the program starting part 52 decodes the electronic signature file acquired in step S41 with a previously provided predetermined public key, and thus obtains an MD2.

Then, in Step S45, the program starting part 52 determines whether or not the MD1 produced in Step S43 and the MD2 obtained in Step S44 are equal to each other. When it is determined that the MD1 and MD2 are equal to each other (Yes in Step S45), the program starting part 52 performs Step S46, and makes a decision that the authentication check of the mount target module file is passed.

On the other hand, when it is determined that the MD1 and MD2 are not equal (No in Step S45), the program starting part 52 performs Step S47, and makes a decision that the authentication check of the mount target module file is failed. In case the MD1 and MD2 are not equal, it means there is a possibility that the file recorded in the SD card 126 has undergone an illegal operation such as illegal copy, interpolation or so.

When it is determined that no target file to be used for the authentication check of the module file exists (No in Step S41), the program starting part 52 performs Step S47, and determines that the authentication check of the mount target module file is failed.

Returning to FIG. 11, when the authentication check of the mount target module to be mounted has been passed (Yes in Step S28), the program starting part 52 performs Step S29, mounts the relevant mount target module to be mounted, and returns to Step S26. The program starting part 52 repeats the processing of Steps S23 through S29 until completing the authentication check of all the setting files and mount target modules written in the SD card 126.

After completing the authentication check of all the setting files and mount target modules written in the SD card 126, the program starting part 52 determines that any setting file which has not been processed does not exist in the mounted SD card 126 (No in Step S24), and performs Step S30. In Step S30, the program starting part 52 starts and executes the mount target module which has been mounted in Step S29. Since any module whose authentication check has been failed is not mounted in Step S29, such module is not executed in Step S30 accordingly.

A function of the program starting part 52 may be provided such that, when all the SD card insertion detection processing described above with reference FIG. 10 or FIG. 11 is completed, the program starting part 52 notifies a process of application 30 or the platform 40 of this matter. A file "/tmp/init.done" may be produced in the file tree shown in FIG. 4, which file indicates that all the SD card insertion detection processing has been completed, and, thereby, the program starting part 52 can notify the process of the application 30 or the platform 40 of the matter that all the SD card insertion detection processing has been completed.

The above-mentioned function of the program starting part 52 is useful, for example, for the printer application 31 which needs font data for performing own process of printing a document or so with the font data. That is, in such a case that the printer application should perform a document printing job, it waits for the font data originally written in the SD card 126 to be mounted so that the printer application can utilize the thus-mounted font data in the document printing job. In this case, after receiving the above-mentioned notification given by the program starting part 52 indicating that the SD card insertion detection processing has been completed, the printer application 31 starts its own document printing job with acquiring the thus-mounted font data.

In case the SD card 126 is suddenly removed from the card slot 125, it is necessary to unmount the SD card 126. For this purpose, the program starting part 52 starts the SD card check program 121, which thus performs an unmounting processing on the SD card 126 as will now be described.

Figure 16:
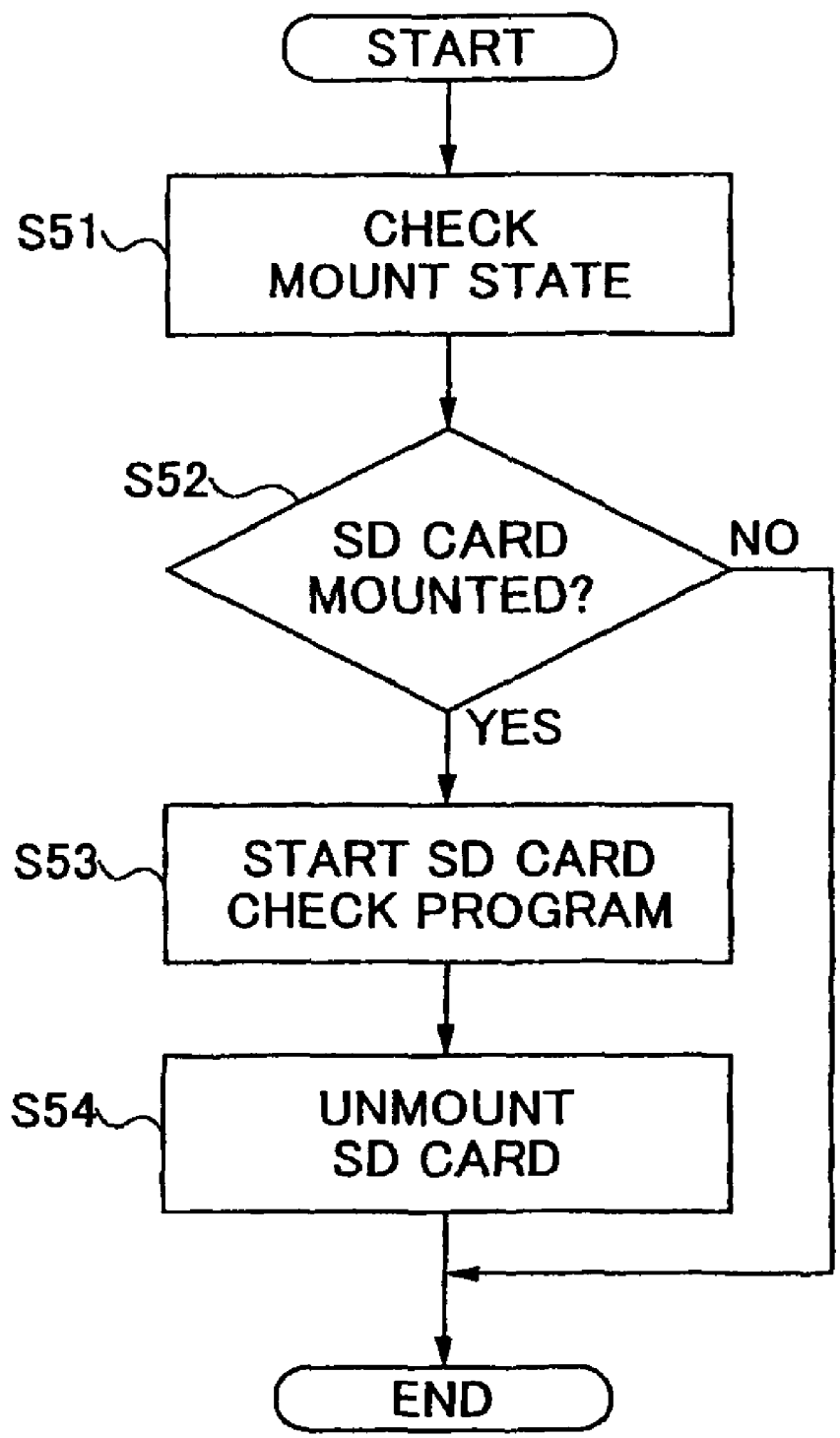
FIG. 16 shows an operation flow chart illustrating an SD card removal detecting operation performed in the image forming apparatus shown in FIG. 1.

FIG. 16 shows an operation flow chart of an example of an SD card removal detection processing. Before performing the SD card removal detection processing, the program starting part 52 may stop the programs which were started in Step S15 shown in FIG. 10. That is, by forcibly stopping the programs which were read out from the SD card 126 and then started, upon detection of removal of the SD card 126, an unauthorized/illegal use of the applications can be avoided.

In Step S51, the program starting part 52 inquires the SD card status monitor driver 123 as to the status information on the SD card 126, and examines the state of mounting of the SD card 126.

In Step S52 following Step S51, the program starting part 52 determines from a result of examination on the mounting state performed in Step S51 whether or not the SD card 126 is mounted. When it is determined that the SD card 126 is mounted according to the examination result on the mount state (Yes in Step S52), the program starting part 52 performs Step S53, and starts the above-mentioned SD card check program 121. When it is determined that the SD card 126 is not mounted first of all according to the examination result on the mounting state (No in Step S52), the program starting part 52 terminates the current processing.

In Step S54 following Step S53, the SD card check program 121 performs unmounting of the SD card 126, notifies of the matter that it has unmounted the SD card 126 to the SD card status monitor driver 123, and terminates the current processing.

Thus, in the composite machine 1, even when the SD card 126 is removed in a state in which the power supply is maintained, unmounting processing of the SD card 126 can be properly performed automatically.

As described above, according to the first embodiment of the present invention, by previously recording a program for a personal menu in the SD card 126, and, inserting this SD card into the SD card slot 125 of the machine 1, a process of this program for displaying the personal menu on the operation panel 80 can be automatically started, for example.

Further, by previously recording a program for downloading application software in the SD card, and, inserting this SD card into the SD card slot 125, a process of this program for downloading predetermined application software can be automatically started, for example.

Thus, according to the present invention, as described above, a program previously recorded in an information recording medium can be easily added to an image forming apparatus so as to add a new function thereto. Moreover, by utilizing a program previously recorded in the information recording medium, expansion of the function, upgrade of program, or so, in an image forming apparatus can be achieved easily. Furthermore, by configuring the information recording medium so that it can be inserted/removed in a hot plugging or hot swapping manner, i.e., the recording medium can be inserted/removed in a state in which the power supply in the machine is maintained or the machine is running, an addition of a program as mentioned above can be achieved dynamically in the image forming apparatus while the same image formation apparatus is kept running.

As described above, an application/service starting program such as the above-mentioned program starting part 52 in an image forming apparatus such as the above-mentioned composite machine 1 mounts a file system previously written in an information recording medium such as an SD card 126 according to a setting file also written in the information recording medium, and, then, starts a process of an application included in the thus-mounted file system according to instructions written in the above-mentioned setting file.

For this purpose, in the related art, such a setting file including instructions for mounting and starting an application software should be previously recorded in an information recording medium such as an SD card in which the application software to be used is written.

Such a setting file includes a mount target path direction indicating a path through which a target module to be mounted is reached and a mount point path direction indicating a path through which a mount point at which the above-mentioned target module is mounted is reached. The mount target path direction and mount point path direction are made utilizing absolute paths, according to the related art. However, in some case, an image forming apparatus such as the above-mentioned composite machine 1 has a plurality of slots for information recording medium such as SD card slots. In such a case, a path to be used for an application written in an SD card inserted in one slot is different from a path to be used for an application written in an SD card inserted in another slot.

Accordingly, in the related art, even when a plurality of slots are provided in a single machine for the same type of recording media, one thereof should be previously determined into which a relevant information recording medium is inserted, and a setting file special for the thus-determined slot should be previously written in the recording medium.

Further, in the related art, as the mount point path direction is made by utilizing an absolute path as mentioned above, a mount point to be used is fixed, and also, a mount point depends from a directory previously provided in a relevant image forming apparatus.

A second embodiment of the present invention which will now be described has been devised in consideration of the above-mentioned problem, and, the second embodiment of the present invention is configured such that it is not necessary to previously determine a slot (for example, SD card slot) to which a relevant recording medium is inserted, it is not necessary to fix a mount point to be applied, and, also, a mount point to be applied should not depend from a directory originally provided in a relevant image forming apparatus.

A composite machine according to this second embodiment of the present invention will now be described. This composite machine 1 in the second embodiment has a configuration generally the same as that of the composite machine 1 in the first embodiment described above, and, duplicated description will be omitted. The configuration of the above-described composite machine 1 according to the first embodiment described above with reference to FIGS. 1-9 is applied also to the above-mentioned second embodiment as it is.

Figure 17:
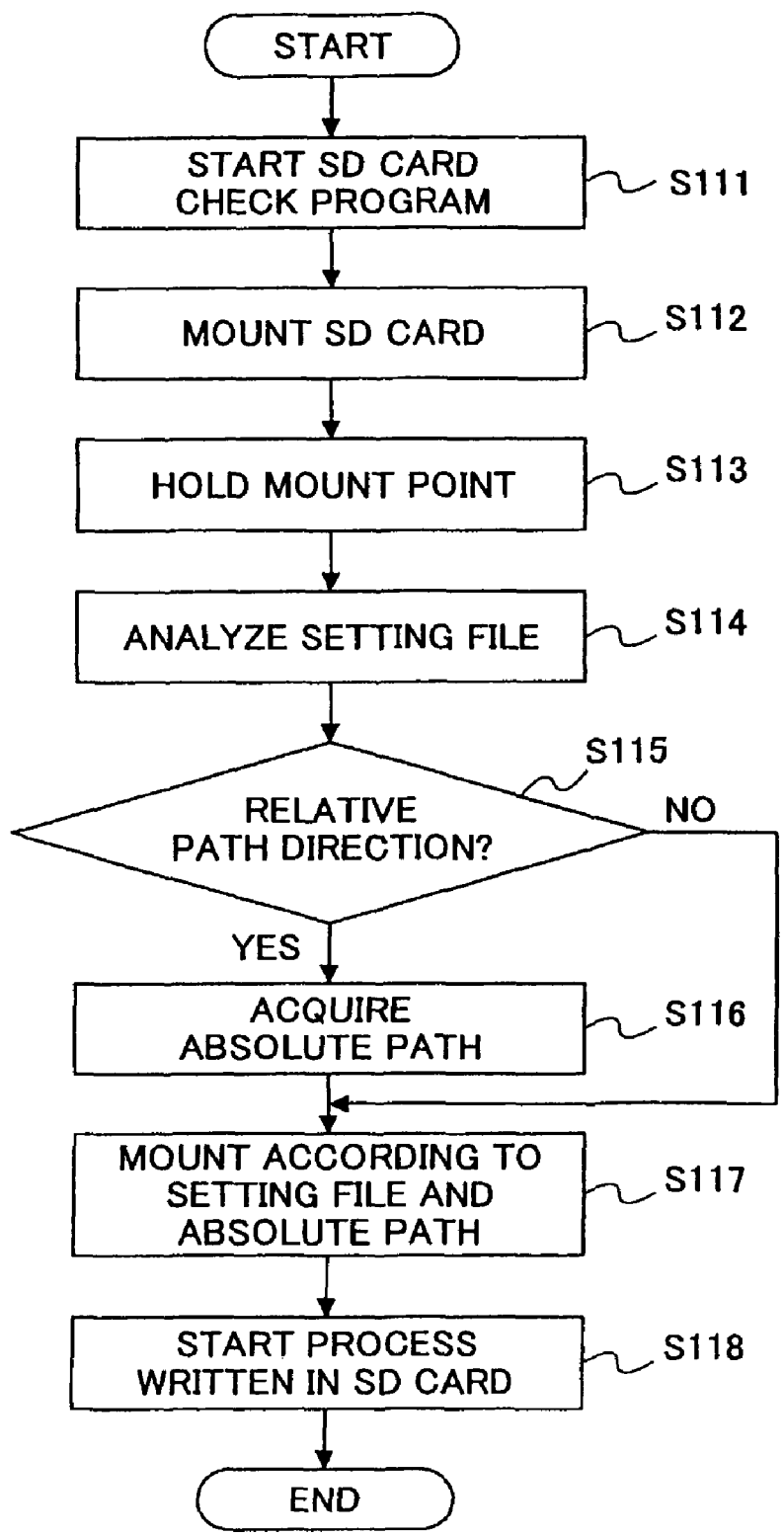
FIG. 17 shows an operation flow chart illustrating another SD card insertion detecting operation performed in the image forming apparatus shown in FIG. 1.

FIG. 17 shows an operation flow chart of an example of an SD card insertion detection processing, such as that described above on the first embodiment with reference to FIG. 10, according to the second embodiment of the present invention. According to the second embodiment, after insertion of an SD card 126 into the composite machine is detected in the same manner as in the above-described first embodiment, the program starting part 52 shown in FIG. 8 in the composite machine starts the SD card check program 121 shown in FIG. 8, in Step S111. In Step S112 following Step S111, the SD card check program 121 performs mounting of the SD card 126, or makes the file system written in the SD card 126 accessible, according to instructions written in the master setting file which was previously read by the program starting part 52 as mentioned above in the description of the first embodiment, and notifies the SD card status monitor driver 123 of the matter that the mounting has been thus performed.

For example, in case instructions such as those shown in FIG. 18 are written in the master setting file, the SD card check program 121 mounts a mount target module specified by '/dev/sd1' (21) into a mount point specified by '/mnt/sd1' (22), for example. Thereby, the relevant SD card 126 thus specified becomes accessible from the body part of the composite machine 1.

Then, in Step S113 following Step S112, the program starting part 52 holds information of the mount point to which the SD card 126 is thus mounted. For example, in the case of the master setting file shown in FIG. 18, the program starting part 52 holds the information indicating the mount point specified by '/mnt/sd1'. FIG. 18 shows one example of the master setting file.

Then, in Step S114 following Step S113, after the matter that the mounting of the SD card 126 is performed is notified of via the SD card status monitor driver 123, the program starting part 52 reads a setting file such as that shown in FIG. 19 from the thus-mounted SD card 126, and analyzes the same. FIG. 19 shows an example of the contents of the setting file in which a relative path direction is specified.

Then, in Step S115 following Step S114, based on an analysis result obtained from the analysis performed in Step S114, the program starting part 52 determines whether or not a relative path direction is specified for a mount target module, which is a file of an application or so written in the SD card 126 mounted, in the thus-analyzed setting file. In case a relative path direction is specified for the mount target module (Yes in Step S115), the program starting part 52 then performs Step S116. In case the setting file analyzed has the contents shown in FIG. 19, it can be determined from the description 'gzromfs' (23) and 'font1.gz' (24) that a relative path direction 'font1.gz' is specified for the mount target module 'gzromfs'.

On the other hand, in case a relative path direction is not specified for the mount target module (No in Step S115), the program starting part 52 then performs Step S117. In case a description in the setting file specifies an absolute path direction '/mnt/sd1/font1.gz' for the mount target module 'gzromfs' instead, a determination is made such that the absolute path indication is specified.

In Step S116, the program starting part 52 appends the information of mount point held in Step S113 to the above-mentioned relative path direction for the relevant mount target module, and, thus, acquires an absolute path direction. For example, in a case of the master setting file shown in FIG. 18 and the setting file of the SD card shown in FIG. 19, the program starting part 52 acquires an absolute path direction '/mnt/sd1/font1.gz' from the above-mentioned information of mount point 'mnt/sd1' (22) and the relative path direction 'font1.gz' (24).

In Step S117, the program starting part 52 performs a mounting operation according to the setting file analyzed in Step S114 and absolute path direction acquired in Step S116. In a case of the setting file shown in FIG. 19, according to the absolute path direction thus acquired '/mnt/sd1/font1.gz', the mount target module 'gzromfs' (23) is mounted to the mount point '/prt/font1' (25). In Step S118 following Step S117, the program starting part 52 starts a process of a program recorded in the SD card 126 and then mounted as mentioned above in Step 117.

Therefore, in the composite machine 1 according to the second embodiment, the process of the application recorded in the SD card 126 is automatically executed although the SD card 126 is inserted into the machine 1 in a state in which the power supply is maintained. For example, in the composite machine 1 of FIG. 1, a new application in the SD card 126 is added as one of the applications 30.

In the SD card insertion detection processing shown in FIG. 17, the setting file such as that shown in FIG. 6, the file such as that shown in FIG. 7, or a program to be added to the applications 30 or the platform 40 recorded in the SD card is read out from the SD card 126, and is mounted automatically. However, also in the second embodiment, for the purpose of preventing an illegal copy of the SD card 126, an electronic authentication check system may be applied as will now be described.

Figure 20:
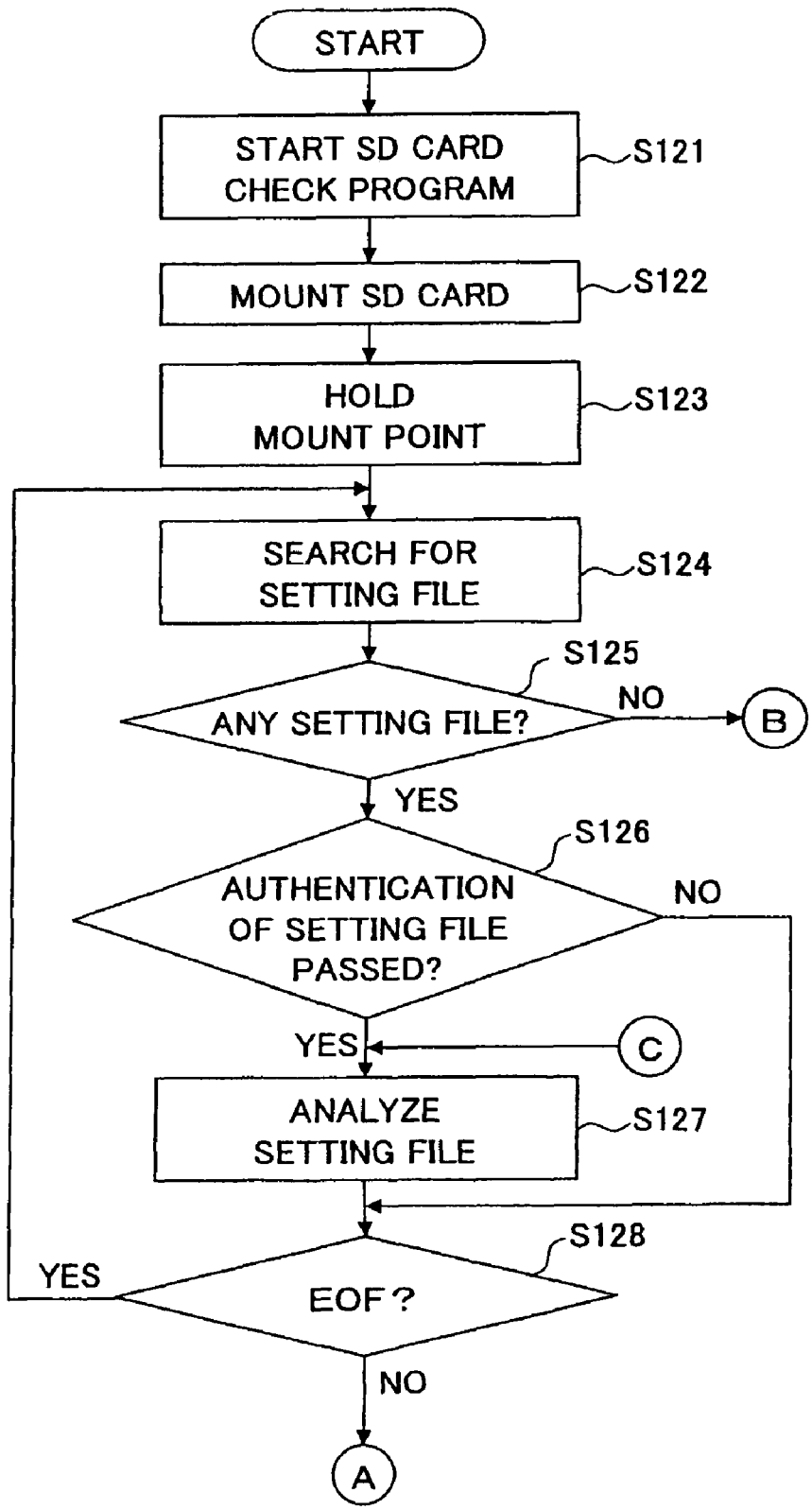
FIGS. 20, 21A and 21B show an operation flow chart illustrating another SD card insertion detecting operation performed in the image forming apparatus shown in FIG. 1.
Figure 21A:
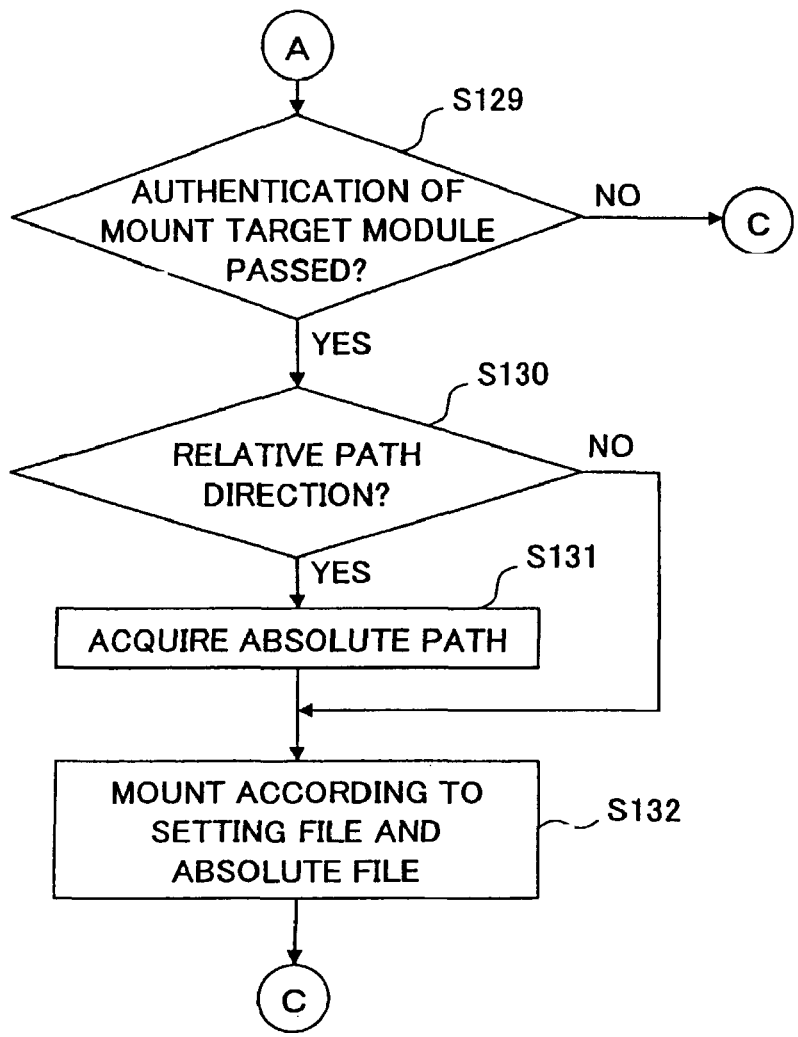
Figure 21B:
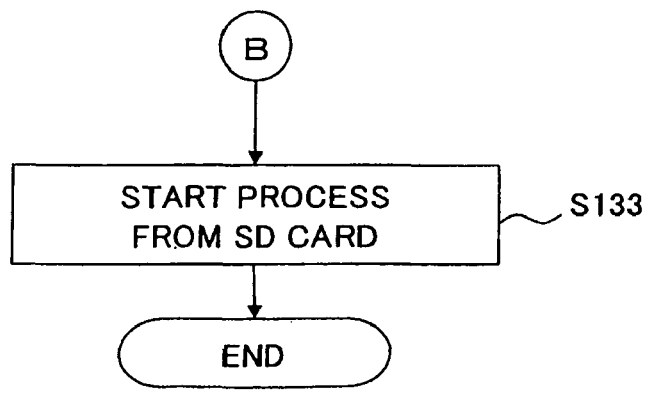

FIGS. 20, 21A and 21B show an operation flow chart of an example of an SD card insertion detection processing according to a variant of the second embodiment of the present invention. This processing is different from the same described above with reference to FIG. 17 in that an electronic authentication check function is performed additionally.

Steps S121 through S123 are the same as Steps S111 through S113 in the flow chart of FIG. 17, and the description thereof is omitted. When the matter that the SD card 126 is mounted is notified of from the SD card status monitor driver 123, the program starting part 52 searches for a setting file in the thus-mounted SD card 126 in Step S124. Then, when a setting file is found out in Step S125 (Yes), the program starting part 52 performs Step S126. Otherwise, when no setting file is found out (No in Step S125), the program starting part 52 performs Step S133. In Step S126, the program starting part 52 performs a predetermined authentication check on the thus-found setting file using a previously provided library for electronic authentication check.

Figure 22:
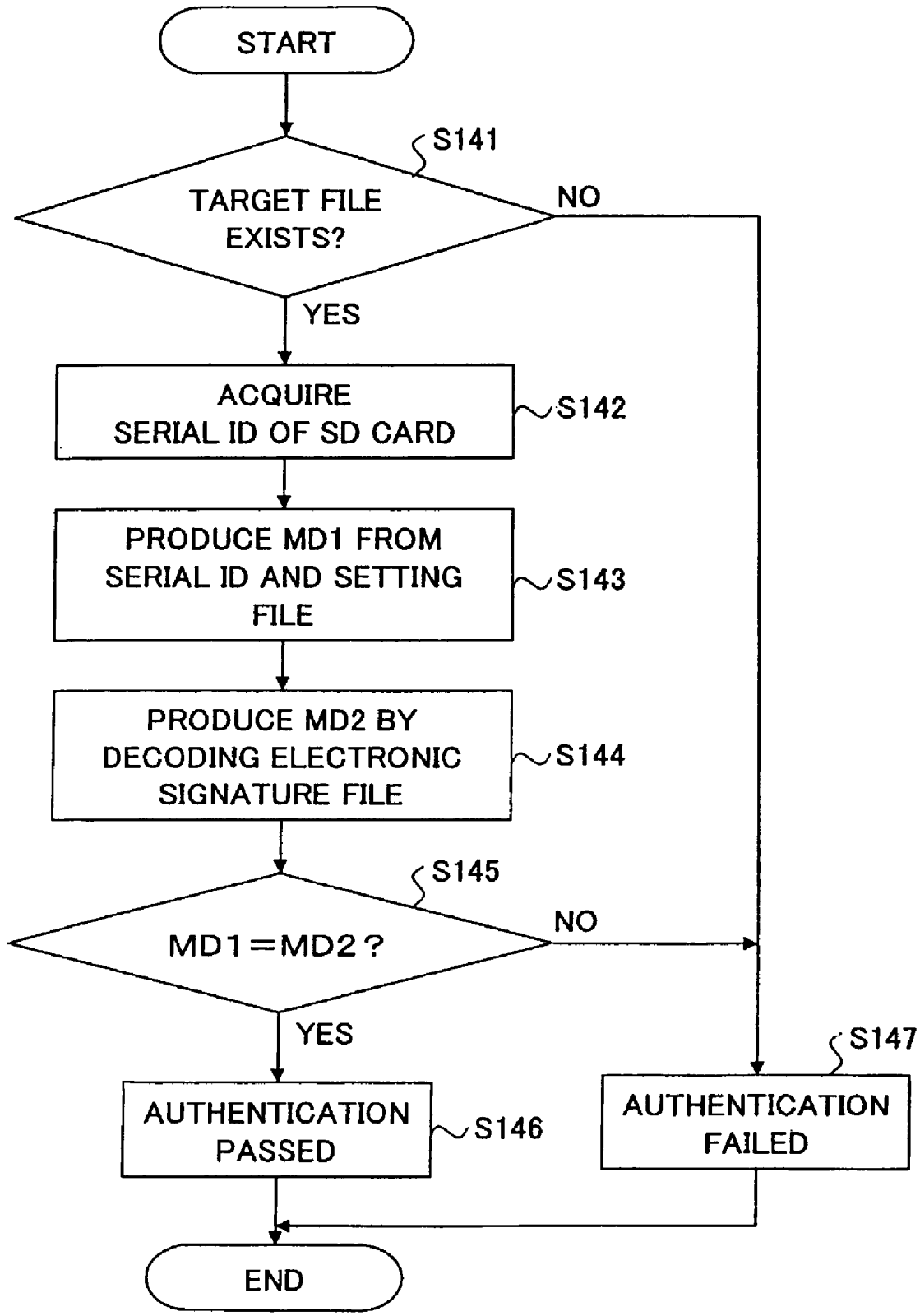
FIG. 22 shows an operation flow chart illustrating another electronic authentication operation performed in the image forming apparatus shown in FIG. 1.

For example, the authentication check on the setting file is performed as shown in a flow chart of FIG. 22. FIG. 22 shows an operation flow chart of an example of processing of the authentication check performed on a setting file written in an SD card.

In Step S141, the program starting part 52 determines whether or not a predetermined target file to be utilized for an authentication check on the setting file exists in the SD card 126. The predetermined target file utilized for an authentication check of the setting file includes an electronic signature file produced from the setting file and a message digest (simply referred to as an MD) of the seating file and a serial ID of the SD card itself.

Figure 23:
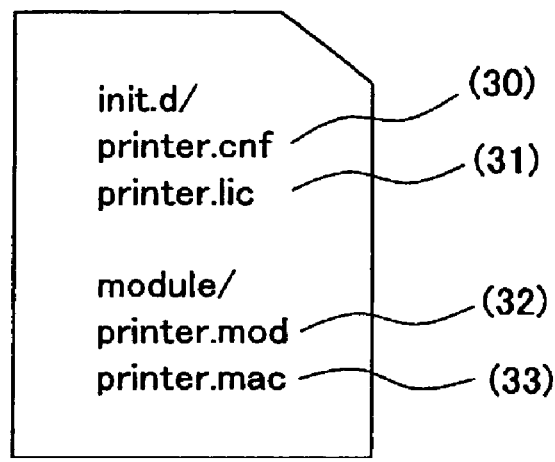
FIG. 23 illustrates another example of files to be mounted into the image forming apparatus shown in FIG. 1 from the SD card.

FIG. 23 shows an image diagram of an example of the above-mentioned predetermined target file recorded in the SD card. In FIG. 23, a description (30) "printer.cnf", indicates the setting file, a description (31) "printer.lic" indicates the above-mentioned electronic signature file used for the authentication check of the setting file, and a description (32) "printer.mod" indicates a mount target module file to be mounted, and a description (33) "printer.mac" indicates an electronic signature file used for the authentication check of the mount target module to be mounted.

When the program starting part 52 determines that the predetermined target file to be used for the authentication check of the setting file exists (Yes in Step S141), the electronic signature file used for the authentication check of the setting file and the setting file are acquired from this target file of the SD card 126, and the program starting part 52 performs Step S142.

In Step S142, the program starting part 52 acquires the serial ID of the SD card 126 from the SD card 126 itself. Then, in Step S143, the program starting part 52 produces an MD1 from the setting file acquired in Step S141 and the serial ID of the SD card 126 acquired in Step S142. Then, in Step S144 following Step S143, the program starting part 52 decodes the electronic signature file acquired in step S141 with a previously provided predetermined public key, and thus obtains an MD2.

Then, in Step S145, the program starting part 52 determines whether or not the MD1 produced in Step S143 and the MD2 obtained in Step S144 are equal to each other. When it is determined that the MD1 and MD2 are equal to each other (Yes in Step S145), the program starting part 52 performs Step S146, and makes a decision that the authentication check of the setting file is passed.

On the other hand, when it is determined that the MD1 and MD2 are not equal (No in Step S145), the program starting part 52 performs Step S147, and makes a decision that the authentication check of the setting file is failed. In case the MD1 and MD2 are not equal, it means there is a possibility that the file recorded in the SD card 126 has been recorded illegally as mentioned above.

When it is determined that no predetermined target file to be used for the authentication check of the setting file exists (No in Step S141), the program starting part 52 performs Step S147, and determines that the authentication check of the setting file is failed.

Figure 24:
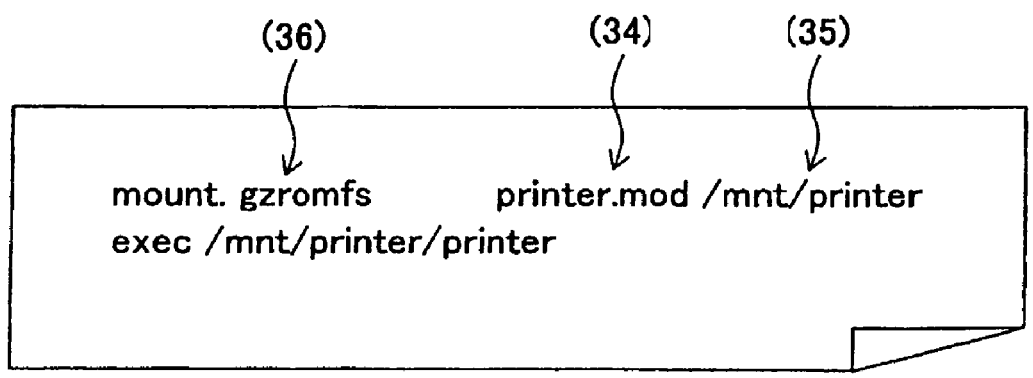
FIG. 24 illustrates another example of a setting file recorded in the SD card to be mounted into the image forming apparatus shown in FIG. 1.

Returning to FIG. 20, when the authentication check of the setting file is passed (Yes in Step S126), the program starting part 52 performs Step S127, and analyzes the setting file such as that as shown in FIG. 24. The program starting part 52 instead performs Step S128, when the authentication check of the setting file is failed (No in Step S126).

FIG. 24 shows an image diagram of an example of the setting file. This setting file includes an instruction for an operation of mounting a gzip-compressed file 'gzmromfs' (36) in a ROMFS form according to a relative path direction 'printer.mod' (34) onto a mount point "/mnt/printer" (35), and an operation of executing the thus-mounted mount target module file.

In Step S128 following Step S127, the program starting part 52 determines whether an EOF (End Of File) recorded in the setting file is found. When it is determined that an EOF has been found (Yes in Step S128), the program starting part 52 returns to Step S124. On the other hand, when it is determined that no EOF is found (No in Step S128), the program starting part 52 performs Step S129.

In Step S129, when there is an instruction for mounting in the setting file, an authentication check of a mount target module to be mounted according to this instruction is performed using a predetermined library used for an electronic authentication check, by the program starting part 52.

Figure 25:
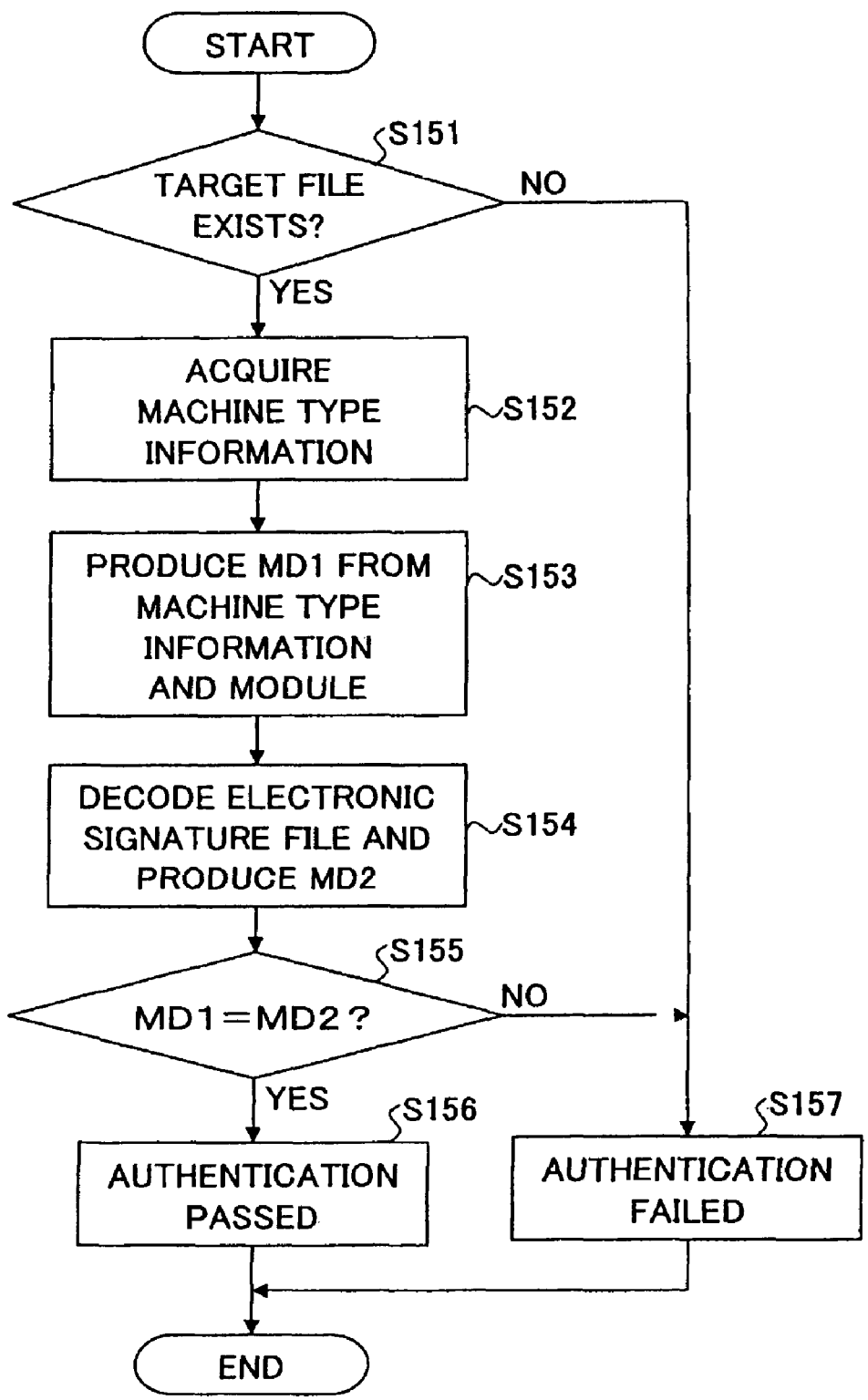
FIG. 25 shows an operation flow chart illustrating another electronic authentication operation performed in the image forming apparatus shown in FIG. 1.

For example, the authentication check of the module to be mounted is performed as shown in an operation flow chart shown in FIG. 25.

In a step S151, the program starting part 52 determines whether or not a predetermined target file to be used for the authentication check of the module to be mounted exists in the SD card 126. The predetermined target file to be used for the authentication check of the mount target module to be mounted includes an electronic signature file produced from a module file of the mount target module to be mounted and an MD of the mount target module file and machine type information of the composite machine.

When the program starting part 52 determines that the predetermined target file to be used for the authentication check of the target module exists (Yes in Step S151), the electronic signature file used for the authentication check of the module file of the mount target module and the module file of the mount target module itself are acquired from the SD card 126 by the program starting part 52, which then performs Step S152.

In Step S152, the program starting part 52 acquires the machine type information from the above-mentioned predetermined target file. Then, in Step S153, the program starting part 52 produces an MD1 from the mount target module file acquired in Step S151 and the machine type information of the composite machine acquired in Step S152. Then, in Step S154 following Step S153, the program starting part 52 decodes the electronic signature file acquired in step S151 with a previously provided predetermined public key, and thus obtains an MD2.

Then, in Step S155, the program starting part 52 determines whether or not the MD1 produced in Step S153 and the MD2 obtained in Step S154 are equal to each other. When it is determined that the MD1 and MD2 are equal to each other (Yes in Step S155), the program starting part 52 performs Step S156, and makes a decision that the authentication check of the mount target module file is passed.

On the other hand, when it is determined that the MD1 and MD2 are not equal (No in Step S155), the program starting part 52 performs Step S157, and makes a decision that the authentication check of the mount target module file is failed. In case the MD1 and MD2 are not equal, there is a possibility that the file recorded in the SD card 126 has undergone an illegal operation such as illegal copy, interpolation or so.

When it is determined that no predetermined target file to be used for the authentication check of the module file exists (No in Step S151), the program starting part 52 performs Step S157, and determines that the authentication check of the setting file is failed.

Returning to FIG. 21A, when the authentication check of the mount target module to be mounted has been passed (Yes in Step S129), the program starting part 52 performs Step S130, and determines whether or not the mount target module has a relative path direction previously set. When the mount target module has a relative path direction set (Yes in Step S130), the program starting part 52 performs Step S131.

In Step S131, the program starting part 52 appends the information of mount point held in Step S123 to the above-mentioned relative path direction of the mount target module, and, thus, acquires an absolute path direction therefrom. Then, Step S132 is performed. However, when the mount target module does not have a relative path direction set (No in Step 130), the program starting part 52 then performs Step S132.

In Step S132, the program starting part 52 mounts the relevant mount target module to be mounted according to instructions written in the setting file and the absolute path direction thus acquired, and returns to Step S127. However, if the authentication check on the mount target module is failed (No in Step 129), the program starting part 52 returns to Step S127. The program starting part 52 repeats the processing of Steps S124 through S132 until completing the authentication check of all the setting files and mount target modules written in the SD card 126.

After completing the authentication check of all the setting files and mount target modules written in the SD card 126, the program starting part 52 determines that any setting file which has not been processed does not exist in the mounted SD card 126 (No in Step S125), and performs Step S133. In Step S133, the program starting part 52 performs the mount target module which has been mounted in Step S132. Since any module whose authentication check has been failed is thus not mounted in Step S132, it is not executed in Step S133 accordingly.

A function of the program starting part 52 may be provided, also in the second embodiment, such that, when all the SD card insertion detection processing described above with reference FIG. 17 or FIGS. 20, 21A and 21B is completed, the program starting part 52 notifies a process of application 30 or the platform 40 of this matter. A file "/tmp/init.done" may be produced in the file tree shown in FIG. 4, which file indicates that all the SD card insertion detection processing has been completed, and, thereby, the program starting part 52 can notifies the process of the applications 30 or the platform 40 of the matter that all the SD card insertion detection processing has been completed.

As described above in the description of the first embodiment, this function of the program starting part 52 is useful, for example, for the printer application 31 which needs font data for performing its own process of printing a document or so with the font data. That is, in such a case that the printer application 31 should perform a document printing job, it waits for the font data originally written in the SD card 126 to be mounted so that the print can utilize the thus-mounted font data in the document printing job. In this case, after receiving the above-mentioned notification given by the program starting part 52 indicating that the SD card insertion detection processing has been completed, the printer application 31 starts its own document printing job with acquiring the thus-mounted font data.

Thus, according to the second embodiment, as described above, a relative path direction is previously set for a mount target module in a setting file recorded in the SD card 126. Accordingly, it is not necessary to previously determine an SD card slot 125 from among a plurality of ones in which the relevant SD card 126 is to be inserted in case the machine is provided with the plurality of SD card slots 125. This is because, the module written in the SD card 126 is then mounted to a same mount point regardless of which SD card slot 125 is utilized to be inserted with the SD card 126 according to the process of the second embodiment described above.

In the composite machine according to the second embodiment of the present invention, it is possible to start a process of an application written in an SD card 126 even when the SD card 126 is inserted into the composite machine in a state in which the composite machine is running. For example, in the composite machine 1 shown in FIG. 1, an application written in the SD card 126 is added as one of the applications 30 of the composite machine 1.

In case the SD card 126 is suddenly removed from the card slot, it is necessary to unmount the SD card 126. For this purpose, the program starting part 52 starts the SD card check program 121, which thus performs an unmounting processing on the SD card 126, as will now be described.

Figure 26:
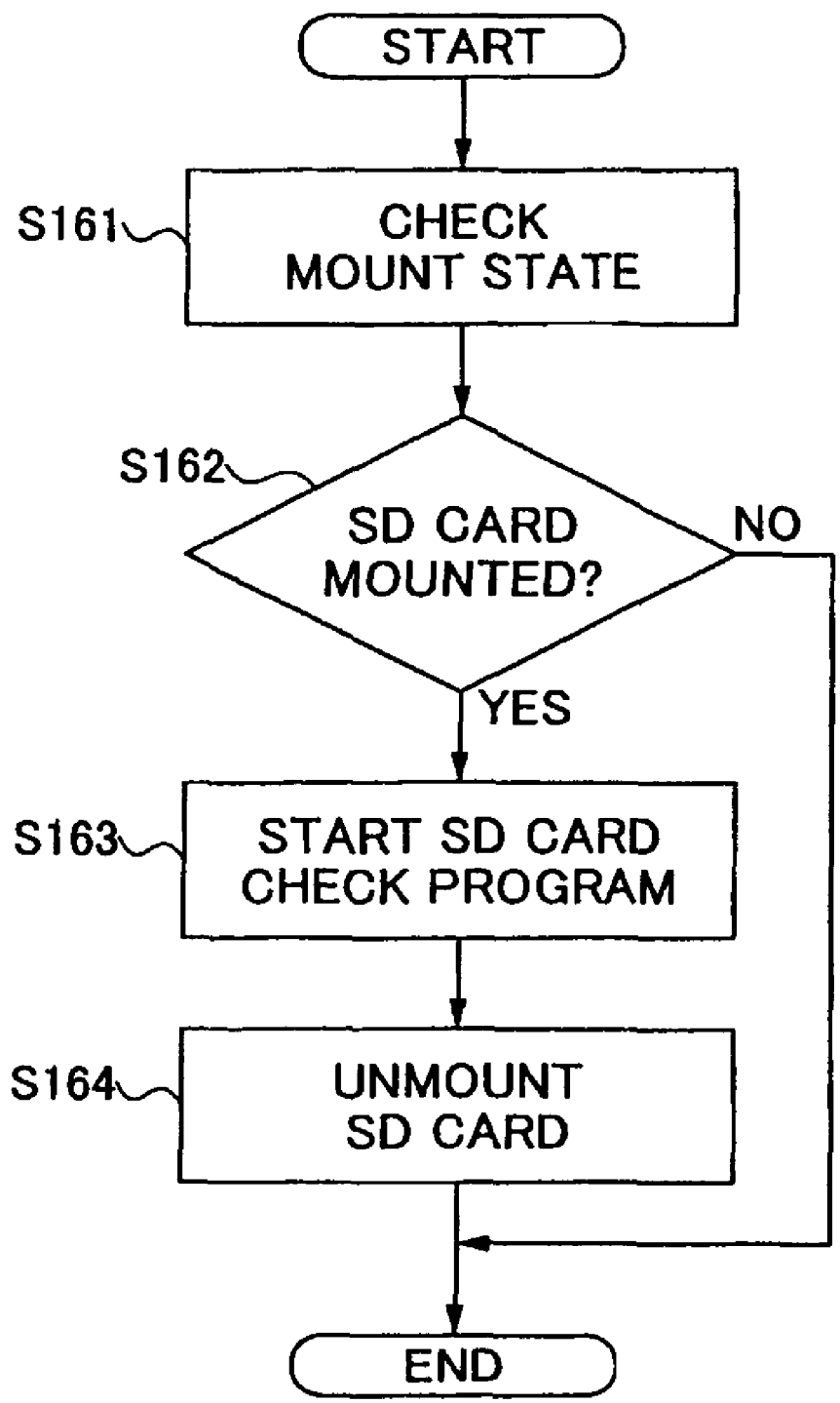
FIG. 26 shows an operation flow chart illustrating another example of SD card removal detecting operation performed in the image forming apparatus shown in FIG. 1.

FIG. 26 shows an operation flow chart of an example of an SD card removal detection processing. Before performing the SD card removal detection processing, the program starting part 52 may stop the programs which were started through Steps S118-S133 shown in FIGS. 17-21B. That is, by forcibly stopping the programs which were read out from the SD card 126 and then started, upon a detection of removal of the SD card 126, an unauthorized/illegal use of the applications can be avoided. That is, by this configuration, only a machine in which the SD card is inserted can perform the relevant new function from the SD card, while any other machine from which the SD card is already removed cannot perform the same since the function is forcibly stopped upon the removal of the SD card as mentioned above.

In Step S161 shown in FIG. 26, the program starting part 52 inquires the SD card status monitor driver 123 as to the status information on the SD card 126, and examines the state of mounting of the SD card 126.

In Step S162 following Step S161, the program starting part 52 determines from a result of examination on the mounting state performed in Step S161 whether or not the SD card 126 is mounted. When it is determined that the SD card 126 is mounted according to the examination result on the mount state (Yes in Step S162), the program starting part 52 performs Step S163, and starts the SD card check program 121. When it is determined that first of all the SD card 126 is not mounted according to the examination result on the mounting state (No in Step S162), the program starting part 52 terminates the current processing.

In Step S164 following Step S163, the SD card check program 121 performs unmounting of the SD card 126, notifies of the matter that it has unmounted the SD card 126 to the SD card status monitor driver 123, and terminates the current processing.

Thus, in the composite machine also according to the second embodiment, even when the SD card 126 is removed in a state in which the power supply is maintained, unmounting processing of the SD card 126 can be properly performed automatically, and, thus, the function started from the SD card is positively cancelled there.

Figure 27:
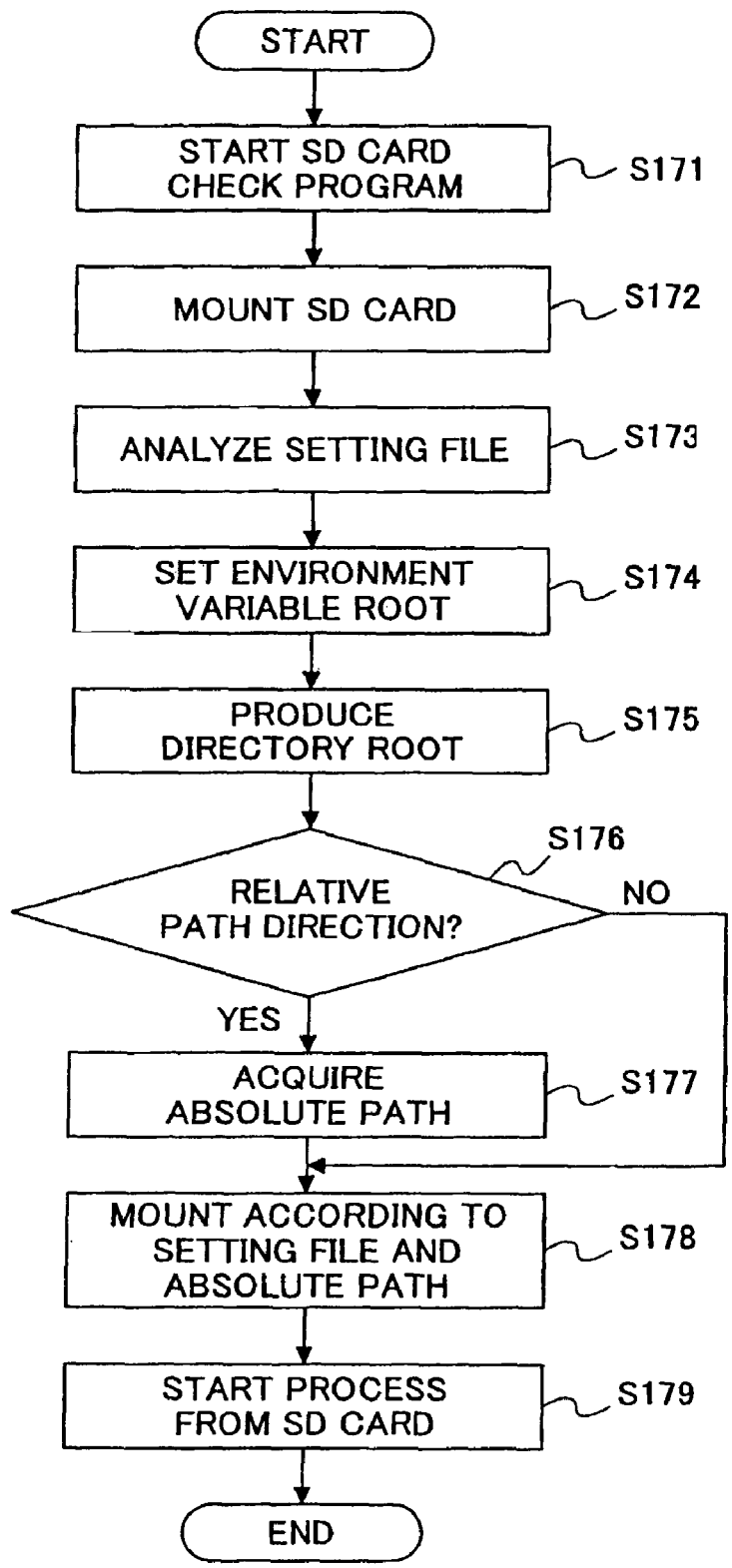
FIG. 27 shows an operation flow chart illustrating another SD card insertion detecting operation performed in the image forming apparatus shown in FIG. 1.

FIG. 27 shows an operation flow chart of another example of SD card insertion detection processing according to the second embodiment of the present invention. In Step S171, the program starting part 52 starts the SD card check program 121.

In Step S172 following Step S171, the SD card check program 121 performs mounting of the SD card 126 according to instructions written in the master setting file of the machine 1 itself, and notifies of the matter of having mounted the SD card 126 to the SD card status monitor driver 123. For example, in the case of the master setting file shown in FIG. 18, the SD card check program 121 mounts the mount target "/dev/sd1" onto the mount point "/mnt/sd1".

Figure 28:
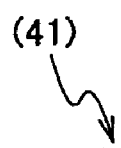
FIG. 28 illustrates a description in the above-mentioned setting file recorded in the SD card to be mounted in which a relative path is specified.

In Step S173 following Step S172, after the matter that the SD card 126 is mounted is notified of from the SD card status monitor driver 123 to the program starting part 52, the program stating part 52 reads out and analyzes the setting file from the mounted SD card 126. For example, the program starting part 52 reads the setting file such as that shown in FIG. 28 from the SD card. FIG. 28 shows contents of an example of the setting file recorded in the SD card in which a relative path direction for the mount point is written.

In Step S174 following Step S173, the program starting part 52 sets the mount point in a form of an environment variable ROOT according to instructions written in the setting file analyzed. For example, in the case of the setting file of FIG. 28, the program starting part 52 sets a directory "/printer" (42) specified by a 'setenv' command (41) onto the environment variable ROOT. In Step S175 following Step S174, the program starting part 52 creates newly a directory set onto the environment variable ROOT. For example, in the case of the setting file of FIG. 28, the program starting part 52 creates newly a directory "/printer" set onto the environment variable ROOT.

In Step S176 following Step S175, the program starting part 52 determines whether or not a relative path direction of the mount point is specified, based on the analysis result of the setting file performed in Step S173. When it is determined that a relative path direction for the mount point is specified (Yes in Step S176), the program starting part 52 performs Step S177. For example, in the case of the above-mentioned setting file of FIG. 28, the program starting part 52 determines that a relative path direction "font1" (44) is made as the path direction for the mount point of the mount target module "gzromfs".

On the other hand, when it is determined that no relative path direction for the mount point is specified (No in Step S176), the program starting part 52 performs Step S178. For example, the program starting part 52 determines that an absolute path direction is specified when the path direction for the mount point is described as "/printer/font1" instead.

In Step S177, the program starting part 52 acquires an absolute path direction for the mount point by adding the directory of the environment variable ROOT set in Step S174 to the relative path direction for the mount point in Step S177. For example, in the case of the setting file of FIG. 28, the program starting part 52 acquires an absolute path direction "/printer/font1", and performs Step S178.

In Step S178, the program starting part 52 performs mounting according to instructions of the setting file and the thus-acquired absolute path direction. For example, in the case of the setting file of FIG. 28, the program starting part 52 mounts the absolute path direction "/mnt/sd1/font1.gz" (45) for the mount target module "gzromfs" (43) onto the absolute path direction "/print/font1" for the mount point acquired. In Step S179 following Step S178, the program starting part 52 starts a process of a program recorded in the SD card 126 through the path thus established.

When the SD card 126 is removed suddenly, the program starting part 52 should unmount the SD card 126, and for this purpose, the program starting part 52 should start the SD card check program 121 so as to cause it to perform unmounting operation.

Also in the SD card insertion detection processing shown in FIG. 27, an electronic authentication check same as that performed in the above-described SD card insertion detection processing of FIGS. 20 through 21B may be performed. Since operation of the electronic authentication check is the same as that described above with reference to FIGS. 22 and 25, duplicated description will be omitted.

Thus, according to the second embodiment of the present invention described above, a relative path direction can be specified in a setting file as a path specification in the SD card for a mounting destination at which a mount target module is mounted, and, thus, it is not necessary to fix a mount point previously. Further, as a necessary directory is produced according to instructions written in the setting file in the SD card, a path direction for a mount point can be arbitrary specified regardless of the original directory structure of the composite machine.

Thus, according to the second embodiment of the present invention, it is not necessary to previously determine one of a plurality of recording medium slots to be applied, not necessary to previously fix a mount point applied, and not necessary that a mount point depends from an original directory of an image formation apparatus.

Thus, upon insertion of an SD card, an example of a recording medium to a machine such as an image forming apparatus, an application/service stating program such as the program starting part 52 described above mounts a file system of the SD card according to a setting file also written in the SD card. Then, after that, it starts a process of an application from the SD card according to the setting file. Further, as mentioned above, an application can be started from a recording medium which can be inserted/removed from a machine in a hot plugging manner. Thus, addition of a new application, upgrade of applications existing in a machine, or function expansion in the machine can be easily achieved.

However, in such a situation, a problem may occur in which a recording medium such as an SD card which can be inserted/removed into/from a machine in a hot plugging manner may be used for many different machines and, thus, a copy right of an application program or so may be infringed through illegal copy operation or so. A third embodiment of the present invention which will now be described is configured so as to solve this problem. Thus, according to the third embodiment of the present invention, a use of a single recording medium which can be inserted/removed into/from a machine on many different machines can be easily and positively avoided, and, thus, a copy right of an application software provided to a user in a state of being recorded in such a recording medium can be positively protected.

A composite machine according to this third embodiment of the present invention will now be described. This composite machine in the third embodiment has a configuration generally same as that of the composite machine in the first embodiment described above, and, thus, duplicated description will be omitted. The configuration of the above-described composite machine 1 according to the first embodiment described above with reference to FIGS. 1-7 is applied also to this third embodiment as it is.

Figure 29:
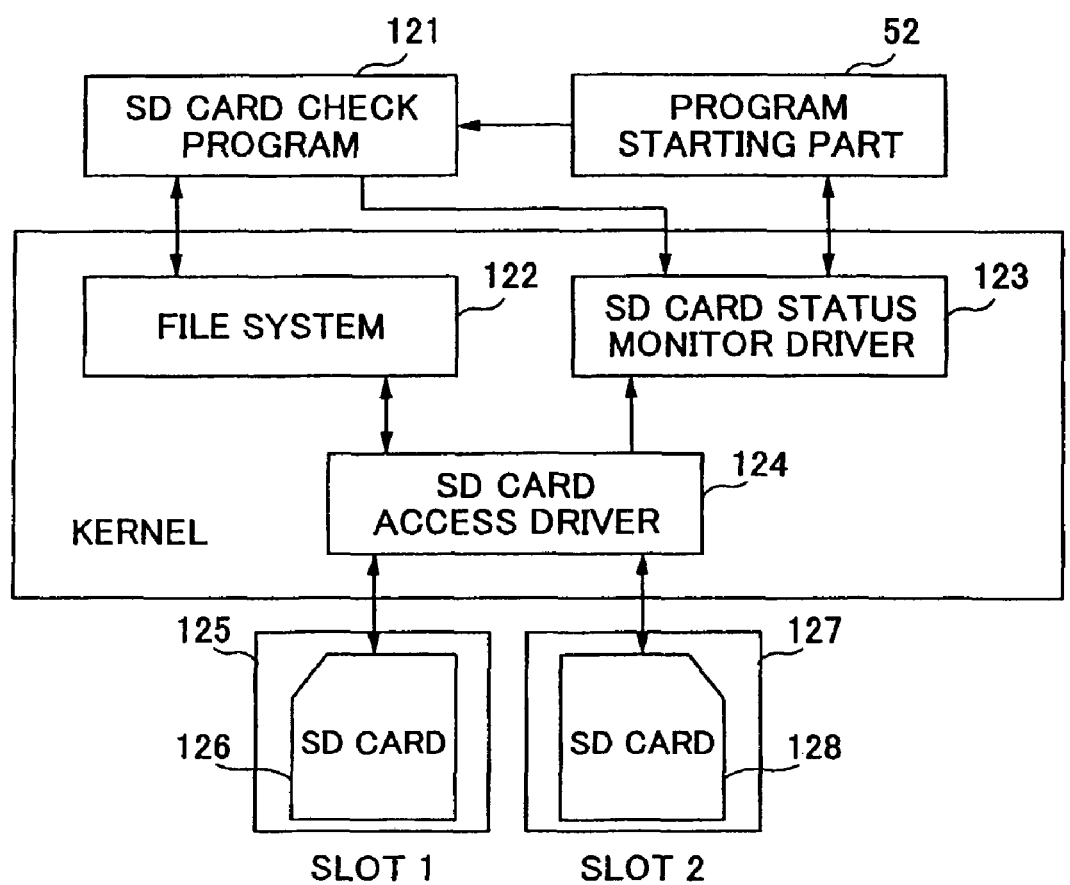
FIG. 29 illustrates another information processing system also to operate in the image forming apparatus shown in FIG. 1.

FIG. 29 shows a diagram of a configuration of the composite machine according to the third embodiment of the present invention particularly concerning an SD card drive function. Although the diagram shown in FIG. 29 includes two SD card slots 125 and 127, three or more SD card slots may be provided in the same machine.

Each of SD cards 126 and 128 shown is same as the above-mentioned SD card described above with reference to FIG. 8 concerning the first embodiment. The composite machine 1 according to the third embodiment is configured so that the SD cards 126 and 128 may be inserted thereinto or removed therefrom in a state in which the power supply to the composite machine is maintained, in other words, insertion or removal of the SD cards can be performed in a hot plugging manner. The SD card slots 125 and 127 can have the SD cards 126 and 128 inserted thereinto or removed therefrom, and, provide interrupts to an SD card access driver 124 in response to the insertion/removal of the SD cards 126/128.

An SD card access driver 124 performs an access control to the SD card 126/128, and notifies an SD card status monitor driver 123 of insertion/removal of the SD card 126/128 according to the interrupt provided by the SD card slot 125.

The SD card status monitor driver 123 manages status information concerning the SD card 126/128 such as that of insertion, removal, mounting, unmounting and so forth of the SD card 126/128, and the SD card status monitor driver 123 notifies the program starting part 52 of the status information of the SD card 126/128.

The program starting part 52 starts the SD card check program 121 in response to insertion/removal of the SD card 126/128. Further, the program starting part 52 starts a program written in the SD card 126/128 according to the status information of the SD card 126/128 provided from the SD card status monitor driver 123.

The SD card check program 121 determines as to the SD card 126/128 whether or not a partition is properly set therein, whether or not a status in the file system has any problem therein, and so forth, for the purpose of causing the file system 121 originally written in the SD card 126/128 to enter a state in which the file system can be properly utilized. The SD card check program 121 has, for example, a function of verifying the SD card 126/128, a function of mounting the file system of the SD card, a function of unmounting the same, a function of notifying of a state, etc.

Figure 30:
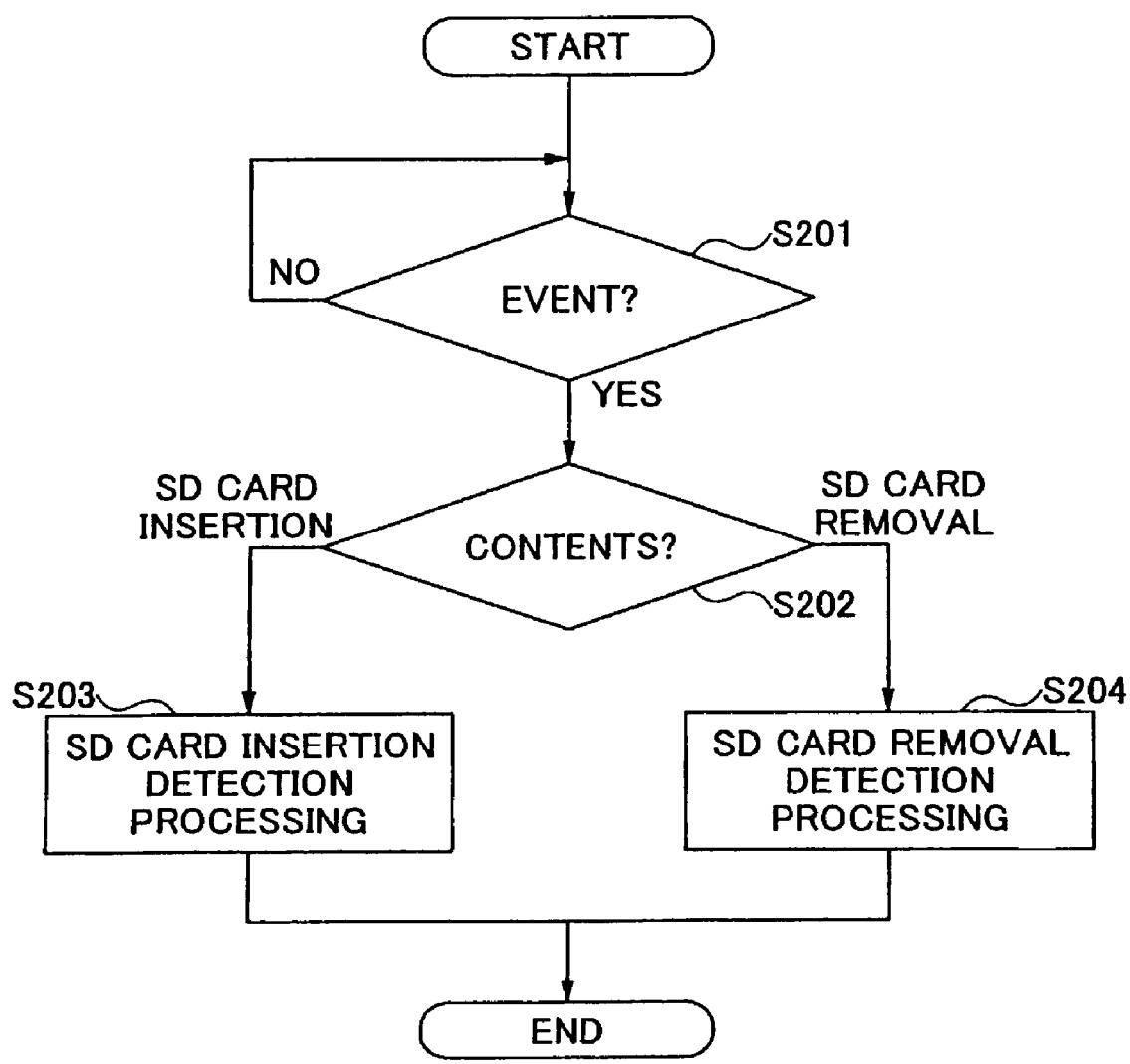
FIG. 30 shows an operation flow chart illustrating another example of event waiting operation performed in the image forming apparatus shown in FIG. 1.

With reference to figures, an operation procedure of the method of stopping a program in the third embodiment according to the present invention will now be described. The program starting part 52 enters a state of waiting for an event, after starting the application 30 of the composite machine 1, and the process of the platform 40 upon a power supply start in the composite machine 1. FIG. 30 shows a flow chart of an example of a waiting processing for an event according to the third embodiment of the present invention.

In Step S201 of FIG. 30, the program starting part 52 determines whether or not any event has occurred. When it determines that no event has occurred (NO in Step S201), the program starting part 52 repeats the processing of Step S201. When it determines that an event has occurred (Yes in the step S201), the program starting part 52 performs Step S202.

For example, when the SD card 126 or 128 is inserted in the SD card slot 125 or 127, the SD card access driver 124 notifies of the insertion of the SD card 126 or 128 to the SD card status monitor driver 123 according to an interrupt provided by the SD card slot 125 or 127 accordingly. Then, the SD card status monitor driver 123 notifies of the insertion of the SD card 126 to the program starting part 52. The program starting part 52 determines that an event has occurred when the insertion of the SD card 126 or 128 is thus notified of by the SD card status monitor driver 123.

Moreover, when the SD card 126 or 128 is removed from the SD card slot 125 or 127, in response to an interrupt made by the slot 125 or 127 accordingly, the SD card access driver 124 notifies of the removal of the SD cart to the SD card status monitor driver 123. Then, the SD card status monitor driver 123 notifies of the removal of the SD card 126 or 128 to the program starting part 52. The program starting part 52 determines that an event occurs, when the SD card status monitor driver 123 thus notifies of the removal of the SD card 126 or 128 to the program starting part 52.

In Step S202, the program starting part 52 determines the contents of the event which has thus occurred. When the contents of the event correspond to an insertion detection of the SD card 126 or 128, the program starting part 52 performs Step S203. In Step S203, an SD card insertion detection processing which will be described later is performed. On the other hand, when the contents of the event correspond to a removal detection of the SD card 126 or 128, the program starting part 52 performs Step S204. In Step S204, an SD card removal detection processing described later is performed.

Figure 31:
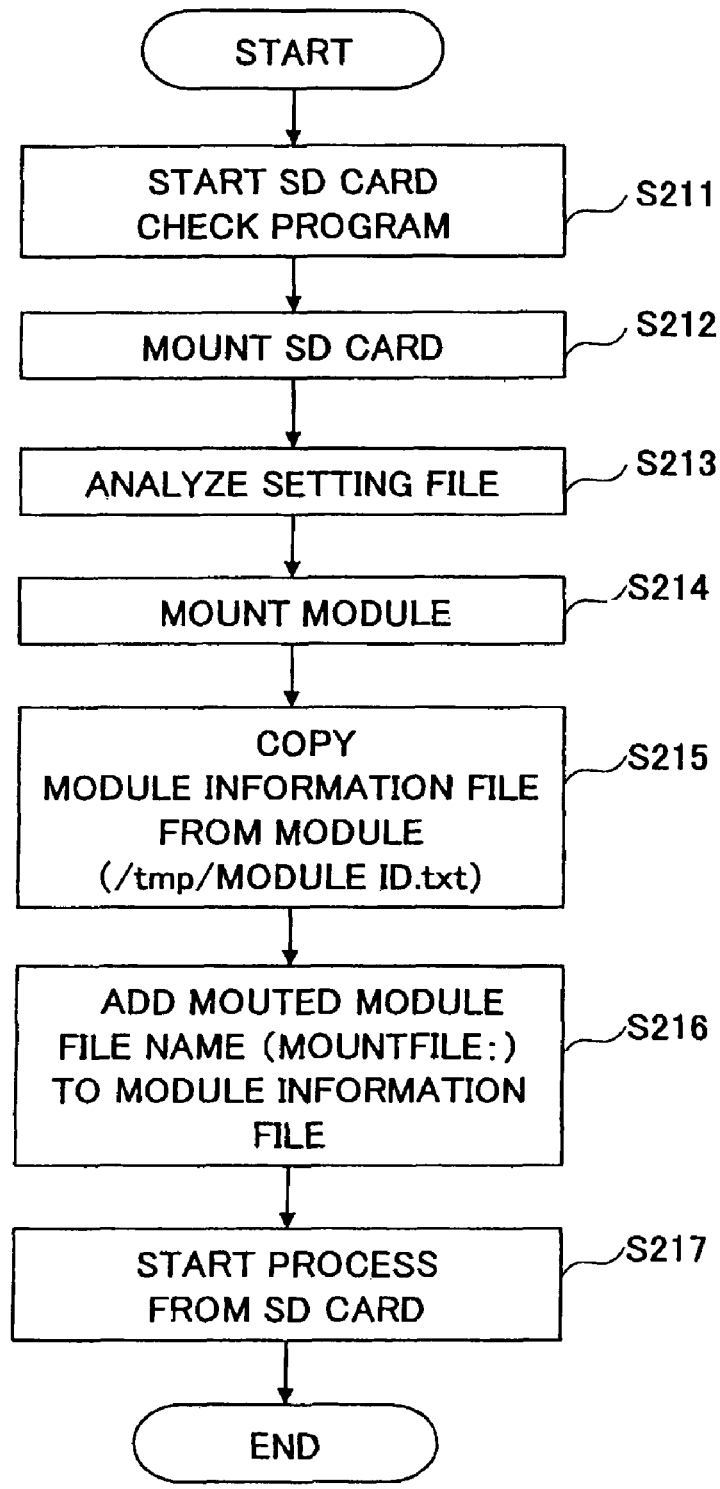
FIG. 31 shows an operation flow chart illustrating another example of SD card insertion detecting operation performed in the image forming apparatus shown in FIG. 1.

FIG. 31 shows an operation flow chart of an example of the above-mentioned SD card insertion detection processing according to the third embodiment of the present invention. Upon detection of insertion of the SD card 126 or 128 according to the process described above with reference to FIG. 30, the program starting part 52 starts SD card check program 121 in Step S211. In Step S212 following Step S211, the SD card check program 121 mounts the SD card 126 or 128, notifies of this matter to the SD card status monitor driver 123, and suspends the current processing.

In Step S213 following Step S212, after the matter that the SD cards 126 and 128 have been mounted is notified of by the SD card status monitor driver 123 to the program starting part 52, the program starting part 52 reads out and analyze a setting file from the thus-mounted SD card 126 or 128, such as that including contents shown in FIG. 32 or 33.

FIG. 32 shows an example of the setting file which may be recorded in the SD card 126/128 for the purpose of starting an application software, while FIG. 33 shows another example of the setting file which may be recorded in the SD card 126/128 for the purpose of process inspection in the factory.

The setting file shown in FIG. 32 indicates a process of mounting a mount target module "printer.mod" in an ROMFS form gzip-compressed onto a mount point "/arch/printer", and executing the mount target module "printer.mod", and the processing which performs the mount target module "scanner.mod" thus mounted; and a process of mounting a mount target module in an ROMFS form gzip-compressed "scanner.mod" onto a mount point "/arch/scanner", and executing the thus-mounted module "scanner.mod"

The setting file of FIG. 33 indicates a process of mounting a mount target module in an ROMFS form gzip-compressed "factory.mod" onto a mount point "/arch/factory", and executing the thus-mounted mount-target module "factory.mod."

An application starting SD card such as that described above with reference to FIG. 32 is one to be used for adding a new application to the composite machine 1, and, for example, the SD card 126 shown in FIG. 29 corresponds to this application starting SD card. A process inspection SD card such as that described above with reference to FIG. 33 is one to be used for performing a process inspection on the composite machine 1 at a factory, etc., and the SD card 128 shown in FIG. 29 corresponds to this process inspection SD card.

In Step S214 following Step S213 in FIG. 31, the program starting part 52 performs a mounting operation according to a description for mounting which exists in the setting file such as that shown in FIG. 32 or 33. In Step S215, the program starting part 52 reads a module information file (for example, one entitled 'version.txt') as shown in FIGS. 34 through 36 from the mount target module thus mounted in Step S214, and copies the thus-read module information file into a file "/tmp/ module ID.txt.".

Figure 34:
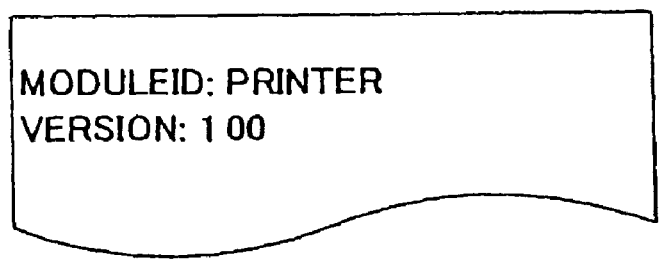
FIG. 34 illustrates one example of a module information file read out from a printer module to be mounted.

FIG. 34 shows contents of an example of the above-mentioned module information file read from a module for a printer function, which is an example of the above-mentioned mount target module. FIG. 35 shows contents of an example of the above-mentioned module information file read from a module for a scanner function, which is another example of the above-mentioned mount target module. FIG. 36 shows contents of an example of the above-mentioned module information file read from a module for a process inspection function, which is another example of the above-mentioned mount target module.

Figure 35:
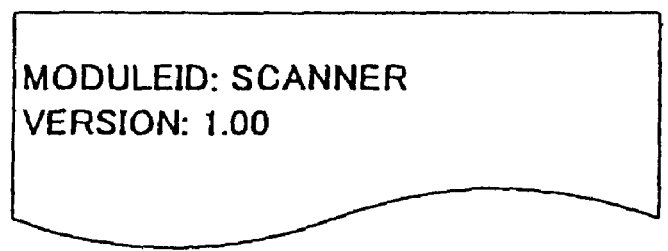
FIG. 35 illustrates one example of a module information file read out from a scanner module to be mounted.

The module information files shown in FIG. 34 and FIG. 35 are configured to include a module ID and version information. The module information file of FIG. 36 is configured to include a module ID, version information, and license information.

Figure 36:
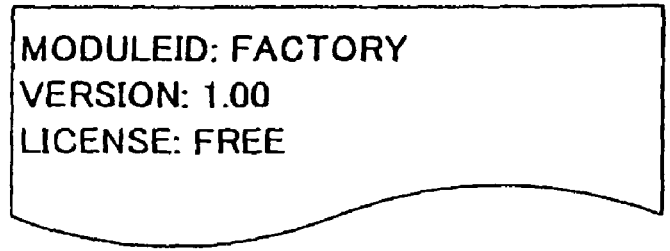
FIG. 36 illustrates one example of a module information file read out from a process inspection module to be mounted.
Figure 37:
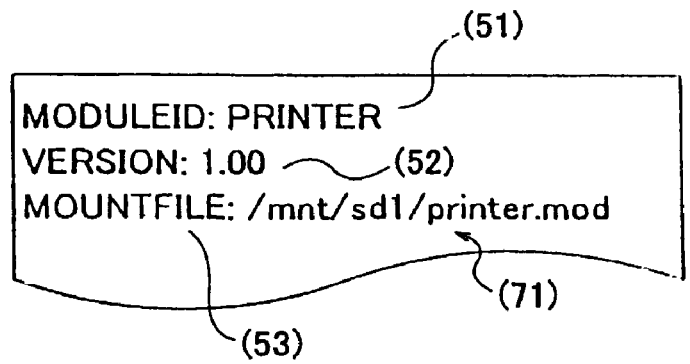
FIG. 37 illustrates the printer-application module information file having a file name of a mount target module.
Figure 38:
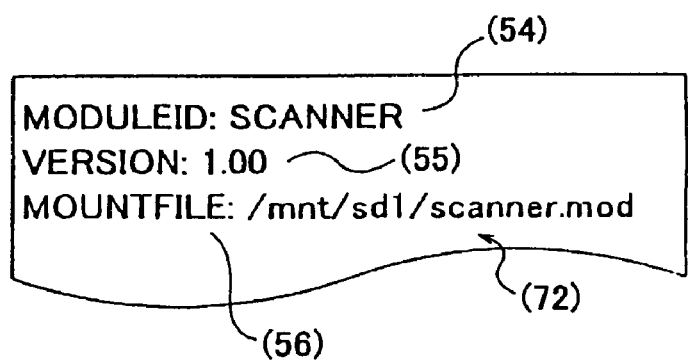
FIG. 38 illustrates the scanner-application module information file having a file name of a mount target module.
Figure 39:
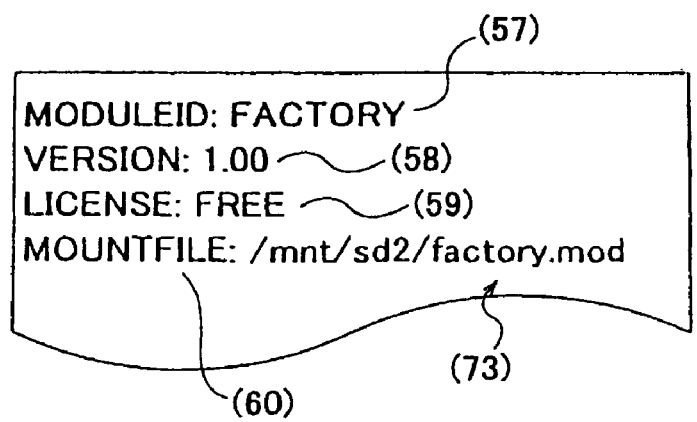
FIG. 39 illustrates the process-inspection-application module information file having a file name of a mount target module.

In Step S216, the program starting part 52 adds a file name 'printer.mod' (71), 'scanner.mod' (72) or 'factory.mod' (73) of the mount target module mounted in Step S214 with an entry "MOUNTFILE" in the module information file as shown in FIGS. 37 through 39 corresponding to the same shown in FIGS. 34 through 36 mentioned above, respectively.

FIG. 37 thus shows contents of the module information file for a printer application in which the file name of the mount target module is thus added. FIG. 38 also shows contents of the module information file for a scanner application in which the file name of the mount target module is thus added. FIG. 39 thus shows contents of the module information file for a process inspection application in which the file name of the mount target module is thus added.

The module information files of FIG. 37 and FIG. 38 are configured to include the module IDs (51), (54), version information (52), (55), and the mounted file names (53), (56) of the mount target modules. The module information file of FIG. 39 is configured to include the module ID (57), version information (58), license information (59), and the mounted file name (60) of the mount target module.

In Step S217 following Step S216 in FIG. 31, the program starting part 52 starts a process of the program recorded in the SD card 126 or 128 by executing the thus-mounted application module.

Accordingly, in the composite machine 1, the process of the application recorded in the SD card 126 or 128 can be made to start automatically even when the SD card 126 or 128 is inserted into the machine in a hot plugging manner. For example, in the composite machine 1 of FIG. 1, an applications written in the SD card 126 or 128 is added as one of the applications 30.

In the SD card insertion detection processing described above with reference to FIG. 31, all the setting files as shown in the FIG. 11 recorded in the mounted SD card 126 or those as shown in FIG. 12 recorded in the mounted SD card 128 are read out therefrom, and are mounted as described above. However, for the purpose of improving security function of avoiding illegal copy of such an SD card, an electronic authentication check such as that described above in the description of the first and second embodiments may be applied before the application mounting operation.

Figure 40:
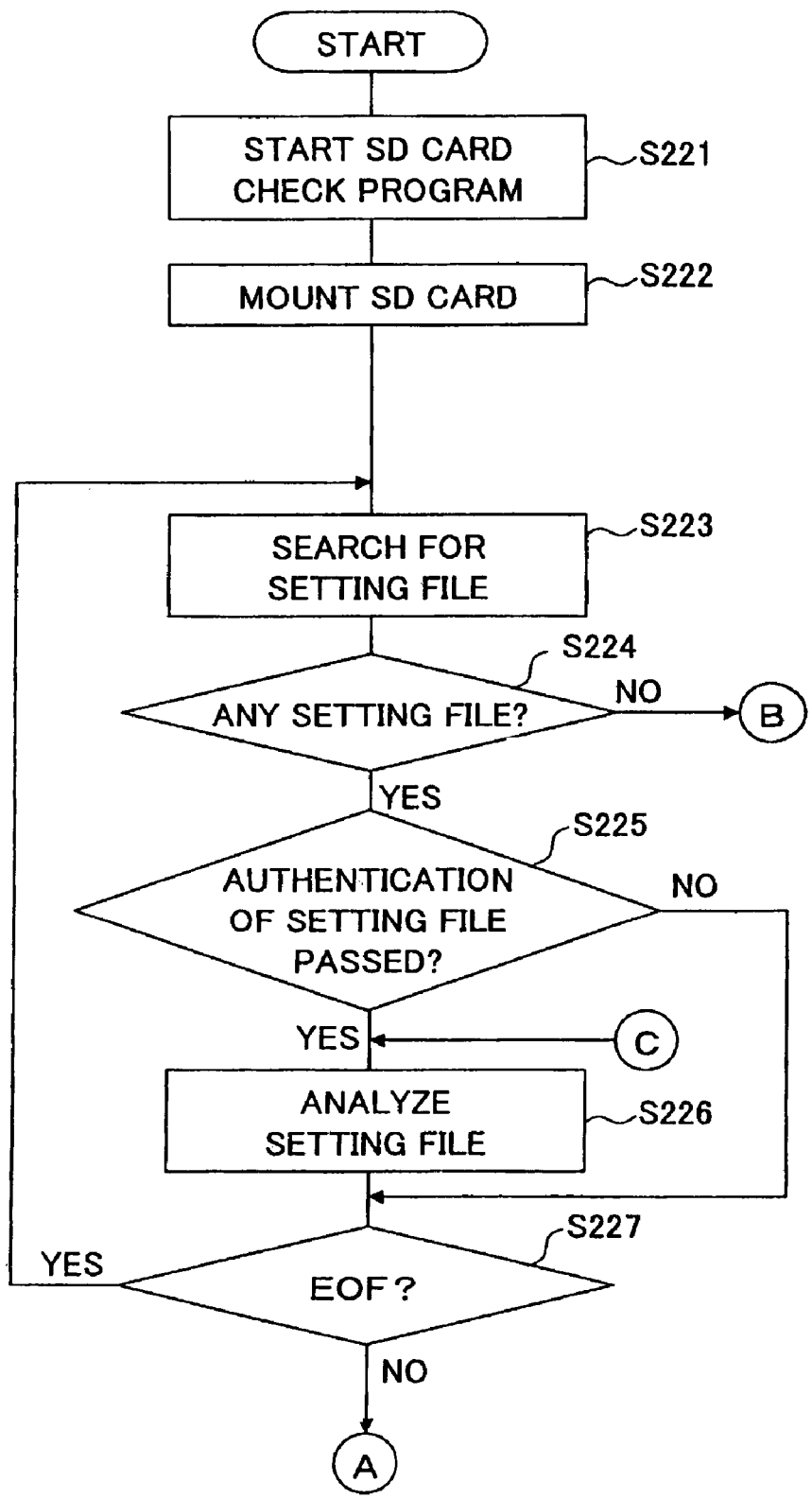
FIGS. 40, 41A and 41B show an operation flow chart illustrating another SD card insertion detecting operation performed in the image forming apparatus shown in FIG. 1.
Figure 41A:
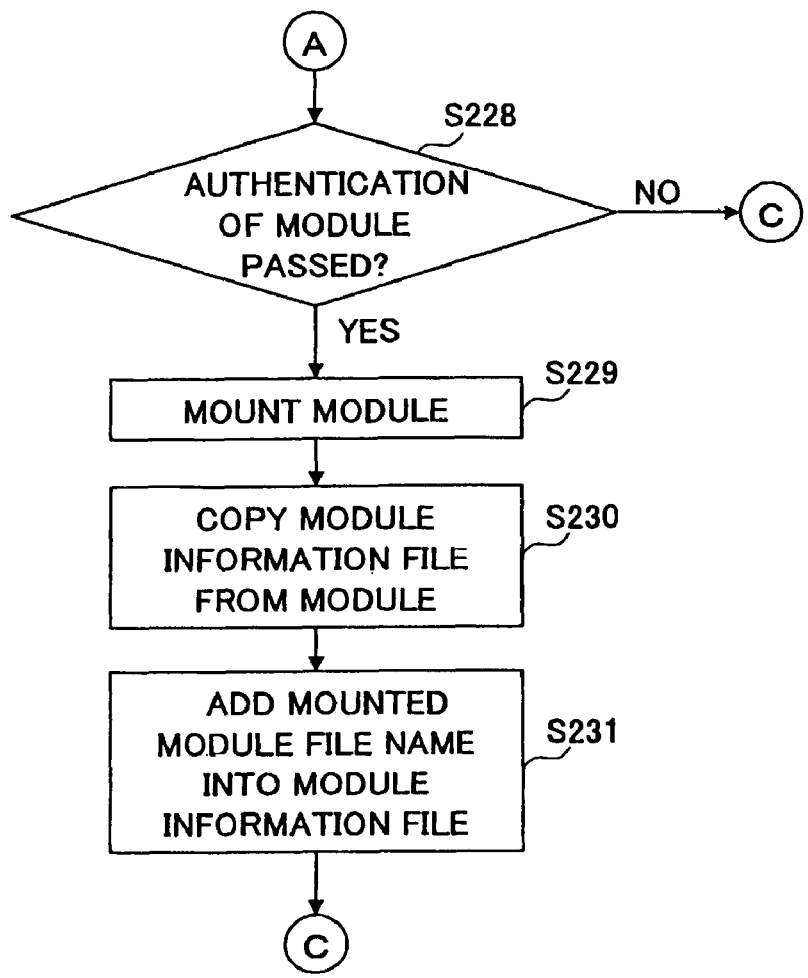
Figure 41B:
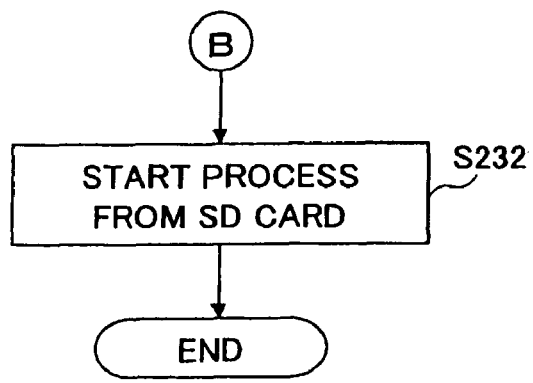

FIGS. 40, 41A and 41B show an operation flow chart of an example of an SD card insertion detection processing according to an variant of the third embodiment of the present invention. This processing is different from the same process described above with reference to FIG. 31, in that an electronic authentication check function is performed additionally.

Steps S221 and S222 are the same as Steps S211 and S211 in the flow chart of FIG. 31, and the description thereof is omitted. When the matter that the SD cards 126 and 128 are mounted is notified of by the SD card status monitor driver 123, the program starting part 52 performs Step S223. In Step S223, the program starting part 52 searches for a setting file in the thus-mounted SD card 126 or 128 in Step S222.

Then, when a setting file is found out (Yes in Step S224), the program starting part 52 performs Step S225. Otherwise, when no setting file is found out (No in Step S224), the program starting part 52 performs Step S232. In Step S225, the program starting part 52 performs a predetermined authentication check on the thus-found setting file using a previously provided library for electronic authentication check.

Figure 42:
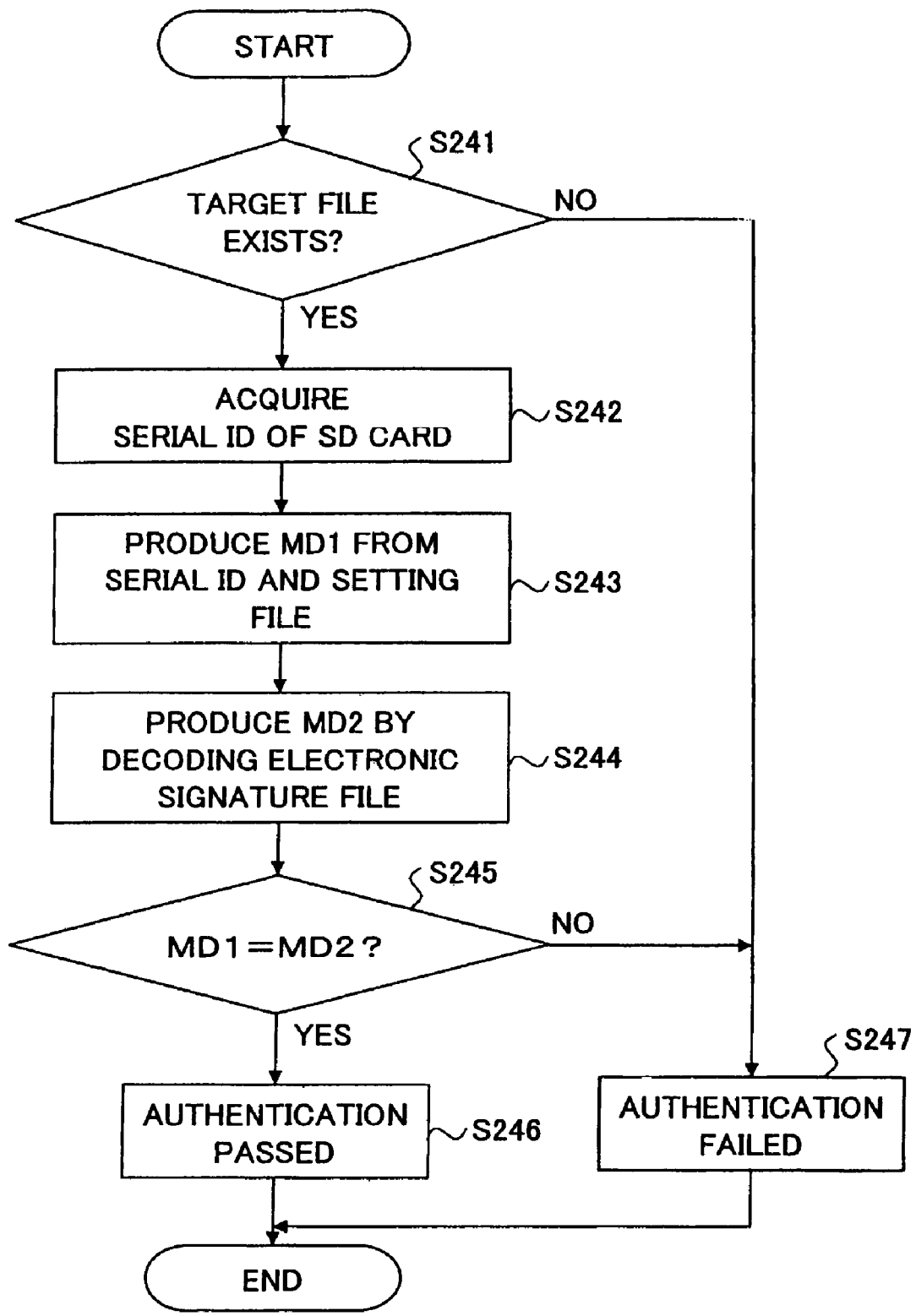
FIG. 42 shows an operation flow chart illustrating another electronic authentication operation performed in the image forming apparatus shown in FIG. 1.

For example, the authentication check on the setting file is performed as shown in a flow chart of FIG. 42. FIG. 42 shows an operation flow chart of an example of processing of the authentication check performed on the setting file.

In Step S241, the program starting part 52 determines whether or not a predetermined target file to be utilized for an authentication check on the setting file exists in the SD card 126. The predetermined target file utilized for an authentication check of the setting file includes an electronic signature file produced from the setting file and a message digest (simply referred to as an MD) of the setting file and a serial ID of the SD card.

FIG. 43 shows an image diagram of an example of the above-mentioned predetermined target file recorded in the SD card. In FIG. 43, a description "printer.cnf" indicates the setting file, a description "printer.lic" indicates the above-mentioned electronic signature file used for the authentication check of the setting file, and a description "printer.mod" indicates a mount target module file to be mounted, and a description "printer.mac" indicates an electronic signature file used for the authentication check of the mount target module to be mounted.

When the program starting part 52 determines that the predetermined target file to be used for the authentication check of the setting file exists (Yes in Step S241), the electronic signature file used for the authentication check of the setting file and the setting file are acquired therefrom in the SD card 126 or 128, and the program starting part 52 performs Step S242.

In Step S242, the program starting part 52 acquires the serial ID from the SD card 126 or 128. Then, in Step S243, the program starting part 52 produces an MD1 from the setting file acquired in Step S241 and the serial ID of the SD card 126 or 128 acquired in Step S242. Then, in Step S244 following Step S243, the program starting part 52 decodes the electronic signature file acquired in step S241 with a previously provided predetermined public key, and thus obtains an MD2.

Then, in Step S145, the program starting part 52 determines whether or not the MD1 produced in Step S243 and the MD2 obtained in Step S244 are equal to each other. When it is determined that the MD1 and MD2 are equal to each other (Yes in Step S245), the program starting part 52 performs Step S246, and makes a decision that the authentication check of the setting file is passed.

On the other hand, when it is determined that the MD1 and MD2 are not equal (No in Step S245), the program starting part 52 performs Step S247, and makes a decision that the authentication check of the setting file is failed. In case the MD1 and MD2 are not equal, there is a possibility that the file recorded in the SD card 126 or 128 has been recorded illegally as mentioned above.

When it is determined that no predetermined target file to be used for the authentication check of the setting file exists (No in Step S241), the program starting part 52 performs Step S247, and determines that the authentication check of the setting file is failed.

Returning to FIG. 40, when the authentication check of the setting file is passed (Yes in Step S225), the program starting part 52 performs Step S226, and analyzes the setting file such as that as shown in FIG. 32 or 33. The program starting part 52 performs Step S227, when the authentication check of the setting file is failed (No in Step S225).

In Step S227 following Step S226, the program starting part 52 determines whether an EOF (End Of File) recorded in the setting file is found. When it is determined that an EOF has been found (Yes in Step S227), the program starting part 52 returns to Step S223. On the other hand, when it is determined that no EOF is found (No in Step S227), the program starting part 52 performs Step S228.

In Step S228, when there is an instruction for mounting a mount target module in the setting file, an authentication check of the mount target module to be mounted according to this instruction is performed using a predetermined library used for an electronic authentication check, by the program starting part 52.

Figure 44:
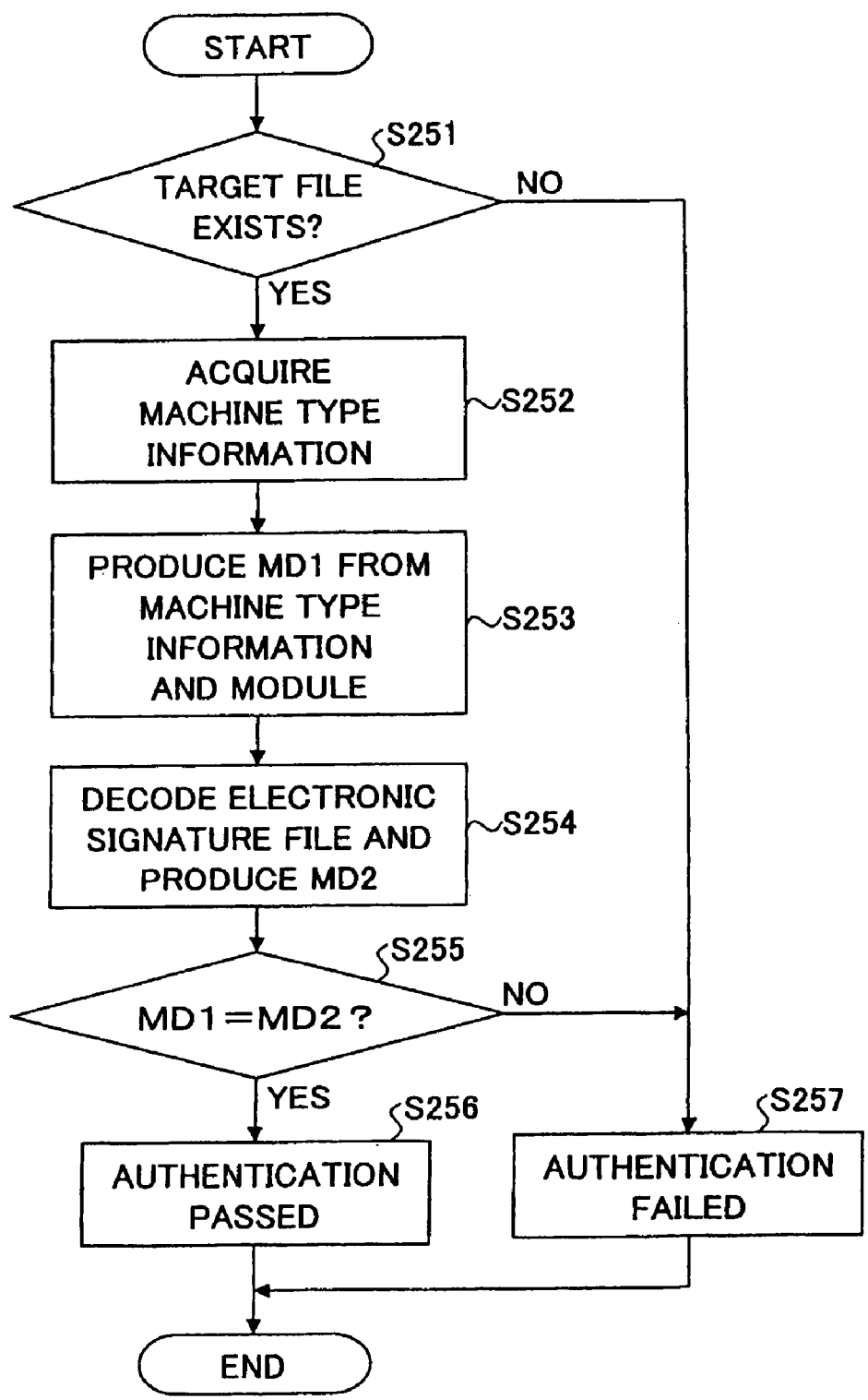
FIG. 44 shows an operation flow chart illustrating another electronic authentication operation performed in the image forming apparatus shown in FIG. 1.

For example, the authentication check of the mount target module to be mounted is performed as shown in an operation flow chart shown in FIG. 44.

In a step S251, the program starting part 52 determines whether or not a predetermined target file to be used for the authentication check or the mount target module to be mounted exists in the SD card 126 or 128. The predetermined target file to be used for the authentication check of the mount target module to be mounted includes an electronic signature file produced from a module file of the mount target module to be mounted and an MD of the mount target module file and machine type information of the composite machine.

When the program starting part 52 determines that the predetermined target file to be used for the authentication check of the mount target module exists (Yes in Step S251), the electronic signature file used for the authentication check of the mount target module file of the mount target module and the mount target module file of the mount target module itself are acquired from in the SD card 126 or 128 by the program starting part 52, which then performs Step S252.

In Step S252, the program starting part 52 acquires the machine type information from the predetermined target file. Then, in Step S253, the program starting part 52 produces an MD1 from the module file acquired in Step S251 and the machine type information of the composite machine acquired in Step S252. Then, in Step S254 following Step S253, the program starting part 52 decodes the electronic signature file acquired in step S251 with a previously provided predetermined public key, and thus obtains an MD2.

Then, in Step S255, the program starting part 52 determines whether or not the MD1 produced in Step S253 and the MD2 obtained in Step S254 are equal to each other. When it is determined that the MD1 and MD2 are equal to each other (Yes in Step S255), the program starting part 52 performs Step S256, and makes a decision that the authentication check of the mount target module is passed properly.

On the other hand, when it is determined that the MD1 and MD2 are not equal (No in Step S255), the program starting part 52 performs Step S257, and makes a decision that the authentication check of the mount target module is failed. In case the MD1 and MD2 are not equal, there is a possibility that the file recorded in the SD card 126 or 128 has undergone an illegal operation such as illegal copy, interpolation or so.

When it is determined that no predetermined target file to be used for the authentication check of the module file exists (No in Step S251), the program starting part 52 performs Step S257, and determines that the authentication check of the mount target module is failed.

Returning to FIG. 41A, when the authentication check of the mount target module to be mounted has been passed (Yes in Step S228), the program starting part 52 performs Step S229, and mounts the relevant mount target module to be mounted according to instructions written in the setting file such as that shown in FIG. 32 or 33.

Then, in Step S230 following Step 229, the program starting part 52 reads out module information files such as those shown in FIGS. 34 through 36 (for example, ones entitled 'version.txt') from the thus-mounted target modules, and, copies these module information files into a file '/tmp/module ID.txt'.

In next Step S231, after adding file names of the mount-target modules thus mounted in Step S229 to the above-mentioned module information files with an entry 'MOUNT-FILE' as shown in FIGS. 37 through 39, the current processing is returned to Step s226. Then, the program starting part 52 repeats the processing of Steps S223 through S231 until completing the authentication check of all the setting files and mount target modules written in the SD card 126 or 128.

After completing the authentication check of all the setting files and mount target modules written in the SD card 126 or 128, the program starting part 52 determines that any setting file which has not been processed does not exist in the mounted SD card 126 or 128 (No in Step S224), and performs Step S232. In Step S232, the program starting part 52 performs the mount target module which has been thus mounted in Step S229. Since any mount target module whose authentication check has been failed is not mounted in Step S229, it is not executed in Step S232 accordingly.

Figure 45:
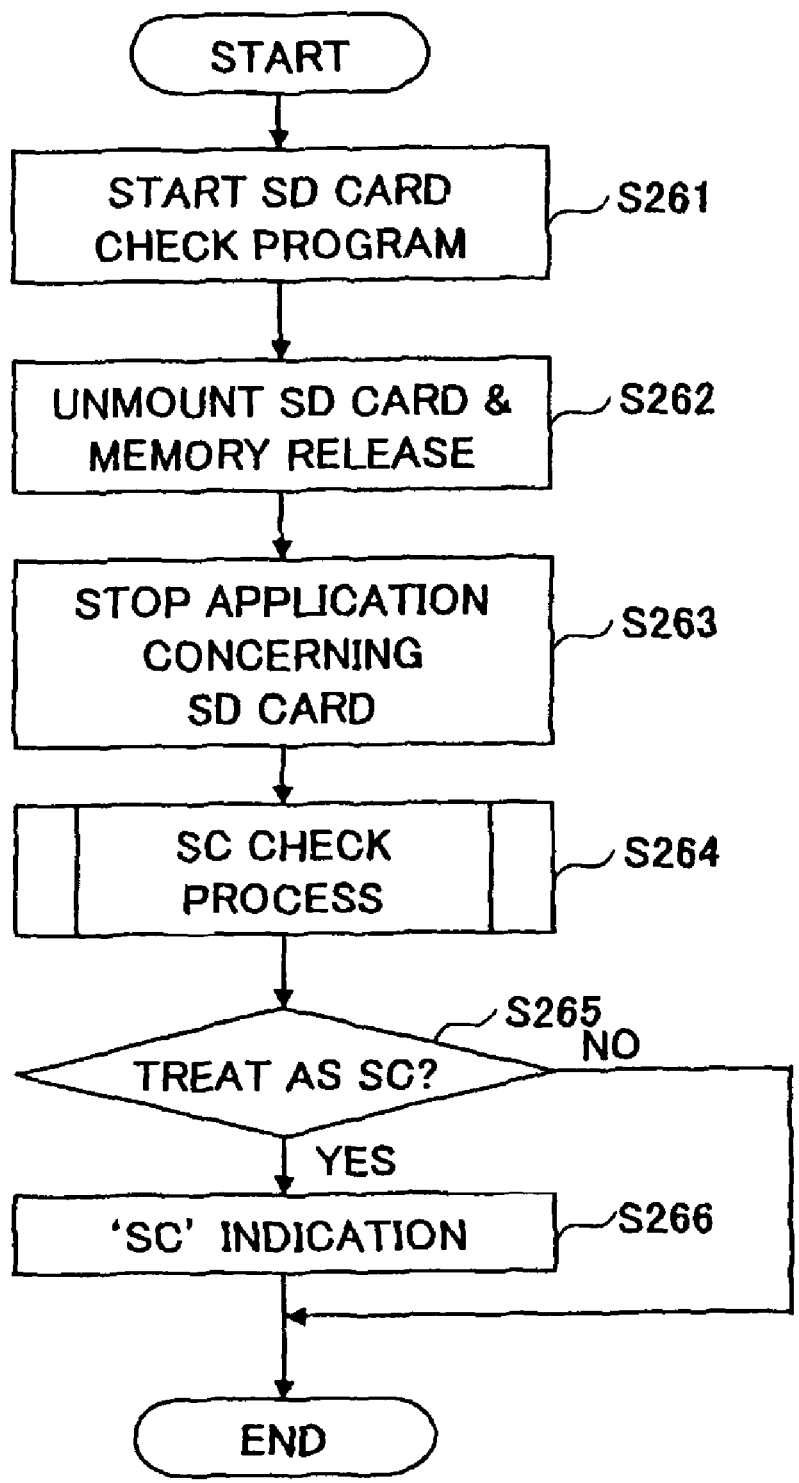
FIG. 45 shows an operation flow chart illustrating another example of SD card removal detecting operation performed in the image forming apparatus shown in FIG. 1.

FIG. 45 shows an operation flow chart of an example of SD card removal detection processing according to the third embodiment of the present invention. In step S261, the program starting part 52 starts the SD card check program 121. Then, in Step S262, the SD card check program 121 performs unmounting of the SD card 126 or 128, notifies of the matter that it has unmounted the SD card 126 or 128 to the SD card status monitor driver 123, and suspends the current processing. In Step S262, when the SD card 126 or 128 is thus unmounted, the memory areas secured in the system memory 62 and the local memory 67 are released accordingly.

In Step S263, the program starting part 52 stops the execution of the application which has been once started from the SD card 126 or 128 in Step S217 or S232. Then, in Step S264, the program starting part 52 determines whether or not the currently-performed removal of the SD card 126 or 128 is treated as a 'service call' action (simply referred to as an 'SC') through an SC check process. The above-mentioned '0service call' action means an action performed by a function of the composite machine 1 according to the third embodiment in that a trouble, a failure or so detected by means of a self diagnosis function of the composite machine 1 is notified of.

Figure 46:
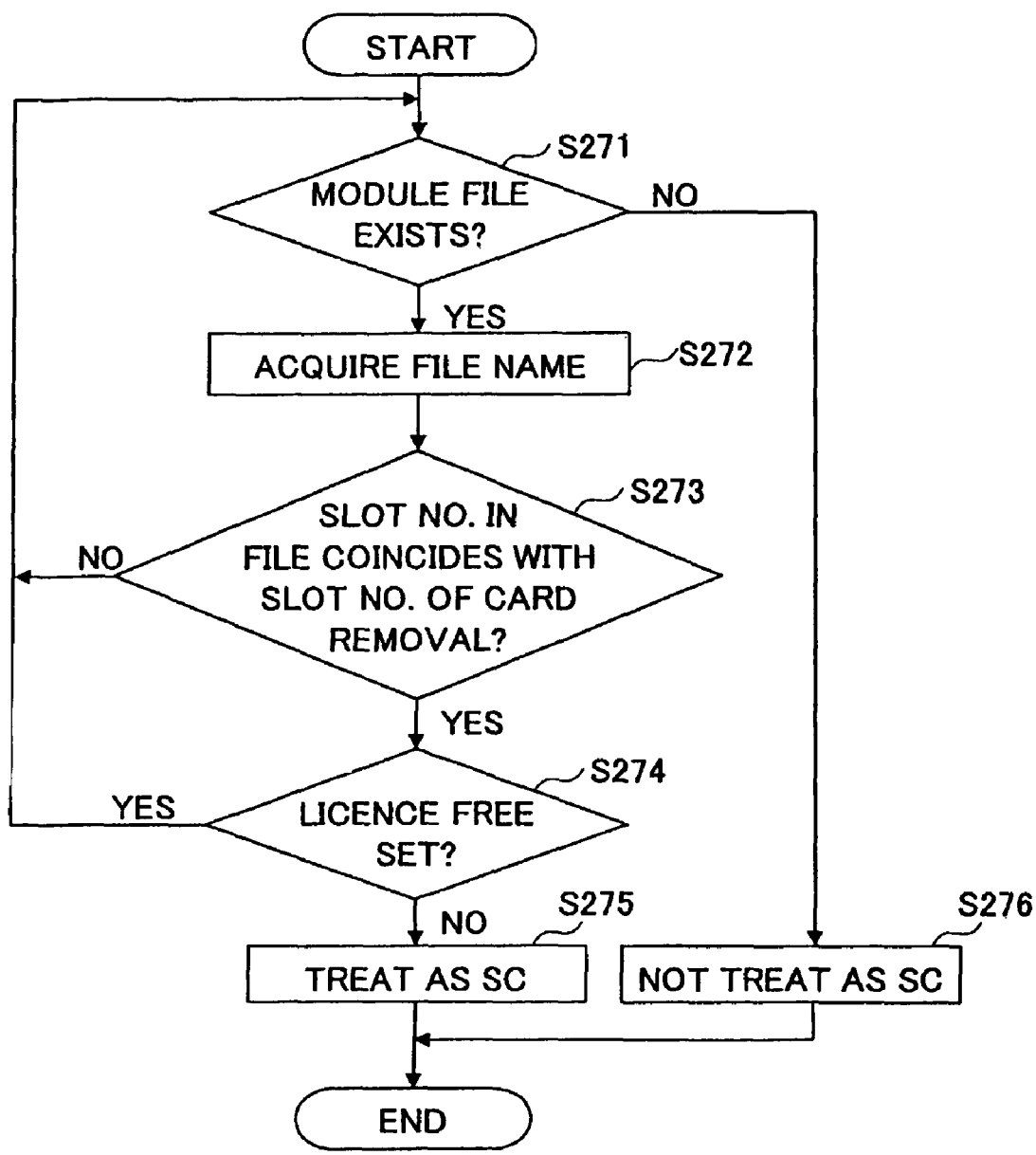
FIG. 46 shows an operation flow chart illustrating an example of SC check operation performed in the image forming apparatus shown in FIG. 1.

FIG. 46 shows an operation flow chart of an example of the above-mentioned SC check process. In Step S271, the program starting part 52 determines whether or not a file entitled "/tmp/module ID.txt" exists in the file tree managed in the machine 1 such as that shown in FIG. 4. When it is determined that a file entitled "/tmp/module ID.txt" exists (Yes in Step S271), the program starting part 52 performs Step S272, and acquires a file name "MOUNTFILE: mnt/sdX/yyy.mod" from the thus-found file "/tmp/module ID.txt" into which the module information file is copied as mentioned above with reference to Step 215 of FIG. 31 or Step 230 of FIG. 41A at a time of the relevant mount target module of the SD card 126 or 128 having been mounted. The symbol "X" of "sdX" contained in the above-mentioned file name "MOUNTFILE: mnt/sdX/yyy.mod" indicates the slot number of the slot in which the relevant SD card has been inserted (see FIGS. 37 through 39, (71), (72) and (73)). For example, in the case of the module information file of FIG. 37, the program starting part 52 acquires the file name "MOUNTFILE:mnt/sd1/printer.mod." which includes the above-mentioned slot number "1" in the description "sd1".

In Step S273, the program starting part 52 determines whether or not the SD card slot number acquired in step S272 coincides with the slot number of the slot from which the relevant SD card 126 or 128 has been thus removed. When it is determined that both the slot numbers coincide with one another, (Yes in Step S273), the program starting part 52 determines whether or not the content "LICENSE:FREE" is written as license information in the module information file acquired with the entry "MOUNTFILE" in step S272. When it is determined that the content "LICENSE:FREE" is written (Yes in Step S274), the program starting part 52 returns to Step S271. For example, since "LICENSE:FREE" is written in the case of the module information file shown in FIG. 39, (59), the current processing is returned to Step S271.

For example, in case the relevant SD card is the above-mentioned process inspection SD card, which is used in process inspection performed in the factory before the relevant machine is shipped, the content "LICENSE FREE" should be written in the module information file. Thereby, even when this SD card is removed from the machine, this action is not treated as an action corresponding to 'SC'. As a result, the same process inspection SD card can be used in common in the factory for performing process inspection there on many composite machines in a same type. That is, in the case of process inspection SD card, no protection is needed in terms of copyright or so, and, thus, removal of the same from the slot of the machine should not initiate any operation which prevents the relevant machine from being further operated.

When it is determined that the SD card slot number acquired in step S272 and the slot number concerning the actual removal of SD card 126 or 128 do not coincide with one another (No in Step S273), the current processing of the program starting part 52 is returned to Step S271.

When the program starting part 52 determines that the content "LICENSE:FREE" is not written as license information in the module information file acquired with the entry "MOUNTFILE" in step S272 (No in Step S274), Step S275 is performed, and the relevant SD card removal is treated as 'SC'. Accordingly, a predetermined alarm notification is made, and, thus, as will be described later, the relevant machine cannot be further used so that some illegal action such as a copyright infringement can be avoided positively.

For example, in the case of application module such as that of a printer application or scanner application as shown in FIGS. 37 and 38, since the content "LICENSE:FREE" is not written in the corresponding module information file, removal of the relevant SD card 126 or 128 is treated as 'SC' by the program starting part 52, and, thus, such a type of SD card for which a copyright or so should be protected can be positively prevented from being shared on a plurality of composite machines in a same type.

When the program starting part 52 determines that there exists no file entitled "/tmp/module ID.txt" in the file tree managed in the machine 1 such as that shown in FIG. 4 (No in Step S271), it performs Step S76 and does not treat the relevant SC card removal action as 'SC'.

Returning to FIG. 45, the program starting part 52 determines in Step S265 whether or not the relevant SD card removal action is treated as 'SC' according to the result of SC check process described above with reference to FIG. 45. Then, when it determines that the relevant SD card removal action is treated as SC by the check process (Yes in Step S265), the program starting part 52 performs Step S266, and displays the matter of 'SC' on the operation panel 80, and terminates the current processing. After the matter of 'SC' is displayed on the operation panel 80, the relevant composite machine 1 enters a state where the machine is prevented from further running even when a user tries to operate the same. Thus, a copyright of the relevant SD card is protected.

On the other hand, when it is determined that the relevant SD card removal action is not treated as SC by the SC check process (No in Step S265), the program starting part 52 terminates the current processing without initiating any special operation such as that to be performed in terms of copyright protection. In this case, on the composite machine 1, a user can use any functions of applications in the machine 1 other than the application which is thus stopped in operation in Step S263.

According to the third embodiment of the present invention, as described above, an information recording medium which can be inserted/removal into/from a machine of image formation apparatus can be easily and positively prevented from used in common on a plurality of machines in the same type.

Figure 47:
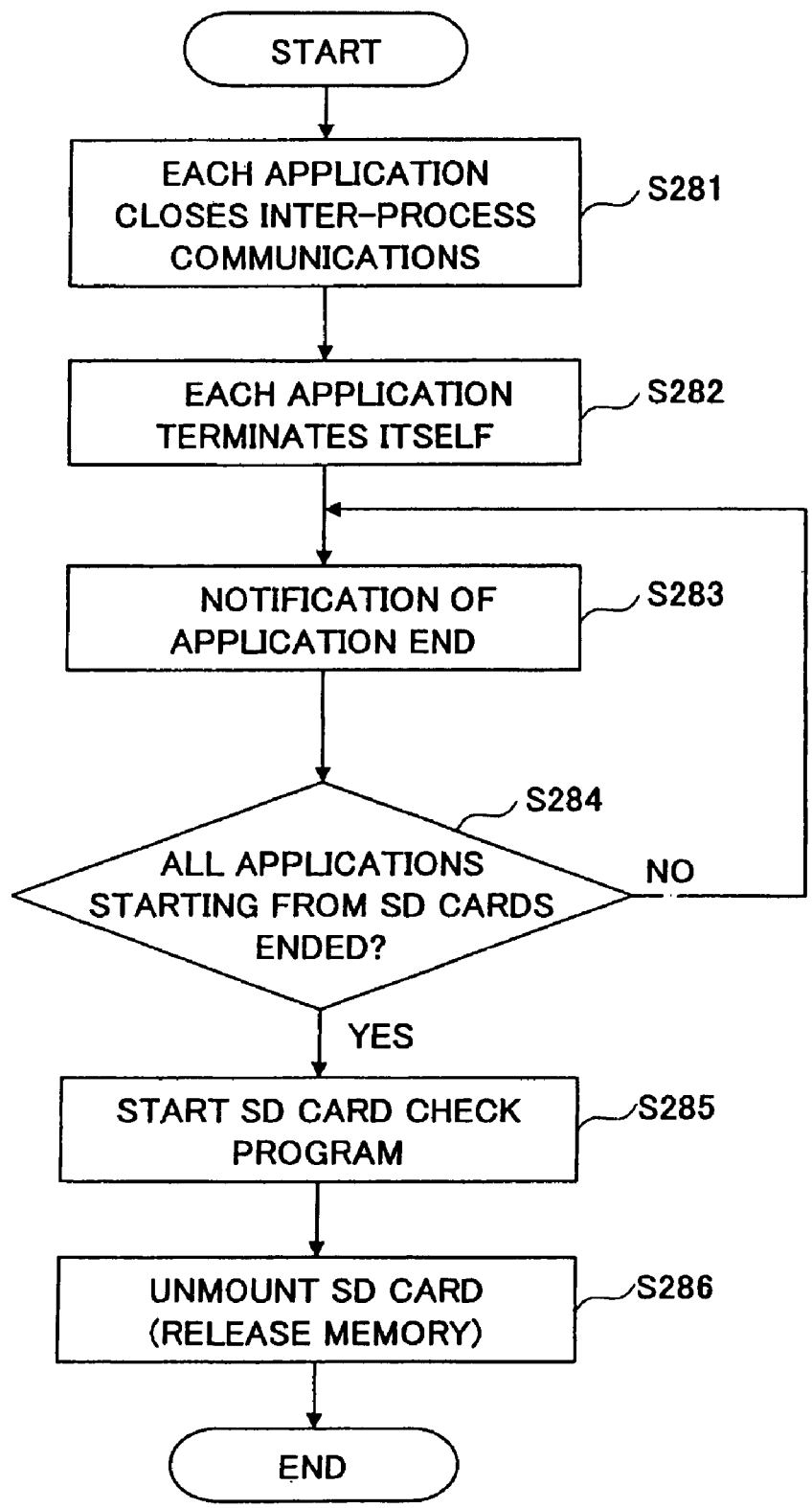
FIG. 47 shows an operation flow chart illustrating another example of SD card removal detecting operation performed in the image forming apparatus shown in FIG. 1.
Figure 48:
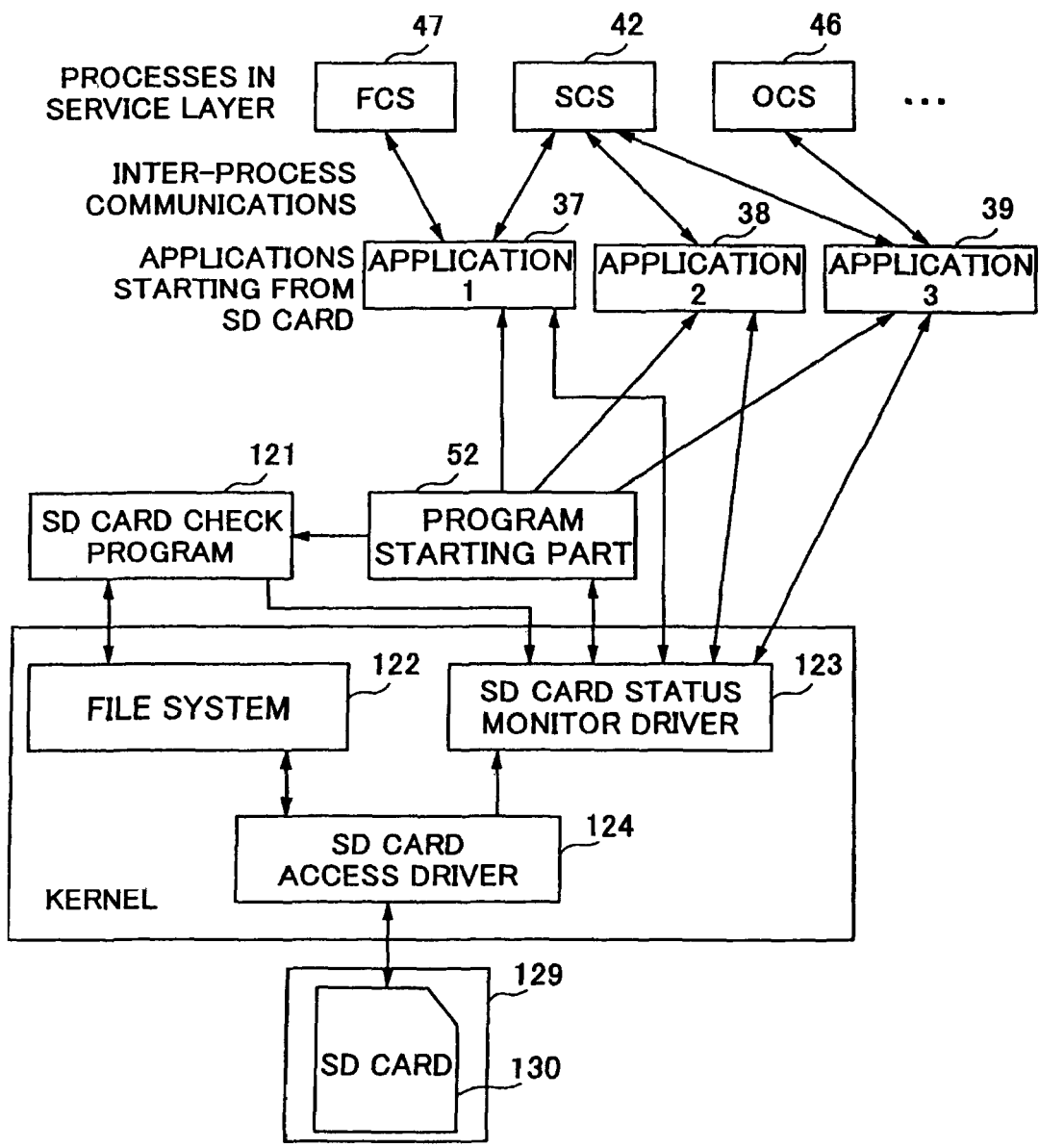
FIG. 48 illustrates another example of information processing system to operate in the image forming apparatus shown in FIG. 1.

FIG. 47 shows an operation flow chart of another example of SD card removal detection processing according to the third embodiment of the present invention. FIG. 48 shows a diagram illustrating a configuration in this example of SD card removal detection processing, substantially same as that shown in FIG. 29 as far as the basic configuration of the composite machine 1. In this example, no SC check process such as that described above is performed in the SD card removal detection processing shown in FIG. 47.

When an SD card 130 for starting a process of a new application software is removed from the SD card slot 129, the SD card status monitor driver 123 notifies applications 37 through 39 themselves previously started from the relevant SD card 130.

Then, in Step S281, each of the applications 37 through 39 closes inter-process communications with a relevant process in the service layer (for example, SCS 42, OCS 46, FCS 47 or so). In Step S282 following Step S281, the applications 37 through 39 terminate themselves. Then, in Step S283, the program starting part 52 receives a signal (SIGCHLD) indicating a termination of each of the applications 37 through 39, and thus recognizes that at least some of the applications 37 through 39 has been terminated.

Then, in Step S84, the program starting part 52 determines whether or not all the applications 37 through 39 have been terminated previously started from the SD card 130. When it determines that all of the applications 37 through 39 have not been terminated (No in Step S284), the program starting part 52 repeats Steps S283 and S284.

When it is determined that all the applications 37 through 39 started from the SD card 130 have been terminated (Yes in Step S284), the program starting part 52 then performs Step S285. In Step S285, the program starting part 52 starts the SD card check program 121. Then, in Step S286, the SD card check program 121 performs unmounting of the relevant SD card 130, notifies of the matter that it has performed the unmounting of the SD card 130 to the SD card status monitor driver 123, and suspends the current processing.

Since the SD card removal detection processing of FIG. 47 is not treated as 'SC' in this case, the application programs can be started from the SD card 130 properly upon re-insertion of the card 130 into the SD card slot 129 of the same composite machine.

One way of utilizing such an SD card as that mentioned above is externally providing various types of data into the above-mentioned composite machine. In such a case, various types of data (for example, image data, etc.) which an application software included in the composite machine 1 processes are recorded in an SD card serving as an example of an information recording medium, and therethrough, are supplied to the composite machine. Then, when an operator causes an application to process the various types of data recorded in the SD card, the operator inserts in the slot of the composite machine the SD card in which the various types of data are recorded, and input relevant instructions to the application via the operation panel of the machine, and thus, causes the application to actually process the various types of data originally recorded in the SD card.

Then, when causing the application to process the various types of data recorded in the SD card, the operator needs to determine or select which application in the machine is suitable for processing the relevant type of data recorded in the SD card loaded, and needs to provide relevant instructions to the thus-selected application via the operation panel.

That is, according to a conventional manner, when making an application process various types of data recorded in the SD card, an operator had to determine or select an application in the machine which is suitable for processing the relevant type of data.

A fourth embodiment of the present invention which will now be described is advantageous in view of the above-mentioned point, and aims at providing an image forming apparatus which can process easily various types of data originally recorded in an information recording medium which may be inserted/removed into/from the machine.

A composite machine according to the fourth embodiment of the present invention will now be described. This composite machine in the fourth embodiment has a configuration generally the same as that of the composite machine in the first embodiment described above, and, thus, duplicated description will be omitted. The configuration of the above-described composite machine 1 according to the first embodiment described above with reference to FIGS. 1-7 is applied also to this fourth embodiment as it is.

Figure 49:
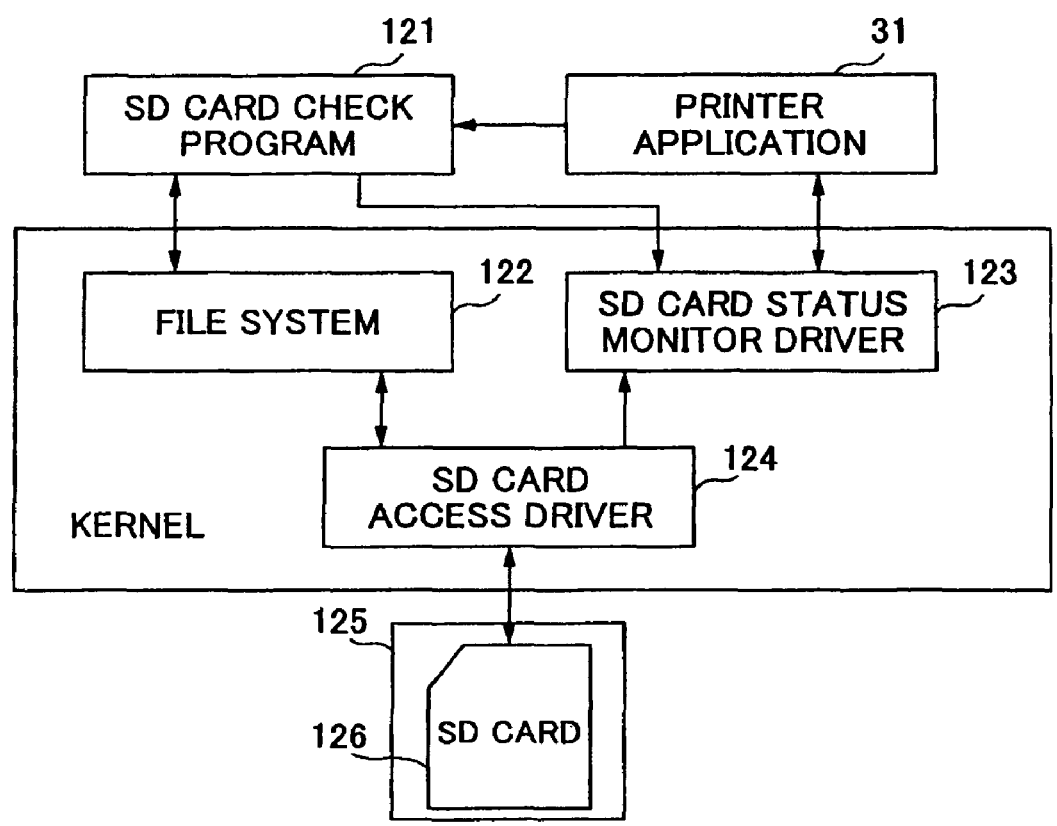
FIG. 49 illustrates another example of information processing system to operate in the image forming apparatus shown in FIG. 1.

FIG. 49 illustrates a data processing method performed in the composite machine 1 according to the fourth embodiment of the present invention. Only configuration part of the composite machine 1 needed for illustrating the feature of the fourth embodiment is shown, and the other part is omitted. A case where image data is taken as an example of the above-mentioned various types of data recorded in the SD card, and a printer application 31 shown in FIG. 1 or FIG. 49 is taken as an example as the above-mentioned application which is made to process the image data recorded in the SD card. The printer application 31 is that originally mounted in the machine 1 according to the fourth embodiment.

Figure 50:
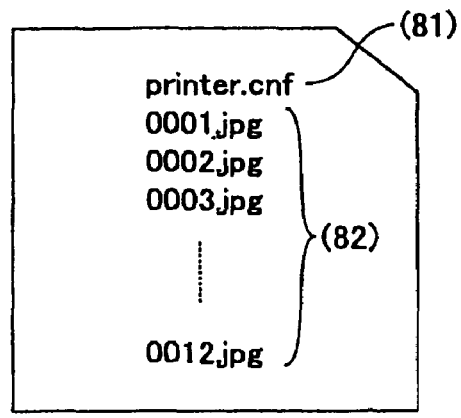
FIG. 50 illustrates another example of files recorded in the SD card to be mounted.
Figure 51:
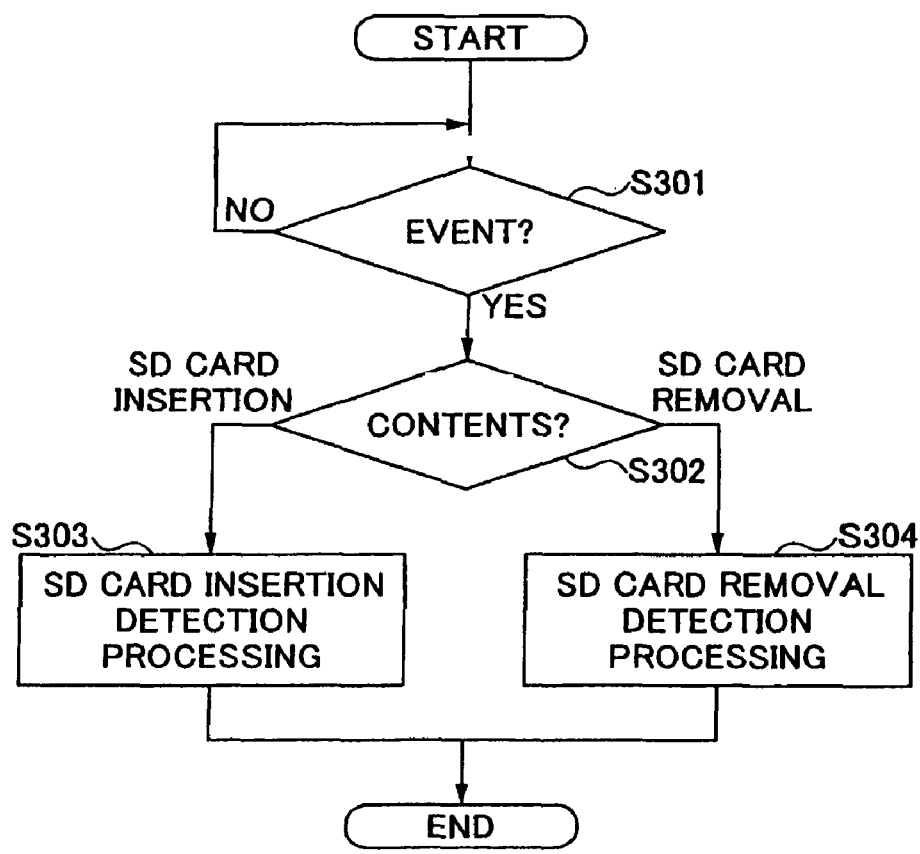
FIG. 51 shows an operation flow chart illustrating another example of event waiting operation performed in the image forming apparatus shown in FIG. 1.

In a first example according to the fourth embodiment, the SD card 126 has a setting file for the printer application, as well as a plurality of files of image data, etc. recorded therein as shown in FIG. 50. FIG. 50 shows an image of an example of files recorded in the SD card 126. In the figure, "printer.cnf" (81) indicates the above-mentioned setting file for the printer application, "0001.jpg", "0002.jpg", . . . , "0012.jpg" (82) indicate respective image data files. As mentioned above, the SD card 126 can be inserted/removed into/from the composite machine 1 in a state in which the machine is running, i.e., in a hot plugging manner.

The SD card slot 125 shown in FIG. 49 is configured such that the SD card 126 can be inserted thereinto or removed therefrom, and provides an interrupt to the SD card access driver 124 in response to the insertion/removal of the SD card 126.

The SD card access driver 124 performs an access control to the SD card 126, and notifies the SD card status monitor driver 123 of the insertion/removal of the SD card 126 according to the interrupt provided by the SD card slot 125.

The SD card status monitor driver 123 manages status information concerning the SD card 126 such as that of insertion, removal, mounting, unmounting and so forth of the SD card 126, and the SD card status monitor driver 123 notifies the printer application 31 shown in FIG. 49 of the status information of the SD card 126.

The printer application 31 shown in FIG. 49 starts an SD card check program 121 in response to the insertion/removal of the SD card 126. Further, the printer application 31 processes image data (82) written in the SD card 126 as mentioned above according to status information concerning the SD card 126 provided by the SD card status monitor driver 123.

The SD card check program 121 determines as to the SD card 126 whether or not a partition is properly set therein, whether or not a status in the file system has any problem there, and so forth, for the purpose of causing the file system 122 originally written in the SD card 126 to enter a state in which the file system can be properly utilized. The SD card check program 121 has, for example, a function of verifying the SD card 126, a function of mounting the file system of the SD card, a function of unmounting the same, a function of notifying of a state, etc.

With reference to figures, an operation procedure of the method according to the fourth embodiment of the present invention will now be described. After a power supply is started in the machine 1, the program starting part 52 shown in FIG. 3 starts the applications 30 of the composite machine 1, and the process of the platform 40. After thus being started by the program starting part 52, the printer application 31 enters a state of waiting any event.

Figure 52:
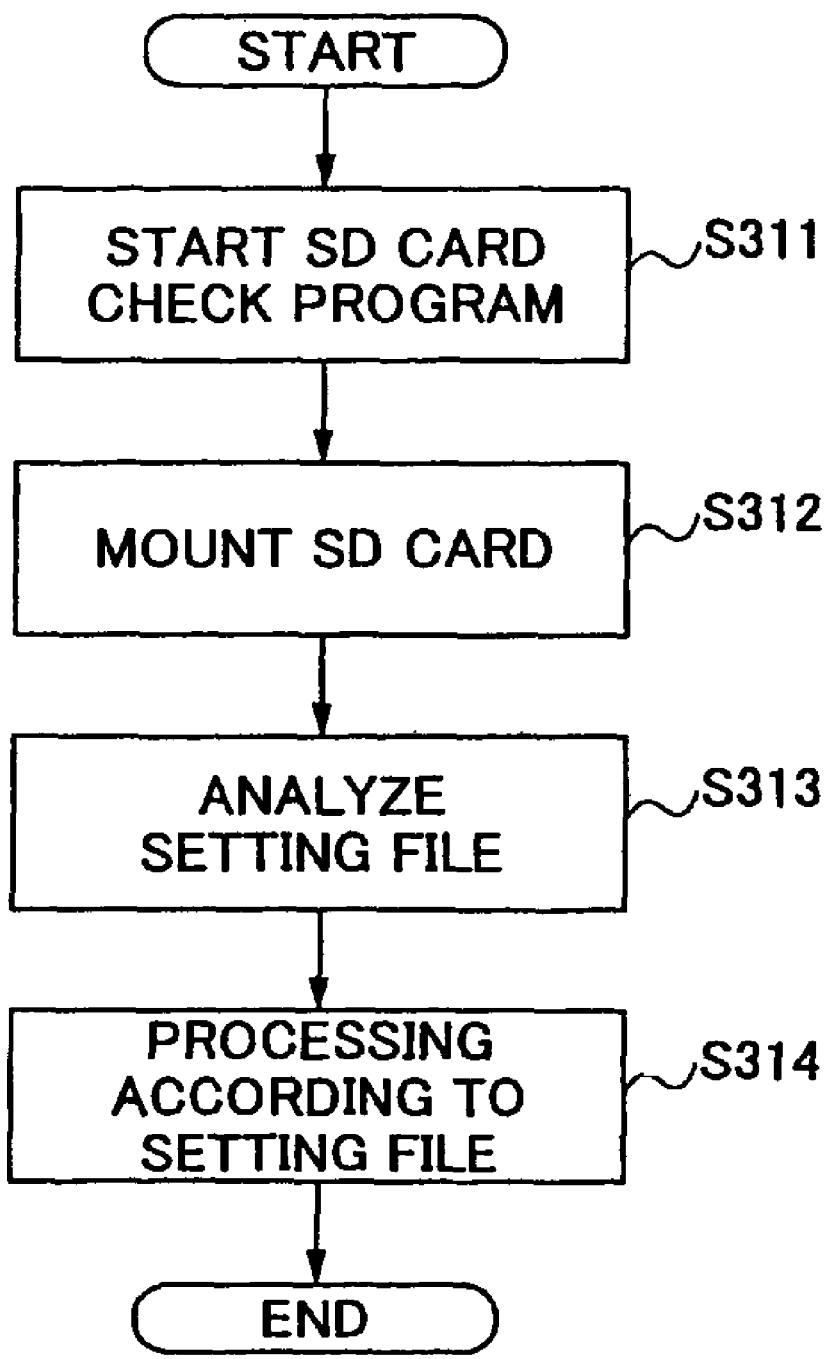
FIG. 52 shows an operation flow chart illustrating another example of SD card insertion detecting operation performed in the image forming apparatus shown in FIG. 1.

FIG. 52 shows a flow chart of an example of a process performed by the printer application 31 in the above-mentioned state of event waiting. In Step S301 of FIG. 52, the printer application 31 determines whether or not any event has occurred. When it determines that no event has occurred (NO in Step S301), the printer application 31 repeats the processing of Step S301. When it is determined that an event has occurred (Yes in the step S301), the printer application 31 performs Step S302.

For example, when the SD card 126 is inserted in the SD card slot 125, the SD card access driver 124 notifies of this insertion of the SD card 126 to the SD card status monitor driver 123 according to an interrupt performed by the SD card slot 125 accordingly. Then, the SD card status monitor driver 123 notifies of the insertion of the SD card 126 to the printer application 31. The printer application 31 determines that any event has occurred as the insertion of the SD card 126 is thus notified of by the SD card status monitor driver 123.

When the SD card 126 is removed from the SD card slot 125, in response to an interrupt made by the SD card slot 125 accordingly, the SD card access driver 124 notifies of the removal of the SD cart to the SD card status monitor driver 123. Then, the SD card status monitor driver 123 notifies of the removal of the SD card 126 to the printer application 31. The printer application 31 thus determines that any event occurs, as the SD card status monitor driver 123 thus notifies of the removal of the SD card 126 to the printer application 31.

In Step S302, the printer application 31 determines the contents of the event which has thus occurred. When the contents of the event corresponds to an insertion detection of the SD card 126, the printer application 31 performs Step S303. In Step S303, an SD card insertion detection processing which will be described later is performed. On the other hand, when the contents of the event corresponds to a removal detection of the SD card 126, the printer application 31 performs Step S304. In Step S304, an SD card removal detection processing described later is performed.

FIG. 52 shows an operation flow chart of an example of the above-mentioned SD card insertion detection processing. In Step S311, the printer application 31 starts the SD card check program 121. In Step S312 following Step S311, the SD card check program 121 performs mounting of the SD card 126, notifies the SD card status monitor driver 123 of the matter that the mounting has been performed, and suspend the current processing.

Then, in Step S313 following Step S312, after the mounting of the SD card 126 is performed is notified of via the SD card status monitor driver 123, the printer application 31 reads the setting file for printer application (81) shown in FIG. 50 from the thus-mounted SD card 126, and analyzes the same.

FIG. 53 illustrates an example of the above-mentioned setting file for printer application (81). The setting file for printer application shown in FIG. 53 indicates a process of printing out an image data file '0003.jpg' and printing out of an image data file '0007.jpg'.

In Step S314 following Step S313, the printer application 31 performs processes according to the setting file for printer application analyzed in Step S313. For example, in a case of the setting file for printer application such as that shown in FIG. 53, the printer application 31 performs processes of printing out the image data file '0003.jpg' and printing out the image data file '0007.jpg' accordingly.

Accordingly, in the composite machine 1 according to the fourth embodiment of the present invention, even when the SD card 126 is inserted into the machine in a hot plugging manner, image data written in the SD card 126 is printed out automatically in the machine 1 according to the setting file for printer application also written in the SD card 126.

The above-described case is a case where as setting file for printer application is previously written in the SD card in which image data to be processed according to the setting file is also written. However, it is also possible that an operator person will instead input appropriate instructions into the printer application 31 in the composite machine 1 via the operation panel, according to which image data written in the SD card 126 is selected and processed in the machine 1. For example, the operator may select any image data file from among those written in the SD card via the operation panel to be printed out through the printer application 31. In such a case, no setting file for printer application should be previously written in the same SD card 126. FIG. 54 shows the contents recorded in the SD card in this case. As shown, only image data files '0001.jpg', . . . , '0012.jpg' are written in the SD card. FIG. 54 shows an image of an example in which the data files are recorded.

Figure 55:
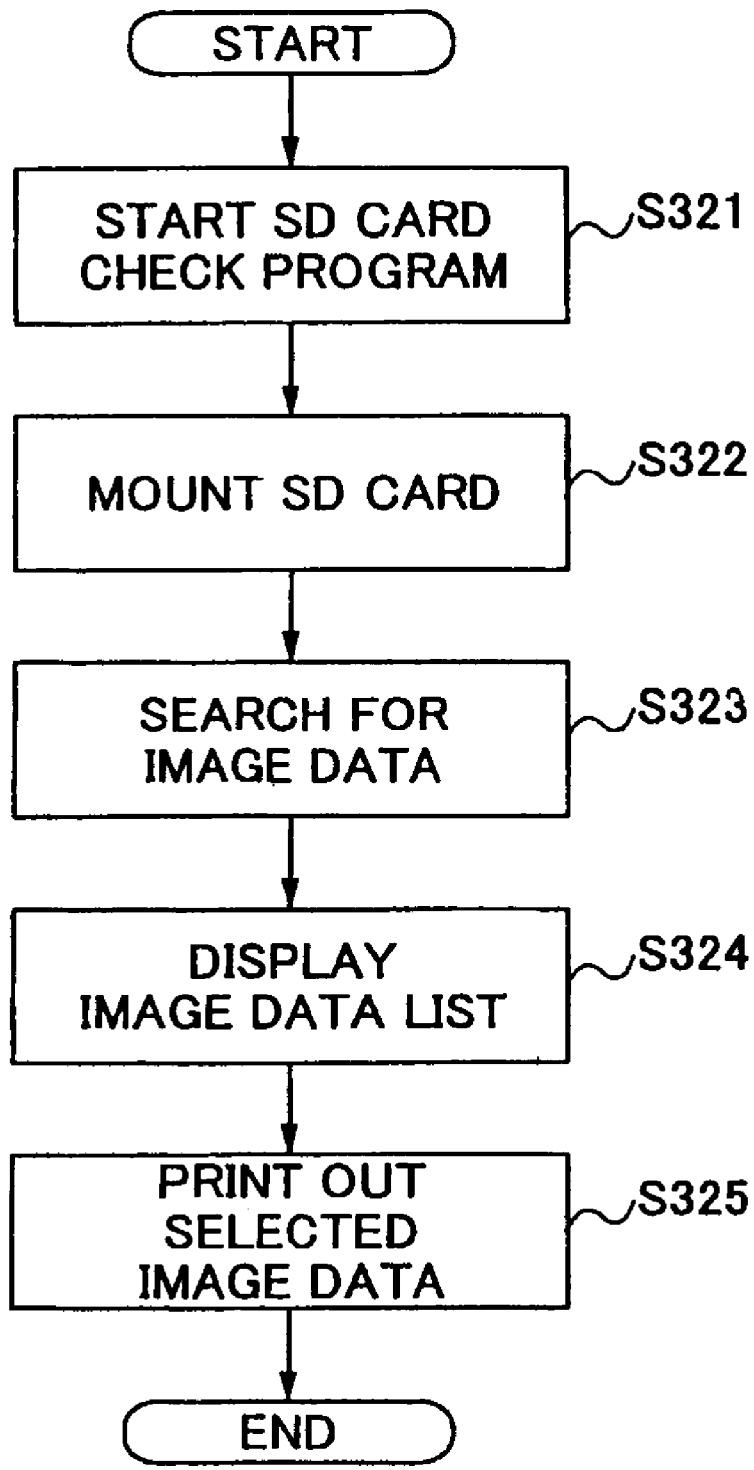
FIG. 55 shows an operation flow chart illustrating another example of SD card insertion detecting operation performed in the image forming apparatus shown in FIG. 1.

FIG. 55 shows an operation flow chart illustrating another examples of the SD card insertion detection processing according to the fourth embodiment of the present invention. In Step S321, the printer application 31 starts the SD card check program 121. Then, in Step S322, the SD card check program 121 performs mounting of the inserted SD card 126, notifies of the matter of performing this mounting operation to the SD card status monitor driver 123, and suspends the current processing.

In Step S323, the printer application 31 searches the thus-mounted SD card 126 for image data files, upon being notified of the matter that the mounting of the SD card is performed by the SD card status monitor driver 123.

In Step S324, the printer application 31 displays a list of image data files obtained by the search in Step S323 on the operation panel of the machine 1.

Figure 56:
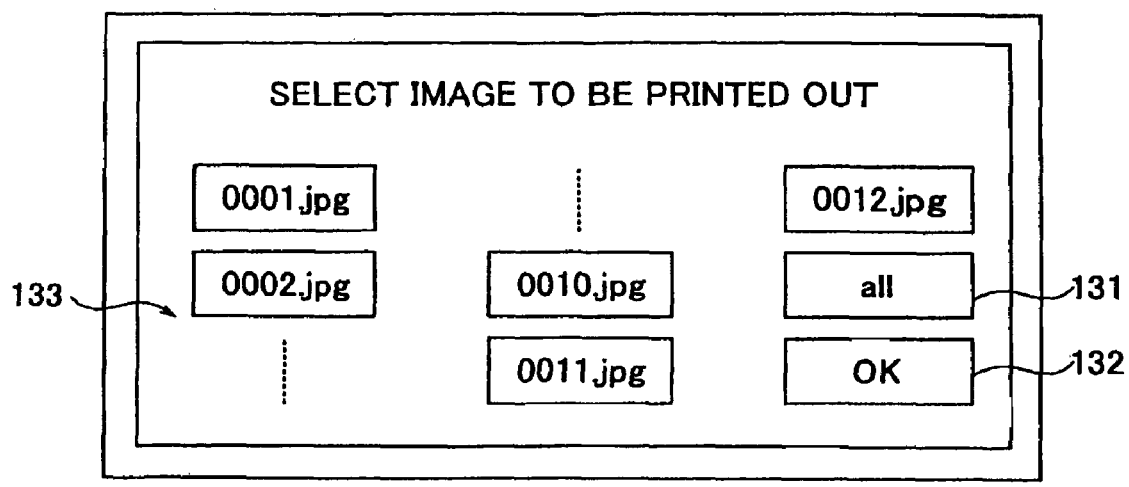
FIG. 56 illustrates an image data list displayed on an operation panel of the image forming apparatus shown in FIG. 1.

FIG. 56 shows an image diagram of an example of the above-mentioned list of image data files thus displayed on the operation panel. As shown, the list of image data files contains buttons 133 for an operator to select arbitrary ones from the image data files '0001.jpg', . . . , '0012.jpg' recorded in the relevant SD card 126, a button 131 "all" for the operator to select all of these image data files by a single action, and a button 132 "O.K" for causing the printer application 31 to perform printing out of the thus-selected image data files.

When the operator selects image data files on the operation panel described above by using the buttons 133 or 131, and presses the "O.K" button 132, the printer application 31 performs Step S25 shown in FIG. 55, and performs printing out of the thus-selected image data files.

Accordingly, in the composite machine 1 in the fourth embodiment in this example, an operator can choose any ones from among image data files recorded in the SD card 126 on the operation panel of the machine 1, and, according to the thus-input instructions of the operator, the composite machine 1 performs printing out of the thus-selected image data files.

In case the SD card 126 is suddenly removed from the card slot, it is necessary to unmount the SD card 126 also in this embodiment. For this purpose, the printer application 31 starts the SD card check program 121, which thus performs an unmounting processing on the SD card 126.

Figure 57:
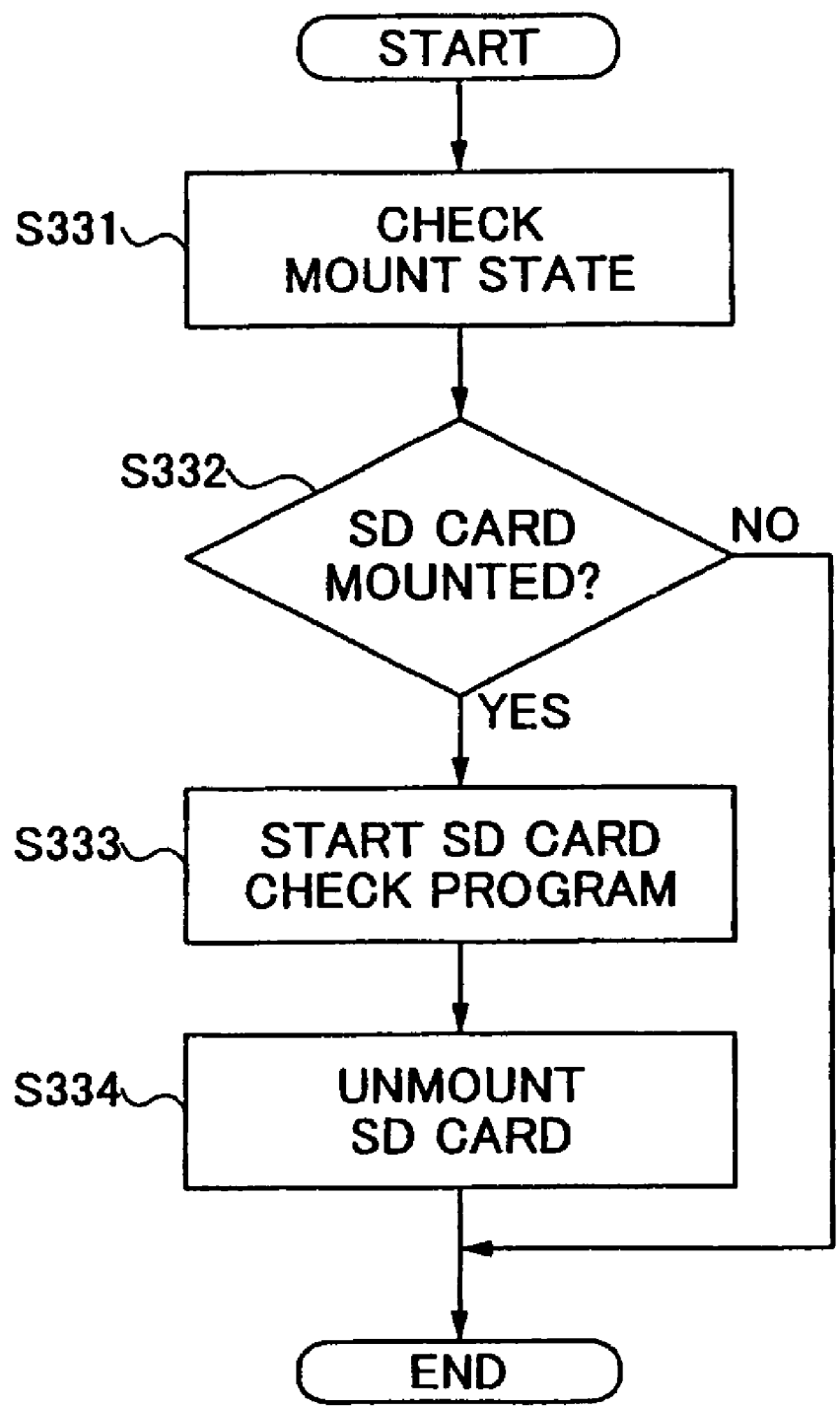
FIG. 57 shows an operation flow chart illustrating another example of SD card removal detecting operation performed in the image forming apparatus shown in FIG. 1.

FIG. 57 shows an operation flow chart of an example of an SD card removal detection processing. In Step S331, the printer application 31 inquires the SD card status monitor driver 123 as to the status information on the SD card 126, and examines the state of mounting of the SD card 126.

In Step S332 following Step S331, the printer application 31 determines from a result of examination on the mounting state performed in Step S331 whether or not the SD card 126 is mounted. When it is determined that the SD card 126 is mounted according to the examination result on the mount state (Yes in Step S332), the printer application 31 performs Step S333, and starts the SD card check program 121. When it is determined that first of all the SD card 126 is not mounted according to the examination result on the mounting state (No in Step S332), the printer application 31 terminates the current processing.

In Step S334 following Step S333, the SD card check program 121 performs unmounting of the SD card 126, notifies of the matter that it has unmounted the SD card 126 to the SD card status monitor driver 123, and terminates the current processing.

Thus, in the composite machine 1 also in the fourth embodiment, even when the SD card 126 is removed in a state in which the power supply is maintained, unmounting processing of the SD card 126 can be properly performed automatically.

Thus, according to the data processing method performed in the composite machine 1 according to the fourth embodiment of the present invention, it is possible to cause an application program in the machine 1 to process various types of data recorded in the SD card only by inserting the card 126 into the SD card slot 125, for example. The above-described examples are those in which image data files recorded in the SD card 126 are processed by the printer application 31, which then performs printing out of the image data files. However, any other examples can be achieved in that image data files or another type of data files recorded in the SD card 126 may be processed by the facsimile application 33, which then performs facsimile transmission of the image data files or another type of data files in the composite machine 1.

Thus, according to the fourth embodiment of the present invention, various types of data recorded in an information recording medium which can be inserted/removed into/from a machine or image forming apparatus can be made to be processed in the machine easily.

A fifth embodiment of the present invention which will now be described is also directed to solve problems which are same as those which the above-described fourth embodiment of the present invention is directed to solve, and thus aims at providing an image forming apparatus which can process easily various types of data recorded in an information recording medium which may be inserted/removed into/from the machine.

A composite machine according to the fifth embodiment of the present invention will now be described. This composite machine 1 in the fifth embodiment has a configuration generally the same as that of the composite machine 1 in the first embodiment described above, and, thus, duplicated description will be omitted. The configuration of the above-described composite machine 1 according to the first embodiment described above with reference to FIGS. 1-9 is applied also to this fifth embodiment as it is.

Figure 58:
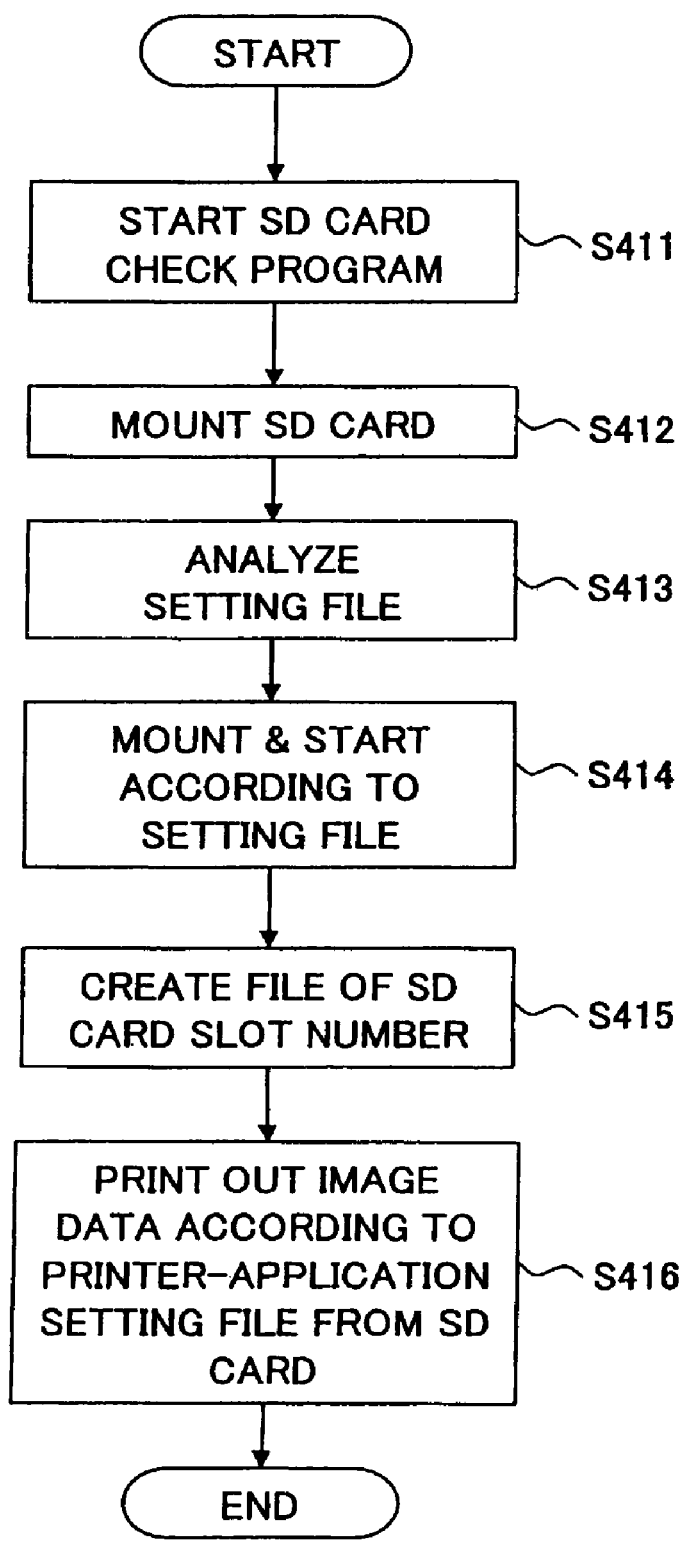
FIG. 58 shows an operation flow chart illustrating another example of SD card insertion detecting operation performed in the image forming apparatus shown in FIG. 1.
Figures 59, 60:
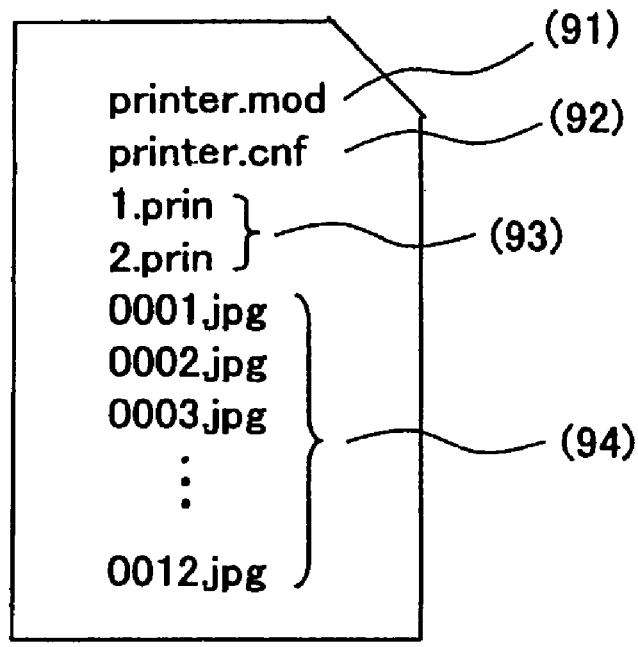
FIG. 59 illustrates an example of instruction files and image data files recorded in the SD card to be mounted.
FIG. 60 illustrates an example of program-starting setting file recorded in the SD card.

FIG. 58 illustrates a data processing method performed in the composite machine 1 according to the fifth embodiment of the present invention. Only configuration part of the composite machine 1 needed for illustrating the feature of the fifth embodiment is shown, and the other part is omitted. FIG. 59 specifically shows an operation flow chart of an example of SD card insertion detection processing, which is performed when the SD card 126 having contents such as those shown in FIG. 59 is inserted in the SD card slot 125 of the composite machine 1 in the fifth embodiment. FIG. 59 shows a list of instruction and data files previously recorded in the SD card 126.

In the example of FIG. 59, "printer.mod" (91) indicates a mount target software module which is to be mounted, and then started so as to function as the printer application 31 shown in FIG. 1 in the composite machine; "printer.cnf" (92) indicates a program-starting setting file; "1.prin" and "2.prin" (93) indicate respective printer-application setting files; and "0001.jpg", . . . , "0012.jpg" (94) indicate respective image data files.

In Step S411 of FIG. 58, the program starting part 52 starts the SD card check program 121. Then, in Step S412, the SD card check program 121 performs mounting of the SD card 126 with the contents shown in FIG. 59, notifies of the matter of this mounting to the SD card status monitor driver 123, and suspends the current processing.

Then, in Step S413, upon being notified of the matter of mounting of the SD card 126 from the SD card status monitor driver 123, the program starting part 52 reads out therefrom and analyzes the program-starting setting file having contents as shown in FIG. 60.

FIG. 60 illustrates the contents of an example of the above-mentioned program-starting setting file. This setting file includes instructions of mounting the above-mentioned mount target file "printer.mod" on a mount point "/arch/printer", and executing the thus-mounted module file "/arch/printer/printer".

Then, in Step S414, the program starting part 52 performs mounting and starting of the above-mentioned mount target module file according to the instructions of the program-starting setting file. Then, in Step S415, the program starting part 52 creates an SD card slot number description file as shown in FIG. 61, which indicates the relevant SD card slot number at which the relevant SC card is inserted, in the mount point in which the above-mentioned mount target module file has been thus mounted in Step S414.

FIG. 60 illustrates an example of the SD card slot number description file, and indicates "3" as the relevant slot number. The SD card slot number description file shown in FIG. 60 means that the relevant SD card 126 has been inserted in the SD card slot 125 having the slot number "3".

Then, in Step S416, the printer application 31 started as a result of the corresponding module file being started in Step S414 selects the relevant SD card 216 according to the indication of the above-mentioned SD card slot number description file, reads out from the thus-selected SD card and analyses the printer-application setting file as shown in FIG. 62, and performs printing out of image data file according to the instructions written in the thus-analyzed printer-application setting file.

FIG. 62 shows an example of the above-mentioned printer-application setting file. FIG. 63 illustrates an example of command specification for commands used in the printer-application setting file. As shown, the printer-application setting file includes a paper command 'paper' by which the size of paper and direction of the same on which image data is printed out are specified; a color command 'color' by which output color and resolution of the image to be printed out are specified; and a print command 'print' by which the image data file to be printed out and the number of copies to be produced therefrom are specified.

Accordingly, in the composite machine 1 according to the fifth embodiment, upon insertion of the SD card 126, the machine 1 thus finally prints out image data files recorded in the SD card 126 according to the instructions/commands written in the program starting setting file and printer-application setting file.

In the example of data processing method described above, the image data recorded in the SD card 126 is printed out through the function of the printer application 31. However, it is also possible that image data files recorded in the SD card 126 may be processed by a plurality of various different application software.

Figure 64:
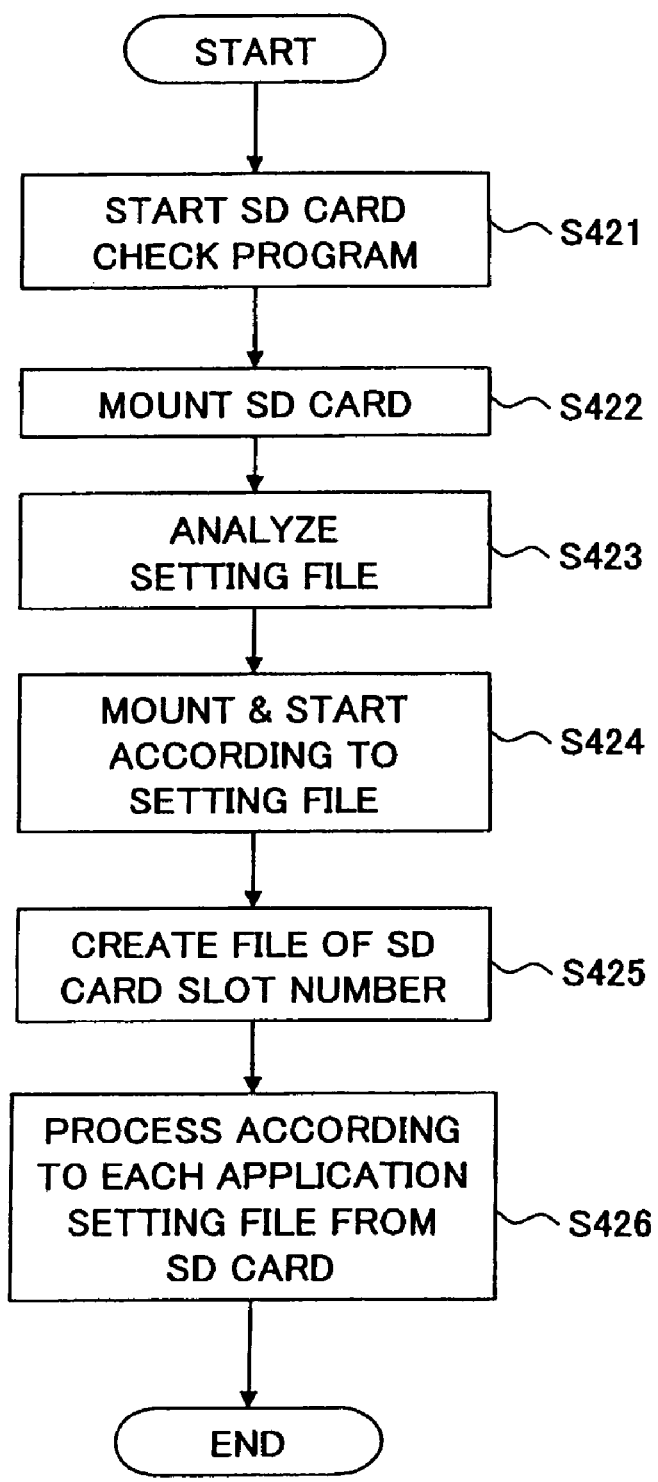
FIG. 64 shows an operation flow chart illustrating another example of SD card insertion detecting operation performed in the image forming apparatus shown in FIG. 1.
Figure 65:
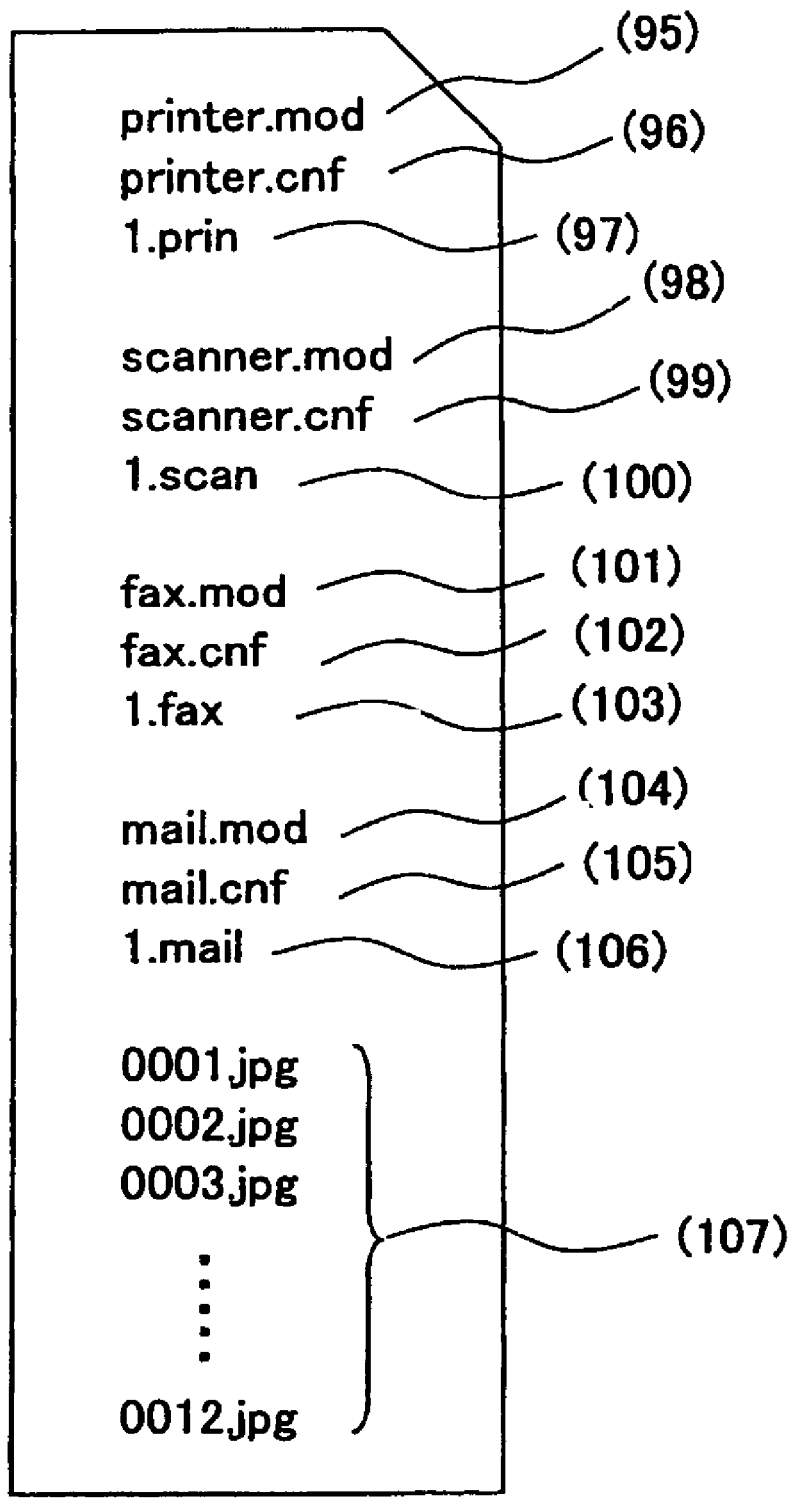
FIG. 65 illustrates another example of instruction files and image data files recorded in the SD card to be mounted.

FIG. 64 shows an operation flow chart of another example of SD card insertion detection processing according to the fifth embodiment of the present invention, and illustrates processing performed when the SD card 126 such as that containing contents as shown in FIG. 65 is inserted in the SD card slot 125. FIG. 65 shows an example of instruction and data files recorded in the SD card. In the example shown, files of respective application modules to mounted and then started, program-starting setting file, respective application setting files, and image data files to be processed by the respective application software are recorded in the SD card.

Specifically, "printer.mod" (95) indicates a mount target software module which is to be mounted and started so as to function as the printer application 31 shown in FIG. 1 in the composite machine 1; "printer.cnf" (96) indicates a program-starting setting file; "1.prin" (97) indicates a printer-application setting file; "scanner.mod" (98) indicates another mount target software module which is to be mounted and started so as to function as the scanner application 34 shown in FIG. 1 in the composite machine; "scanner.cnf" (99) indicates a corresponding program-starting setting file; and "1.scan" (100) indicates a scanner-application setting file.

Similarly, "fax.mod" (101) indicates another mount target software module which is to be mounted and started so as to function as the fax application 33 shown in FIG. 1 in the composite machine; "fax.cnf", (102) indicates a corresponding program-starting setting file; and "1.fax" (103) indicates a fax-application setting file. Similarly, "mail.mod" (104) indicates another mount target software module which is to be mounted and started so as to function as the mail application in the composite machine 1; "mail.cnf" (105) indicates a corresponding program-starting setting file; and "1.mail" (106) indicates a mail-application setting file. "0001.jpg", . . . , "0012.jpg" (107) indicate image data files to be processed through the above-mentioned respective application software.

In Step S421 of FIG. 64, the program starting part 52 starts the SD card check program 121. Then, in Step S422, the SD card check program 121 performs mounting of the SD card 126 with the contents shown in FIG. 65, notifies of the matter of this mounting to the SD card status monitor driver 123, and suspends the current processing.

Then, in Step S423, upon receiving information of the matter of mounting of the SD card 126 from the SD card status monitor driver 123, the program starting part 52 reads out therefrom and analyzes the above-mentioned program-starting setting files 'printer.conf', 'scanner.conf', 'fax.conf', and 'mail.conf'.

For example, the program-starting file 'printer.conf' includes instructions of mounting a mount target file "printer.mod" on a mount point "/arch/printer", and executing the thus-mounted module file "/arch/printer/printer", same as the setting file described above with reference to FIG. 60.

Then, in Step S424, the program starting part 52 performs mounting and starting of the above-mentioned mount target files according to the instructions of the respective program-starting setting files. For example, in a case of the SD card 126 with the contents shown in FIG. 65, the respective module files 'printer.mod', 'scanner.mod', 'fax.mod', and 'mail mod' are mounted, and thus-mounted module files are executed in the composite machine 1 so as to provide the respective functions of the printer application, scanner application, fax application and main application.

Then, in Step S425, the program starting part 52 creates an SD card slot number description file as shown in FIG. 61, which indicates the relevant SD card slot number, in the mount point in which each of the above-mentioned mount target file has been thus mounted in Step S424.

Then, in Step S426, for example, the printer application 31 started as a result of the corresponding module file being started in Step S424 reads and analyses the above-mentioned printer-application setting file as shown in FIG. 62, and performs a process according to the instructions written in the thus-analyzed printer-application setting file recorded in the inserted SD card 126.

Similarly, the scanner application 34 started as a result of the corresponding module file being started in Step S424 reads and analyses the above-mentioned scanner-application setting file, and performs a process according to the instructions written in the thus-analyzed scanner-application setting file. FIG. 66 shows an example of the above-mentioned scanner-application setting file. FIG. 67 illustrates an example of command specification for commands used in the scanner-application setting file. As shown, the scanner-application setting file includes a color command 'color' by which output color and resolution are specified, according to which an image is read in from a draft; and a scan command 'scan' by which an image data file into which an image thus read in is written are specified.

Accordingly, in the composite machine 1 according to the fifth embodiment, upon insertion of the SD card 126, the machine 1 thus finally scans image data and stores the thus-obtained image data in the specified file previously set in the SD card 126 according to the instructions/commands written in the program starting setting file and scanner-application setting file recorded in the inserted SD card 126.

Similarly, the fax application 33 started as a result of the corresponding module file being started in Step S424 reads and analyses the above-mentioned fax-application setting file, and performs a process according to the instructions written in the thus-analyzed fax-application setting file. FIG. 68 shows an example of the above-mentioned fax-application setting file. FIG. 69 illustrates an example of command specification for commands used in the fax-application setting file. As shown, the fax-application setting file includes a destination command 'sendto' by which a destination facsimile number is specified; a paper command 'paper' by which a size and a direction of a paper onto which image data to be sent out is printed out at the destination are specified; and a fax command 'fax' by which an image data file from which image data is read out and transmitted by facsimile is specified.

Accordingly, in the composite machine 1 according to the fifth embodiment, upon insertion of the SD card 126, the machine 1 thus finally transmits image data via facsimile according to the instructions/commands written in the program starting setting file and fax-application setting file recorded in the inserted SD card 126.

Figure 70:
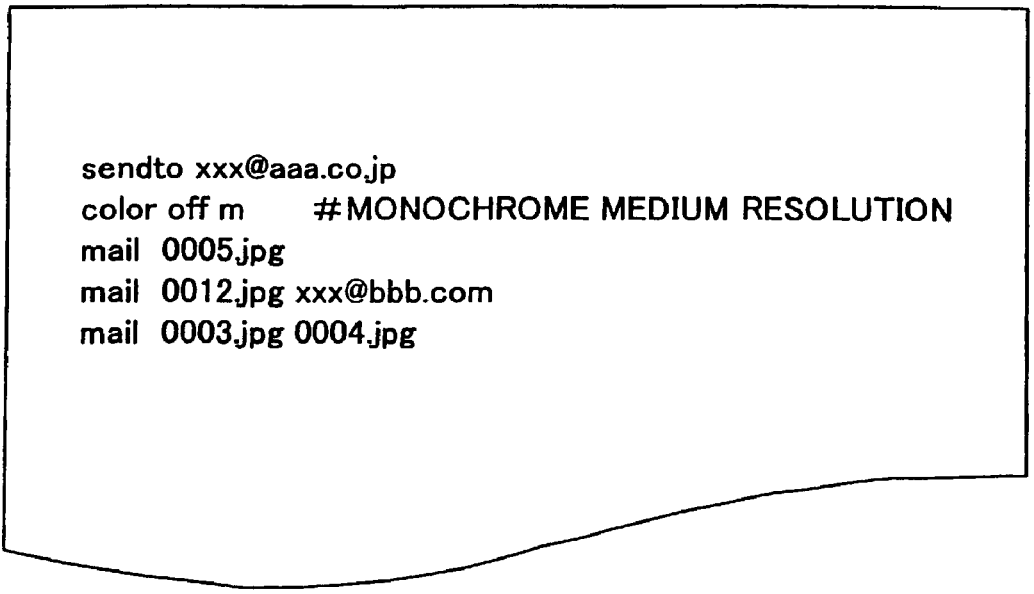
FIG. 70 illustrates an example of a mail-application setting file recorded in the SD card.

Similarly, the mail application started as a result of the corresponding module file being started in Step S424 reads and analyses the above-mentioned mail-application setting file, and performs a process according to the instructions written in the thus-analyzed mail-application setting file. FIG. 70 shows an example of the above-mentioned mail-application setting file. FIG. 71 illustrates an example of command specification for commands used in the mail-application setting file. As shown, the mail-application setting file includes a destination command 'sendto' by which a destination mail address is specified; a color command 'color' by which output color and resolution to be applied at the destination are specified; and a mail command 'mail' by which an image data file from which image data is read out and transmitted via e-mail (electronic mail) is specified.

Accordingly, in the composite machine 1 according to the fifth embodiment, upon insertion of the SD card 126, the machine 1 thus finally transmits image data via e-mail according to the instructions/commands written in the program starting setting file and mail-application setting file recorded in the inserted SD card 126.

In case the SD card 126 is suddenly removed from the card slot, it is necessary to unmount the SD card 126. For this purpose, the printer application, scanner application, fax application or mail application starts the SD card check program 121, which thus performs an unmounting processing on the SD card 126.

Figure 72:
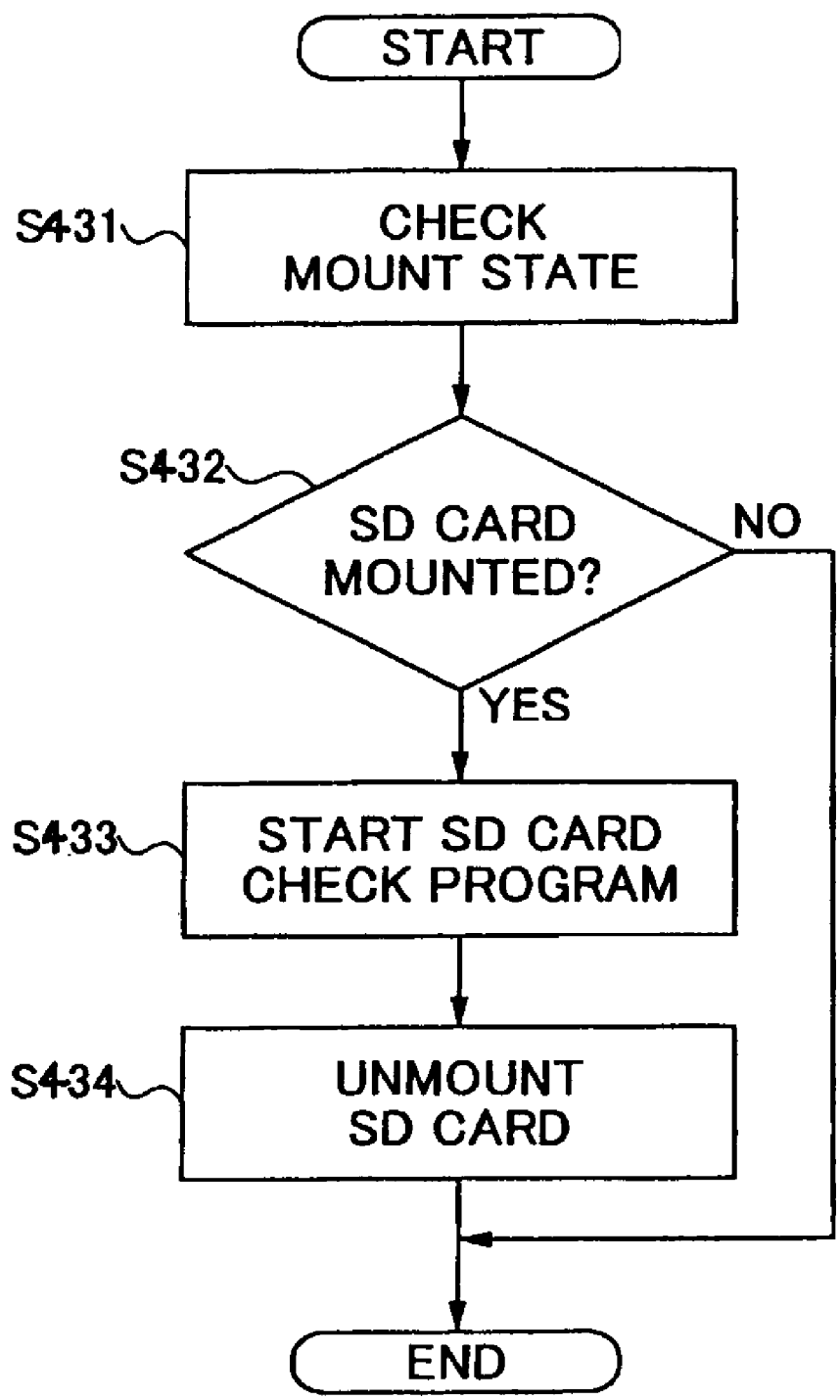
FIG. 72 shows an operation flow chart illustrating another example of SD card removal detecting operation performed in the image forming apparatus shown in FIG. 1.

FIG. 72 shows an operation flow chart of an example of an SD card removal detection processing. In Step S431, the printer application, scanner application, fax application or mail application inquires the SD card status monitor driver 123 as to the status information on the SD card 126, and examines the state of mounting of the SD card 126.

In Step S432 following Step S431, the printer application, scanner application, fax application or mail application determines from a result of examination on the mounting state performed in Step S431 whether or not the SD card 126 is mounted. When it is determined that the SD card 126 is mounted according to the examination result on the mount state (Yes in Step S432), the printer application, scanner application, fax application or mail application performs Step S433, and starts the SD card check program 121. When it is determined that first of all the SD card 126 is not mounted according to the examination result on the mounting state (No in Step S432), the printer application, scanner application, fax application or mail application terminates the current processing.

In Step S434 following Step S333, the SD card check program 121 performs unmounting of the SD card 126, notifies of the matter that it has unmounted the SD card 126 to the SD card status monitor driver 123, and terminates the current processing.

Thus, in the composite machine 1 also in the fifth embodiment, even when the SD card 126 is removed in a state in which the power supply is maintained, unmounting processing of the SD card 126 can be properly performed automatically.

Thus, according to the data processing method performed in the composite machine 1 according to the fifth embodiment of the present invention, it is possible to cause an application program starting from the SD card 126 in the machine 1 to process various types of data recorded in the SD card only by inserting the same into the SD card slot 125, for example. Although the above-mentioned examples are those in which image data files are processed by respective application software, any other types of data other than image data may be similarly applied in this embodiment.

Thus, also according to the fifth embodiment of the present invention, various types of data recorded in an information recording medium which can be inserted/removed into/from a machine or image forming apparatus can be made to be processed in the machine easily.

Further, the present invention is not limited to the above-described embodiments, and variations and modifications may be made without departing from the basic concept of the present invention.

What is claimed is:

1. An image forming apparatus comprising image processing hardware, a program for performing a process concerning image formation by using the image processing hardware, and a slot which a recording medium is inserted into and removed from, comprising:
    a recording medium starting part configured to mount a file system of the recording medium onto a first mount point by using the file system of the recording medium inserted into the slot and the first mount point indicating a mounting destination of the file system of the recording medium by an absolute path for the file system that designates a first directory in the image forming apparatus, recorded in a master setting file stored in the image forming apparatus; and
    a program starting part configured to store the first mount point, read a setting file from the mounted file system of the recording medium, acquire a first absolute path for a mount target from a file system in the image forming apparatus by combining a relative path written in the setting file and said first mount point when the mount target recorded in the setting file is indicated by the relative path designating a directory in the recording medium, acquire a second mount point indicating a mounting destination of the mount target recorded in the setting file by a second absolute path for the mount target that designates a second directory in the image forming apparatus, mount said second absolute path for the mount target onto the second mount point, and start a program in the recording medium.

2. The image forming apparatus as claimed in claim 1, wherein:
    the relative path is written in the setting file.

3. The image forming apparatus as claimed in claim 1, wherein:
    upon a notification of insertion of the recording medium into the slot being given, said program starting part starts said recording medium starting part.

4. The image forming apparatus as claimed in claim 1, wherein:
    the relative path and absolute path are those used for path direction in the file system used in the recording medium.

5. The image forming apparatus as claimed in claim 1, wherein:
    said program starting part performs an authentication check on the setting file recorded in the recording medium, and reads the setting file when the authentication check is passed.

6. The image forming apparatus as claimed in claim 1, wherein:
    said program starting part performs an authentication check on the mount target specified by the relative path, and mounts the mount target when the authentication check is passed.

7. The image forming apparatus as claimed in claim 1, wherein:
    upon a finish of processing concerning the recording medium inserted into the slot, said program starting part notifies a once started program of the finish of the processing.

8. The image forming apparatus as claimed in claim 1, wherein:
    insertion into and removal from the slot of the recording medium is allowed.

9. An image forming apparatus comprising image processing hardware, a program for performing a process concerning image formation by using the image processing hardware, and a slot which a recording medium is inserted into and removed from, comprising:
    a recording medium starting part configured to mount a file system of the recording medium onto a first mount point by using the file system of the recording medium inserted into the slot and the first mount point indicating a mounting destination of the file system of the recording medium by an absolute path for the file system that designates a first directory in the image forming apparatus, recorded in a master setting file stored in the image forming apparatus; and a program starting part configured to read a setting file from the mounted file system of the recording medium, create a directory recorded in the setting file, acquire a first absolute path for a mounting destination of a mount target from a file system in the image forming apparatus by combining a relative path written in the setting file and the created directory when the mounting destination of the mount target recorded in the setting file is indicated by the relative path designating a directory in the recording medium, acquire a second mount point indicating the mount target recorded in the setting file by a second absolute path that designates a second directory in the image forming apparatus, mount the second absolute path for the mount target onto the second mount point, and start a program in the recording medium.

10. The image forming apparatus as claimed in claim 9, wherein:
the relative path is written in the setting file.

11. The image forming apparatus as claimed in claim 9, wherein:
upon a notification of insertion of the recording medium into the slot being given, said program starting part starts said recording medium starting part.

12. The image forming apparatus as claimed in claim 9, wherein:
the absolute path written in the setting file is one used for path direction in the file system used in the recording medium.

13. The image forming apparatus as claimed in claim 9, wherein:
said program starting part performs an authentication check on the setting file recorded in the recording medium, and reads the setting file when the authentication check is passed.

14. The image forming apparatus as claimed in claim 9, wherein:
said program starting part performs an authentication check on the mount target specified by the absolute path, and mounts the mount target when the authentication check is passed.

15. The image forming apparatus as claimed in claim 9, wherein:
upon a finish of processing concerning the recording medium inserted into the slot, said program starting part notifies a once started program of the finish of the processing.

16. The image forming apparatus as claimed in claim 9, wherein:
insertion into and removal from the slot of the recording medium is allowed.

17. A path direction method in an image forming apparatus which comprises image processing hardware, a program for performing a process concerning image formation by using the image processing hardware, and a slot which a recording medium is inserted into and removed from, the method comprising:
mounting, by the image forming apparatus, a file system of the recording medium onto a first mount point by using the file system of the recording medium inserted into said slot and the first mount point indicating a mounting destination of the file system of the recording medium by an absolute path for the file system that designates a first directory in the image forming apparatus, recorded in a master setting file stored in the image forming apparatus;
storing, by the image forming apparatus, the first mount point;
reading, by the image forming apparatus, a setting file from the mounted file system of the recording medium, and acquiring a first absolute path for a mount target from a file system in the image forming apparatus by combining a relative path specified in the setting file and the first mount point when the mount target recorded in the setting file is indicated by the relative path designating a directory in the recording medium, acquiring a second mount point indicating a mounting destination of the mount target recorded in the setting file by a second absolute path that designates a second directory in the image forming apparatus;
mounting, by the image forming apparatus, said second absolute path for the mount target onto the second mount point; and
starting, by the image forming apparatus, a program in the recording medium.

18. A path direction method taken in an image forming apparatus which comprises image processing hardware, a program for performing a process concerning image formation by using the image processing hardware, and a slot which a recording medium is inserted into and removed from, comprising:
mounting, by the image forming apparatus, a file system of the recording medium onto a first mount point by using the file system of the recording medium inserted into the slot and the first mount point indicating a mounting destination of the file system of the recording medium by an absolute path for the file system that designates a directory in the image forming apparatus, recorded in a master setting file stored in the image forming apparatus;
reading, by the image forming apparatus, a setting file from the mounted file system of the recording medium, creating a directory recorded in the setting file, acquiring a first absolute path for a mounting destination of a mount target from a file system in the image forming apparatus by combining a relative path written in the file system and the created directory when the mounting destination of the mount target recorded in the setting file is indicated by the relative path designating a directory in the recording medium, and acquiring a second mount point indicating the mount target recorded in the setting file by a second absolute path that designates a second directory in the image forming apparatus;
mounting, by the image forming apparatus, the second absolute path for the mount target onto the second mount point; and
starting, by the image forming apparatus, a program in the recording medium.

19. The image forming apparatus as claimed in claim 1, wherein:
the directory designed by the relative path is a new directory created by the program starting part in the image forming apparatus based the setting information and the program starting part mounts the mount target from the recording medium into the new directory.

20. The image forming apparatus as claimed in claim 9, wherein:
the directory designed by the relative path is a new directory created by the program starting part in the image forming apparatus based the setting information and the program starting part mounts the mount target from the recording medium into the new directory.

* * * * *